US011213990B2

(12) United States Patent
Caiola et al.

(10) Patent No.: US 11,213,990 B2
(45) Date of Patent: Jan. 4, 2022

(54) SEALING MODULE FOR CABLES OR PIPES AS WELL AS METHOD AND APPARATUS FOR PROVIDING THE SAME

(71) Applicant: CAIOLA FILIERE S.R.L., Varese (IT)

(72) Inventors: Giuliano Caiola, Varese (IT); Gabriele Caiola, Varese (IT); Adriano Caiola, Varese (IT)

(73) Assignee: CAIOLA FILIERE S.R.L., Varese (IT)

( * ) Notice: Subject to any disclaimer, the term of this patent is extended or adjusted under 35 U.S.C. 154(b) by 263 days.

(21) Appl. No.: 16/094,994

(22) PCT Filed: Apr. 27, 2017

(86) PCT No.: PCT/EP2017/060133
§ 371 (c)(1),
(2) Date: Oct. 19, 2018

(87) PCT Pub. No.: WO2017/186883
PCT Pub. Date: Nov. 2, 2017

(65) Prior Publication Data

US 2019/0152117 A1 May 23, 2019

(30) Foreign Application Priority Data

Apr. 27, 2016 (WO) ................. PCT/EP2016/059428
Aug. 5, 2016 (EP) ..................................... 16183107
(Continued)

(51) Int. Cl.
*B29C 48/23* (2019.01)
*B29C 48/21* (2019.01)
(Continued)

(52) U.S. Cl.
CPC .......... *B29C 48/21* (2019.02); *B29C 48/0022* (2019.02); *B29C 48/151* (2019.02);
(Continued)

(58) Field of Classification Search
None
See application file for complete search history.

(56) References Cited

U.S. PATENT DOCUMENTS 4,702,867 A 10/1987 Sejimo et al.
5,048,382 A 9/1991 Mitchell
(Continued)

FOREIGN PATENT DOCUMENTS

DE 202008007636 10/2009
EP 0188118 7/1986
(Continued)

OTHER PUBLICATIONS

Office Action issued by the EPO dated Nov. 15, 2019 for corresponding European patent application No. 17 719 290.3.
(Continued)

*Primary Examiner* — Monica A Huson
*Assistant Examiner* — Kelsey C Grace

(57) ABSTRACT

It is disclosed a method for the production of a sealing module (1) for a pipe or a cable, the sealing module having a hollow body (10) and a plurality of inner layers (11*a*-11*h*) superimposed one to the other provided within said body (10), the layers (11*a*-11*h*) being removable one from the other to define the size of the cross-section of a housing (14) extending between two opposite surfaces (S1, S2) of the sealing module to house cables or pipes of different sizes, wherein said plurality of layers (11*a*-11*h*) are made of a thermoplastic material, or both said body (10) and said plurality of layers (11*a*-11*h*) are made of a thermoplastic material. It is also disclosed an apparatus for the production of a sealing module, and a sealing module made of thermoplastic material.

20 Claims, 38 Drawing Sheets

(30) Foreign Application Priority Data

Aug. 5, 2016 (EP) .................................... 16183112
Aug. 5, 2016 (EP) .................................... 16183115

(51) Int. Cl.

| | |
|---|---|
| ***F16L 5/02*** | (2006.01) |
| ***B29C 48/00*** | (2019.01) |
| ***H02G 3/22*** | (2006.01) |
| ***B29D 99/00*** | (2010.01) |
| ***B29C 48/18*** | (2019.01) |
| ***B29C 48/151*** | (2019.01) |
| ***B29C 48/154*** | (2019.01) |
| ***B32B 1/08*** | (2006.01) |
| ***B32B 27/08*** | (2006.01) |
| *B29L 31/26* | (2006.01) |
| *B29K 101/12* | (2006.01) |

(52) U.S. Cl.

CPC .......... *B29C 48/154* (2019.02); *B29C 48/185* (2019.02); *B29C 48/23* (2019.02); *B29D 99/0053* (2013.01); *B32B 1/08* (2013.01); *B32B 27/08* (2013.01); *F16L 5/02* (2013.01); *H02G 3/22* (2013.01); *B29C 48/023* (2019.02); *B29K 2101/12* (2013.01); *B29L 2031/26* (2013.01); *B32B 2581/00* (2013.01)

(56) References Cited

U.S. PATENT DOCUMENTS

| | | | |
|---|---|---|---|
| 2004/0080119 | A1 | 4/2004 | Goll |
| 2005/0046073 | A1 | 3/2005 | Balconi |
| 2013/0113166 | A1 | 5/2013 | Hjerpe |

FOREIGN PATENT DOCUMENTS

| | | |
|---|---|---|
| EP | 0429916 | 6/1991 |
| EP | 2422966 | 2/2012 |
| EP | 3007290 | 4/2016 |
| FR | 2723245 | 2/1996 |
| GB | 1120045 | 7/1968 |
| WO | 2010/089289 | 8/2010 |
| WO | 2010089285 | 8/2010 |
| WO | 2010089289 | 8/2010 |

OTHER PUBLICATIONS

International Search Report and written opinion dated Jul. 14, 2017 for PCT/EP2017/060133.

International preliminary report on patentability dated Nov. 8, 2018 for PCT/EP2017/060133.

Notice of Opposition and relevant facts and arguments filed by Roxtec AB at the EPO dated Jul. 13, 2021 for corresponding European Patent No. 3448651.

Industrial Press Inc., "Machinery's Handbook 25th Edition" New York: Industrial Press Inc., 1996.

Wikipedia, "Plastic extrusion" Host: Wikipedia Sep. 15, 2020.

SEALING MODULE FOR CABLES OR PIPES AS WELL AS METHOD AND APPARATUS FOR PROVIDING THE SAME

TECHNICAL FIELD

The present invention concerns a sealing module (also known as lead-through module or transit module) for a pipe, or a cable, or a similar elongated element. In particular, the present invention concerns a method and an apparatus for an easier and cost-effective production of such a sealing module, and the module so produced.

BACKGROUND ART

Sealing modules of the above kinds are used in many industrial fields (naval, automotive, telecom, etc.), to house for example cables or wires for electricity, communication, computers etc., as well as pipes for different gases or liquids such as water, compressed air, hydraulic fluid and cooking gas, or wires for load retention.

Known sealing modules are usually made of vulcanized rubber and have an adaptor for the pipe or cable. In more detail, the sealing modules has an adaptor comprising a plurality of removable (peelable) layers, or sheets, to define an opening, wherein greater the number of layers removed, greater the cross section of the opening that can be formed. As a result, the layers or sheets can peeled off until the inner diameter of the opening is adapted to the outer diameter of the cable (or pipe) that is going to be received in the opening itself. The layers adhere to each other so as to stay together. Adhesion between the layers is not however too much strong, in order to allow a user to peel off the layers, either one-by-one or a number of layers together.

Methods of production of such sealing modules are disclosed in document EP0429916. In a first embodiment of EP0429916, a sheet is wrapped around a core member so as to define many layers superimposed on the core member, and then it is inserted within the housing. Finally the piece is longitudinally cut into two halves. In a second embodiment, a plurality of sheets are superimposed and forced within a seat in the body of the sealing module by means of a wheel.

As a result, the product is complex to produce, and it is not cost effective. Also various steps are required to produce a sealing module.

An object of the present invention is to provide a sealing module in an easy and cost effective manner, and to provide an apparatus capable of producing such a sealing module.

DISCLOSURE OF THE INVENTION

This and other aims are achieved by a method, an apparatus and a sealing module according to the invention as set out in the independent claims. Preferred aspects/features are here below disclosed and/or recited in the dependent claims.

It has to be noted that according to the invention the method for the production of a sealing module for a pipe or a cable, comprises the step of providing an external body and/or a core member, and the step of extruding in sequence, or simultaneously, a plurality of layers of thermoplastic material, one above the other, and wherein one or more layers being removable from another layer.

In the following a method, an apparatus and a sealing module according to three possible embodiments of the invention will be disclosed. It has to be immediately noted that, in general, aspects/features herein disclosed and/or claimed with reference to an embodiment are not limited to such an embodiment and have to be considered as aspects/features of the invention, and can be applied also to other embodiments of the invention.

More in detail, as better disclosed here below, according to a first embodiment of the invention the production of the sealing module is carried out starting from the inner part thereof (i.e. the core member) and according to a second embodiment of the invention the production of the sealing module is carried out starting from the external part thereof (i.e. the external body).

According to both the first and second embodiments, the plurality of layers are extruded in sequence on the “starting” part of the module, i.e. the core member or the external body.

More in detail, according to a first embodiment the sealing module is produced starting from a core member, and a plurality of layers made of thermoplastic material are extruded in sequence, one above the other, on said core member.

According to a second embodiment, the sealing module is produced starting from a body (e.g. an external body) having a cavity to house said plurality of layers, and a plurality of layers are extruded in sequence, one above the other, in the cavity of the body.

According to a third embodiment of the invention, the plurality of layers of the sealing module are extruded simultaneously. By doing so, at the exit of the production apparatus, the plurality of inner layers of the sealing module are simultaneously provided.

According to an aspect, as for example according to the first embodiment of the present invention (i.e. production from the inner part of the sealing module), the method for the production of a sealing module for a pipe or a cable comprises the step of providing a core member, the step of extruding in sequence a plurality of layers made of thermoplastic material, one above the other, on said core member. A further step is provided, the step being chosen between the step of extruding a body (e.g. an external body), made of thermoplastic material, on said plurality of layers and in particular on the last layer, and the step of providing at least part of the body and constraining it to the external layer of the plurality of layers. In other words, according to a first option, the body is extruded on the thermoplastic layers and it is made of a thermoplastic material, while according to a second option the body is not extruded on (i.e. directly extruded on) the plurality of layers, but is produced by a known technique (e.g. extrusion or molding) and it is subsequently constrained to the plurality of layers by a known method, e.g. by gluing or by adhesion between the materials of the body and the layers. According to this second option the body does not need to be made of thermoplastic material, although this is a possible solution.

According to an aspect, as for example according to the second embodiment of the present invention (i.e. the production from the external part of the sealing module) the method for the production of a sealing module for a pipe or a cable comprises the step of providing a body (e.g. an external body) having a cavity to house said plurality of layers, and the step of extruding in sequence a plurality of layers, one above the other, in the cavity of the body.

It has to be noted that the term cavity is used herein to indicate that the body is hollowed, either with a closed hollow section or with an open hollow section.

Also in the second embodiment, the body can be provided by extrusion or it can be made by other known forming processes, such as for example molding. The body is not necessarily extruded in a first extruding station before the subsequent extrusion of the layer, but it can be previously produced by a known technique (e.g. extrusion or molded) and it is subsequently provided and used as base body on which the plurality of layers are extruded.

According to an aspect of the invention, the layers are removable one from the other to define the size of the cross-section of a housing extending from a surface to an opposite surfaces of the sealing module to house cables or pipes of different sizes (i.e. with different cross section sizes). The resulting sealing module, typically once the core member (if provided), and possibly also one or more layers, have been removed from the sealing module, has a housing extending between two opposite surfaces of the sealing module defined by the hollow body and the plurality of layers superimposed one to the other, arranged in the external hollow body to define a housing for the pipe or wire or other tubular device to be inserted in the module.

According to an aspect, the plurality of layers are arranged within the body (e.g. in the cavity of the body).

The removable layers are arranged superimposed one to another so as to be removable (e.g. peeled off), in a known way to modify the size of the pass through housing of the sealing module in view of the size of the cable to be passed therein, e.g. to provide an adapter portion of the sealing module arranged within the hollow body. In fact, by removing one or more layer (preferably by peeling one or more layer), the size of the pass through housing (i.e. the cavity extending between two opposite surfaces of the body) of the sealing module can be modified depending on the size of the cable to be passed therein.

In other words, according to an aspect of the invention, one or more layers are “removable” from another layer. It has to be noted that a layer, i.e. the first layer, can be also removable from the core member. In other words, the layers can be peeled off one from the other (also from the core member, if provided), to vary the dimension (e.g. diameter) of the housing for the cables. A user can thus detach one or more of the layers, starting from the inner ones (i.e. those arranged at greater distance from the body), to increase the size of the housing, allowing to house bigger cables.

According to an aspect of the invention, one or more layer(s) is removable from another layer by peeling, preferably by hand.

As known, with “peeling” it is meant the action (typically of the user) to pull (preferably, or possibly, by hand) and detach a layer from the layer beneath. In other words, peeling is the action of pulling a layer, along a direction which is typically tilted (preferably at about 90 degrees) with respect to the axis of the sealing module. When the pulling force overcomes the adhesion of the layer to the layer beneath, the layer that is pulled is separated from the layer beneath, and it can be removed from the sealing module.

According to an aspect of the invention, the layers and the hollow body have a closed hollow section, i.e. a section that extends along a closed path around a hollow volume.

The hollow volume delimited by the closed path corresponds to the cavity intended to house the plurality of layers.

According to another aspect of the invention, the body has an open hollow section, i.e. it is provided with a cavity on a surface, e.g. with a recess or indentation on a surface.

In other words, the body can be provided with an open hollow section, i.e. the body may be indented (hollowed), so as to form a (open) cavity for the layers. As an example, a plurality (typically two of them) of hollow bodies may be used to form a closed section around a cable.

The cavity (recess or indentation) of the open section hollow body is intended to house the layers and also the cable or pipe, and preferably the cavity (e.g. recess or indentation) has a substantially arch shape in section (i.e. the recess or indentation has substantially the shape of a part of cylindrical surface). The cavity or indentation is extending between two opposite surfaces of the body thus allowing the passage of the cable or pipe through the body, i.e. the cable is at least part housed in the recess or indentation and it is protruding outside two opposite surfaces of the body and thus of the sealing module.

As already mentioned above, the term cavity is used herein to indicate that the body is hollowed, either with a closed hollow section or with an open hollow section.

It has to be noted that the wording “extruding said body” (as for example in the step (c) of the first embodiment herein disclosed) may be intended as extruding a closed section hollow body on the layers as well as extruding an open section hollow body (i.e. a hollowed or recessed or indented body) on the layers.

Also the wording “providing said body” (as for example in said step a) of the second embodiment herein disclosed) may be intended as providing a closed section hollow body as well as providing an open section hollow body (i.e. a hollowed or recessed or indented body) that can be constrained to the layers.

The shape of the closed hollow section can be different, according to a preferred aspect the shape of the layers is circular so as to provide a closed circular hollow section, e.g. an annular section. In other words a plurality of tubular layers are extruded one on another.

According to an aspect of the invention, as for example according to the first embodiment (production of the sealing module form the inner part thereof), the layers are superimposed, i.e. a layer is extruded around (on) an existing, previously extruded, layer and so on. As mentioned, the body may be extruded as well on the last layer, i.e. on the external layer of the plurality of superimposed layers.

More in detail, according to an aspect of the invention, the step of extruding in sequence the plurality of layers, one above the other, on a core member comprises a step of extruding a first layer on the external surface of the core member.

As mentioned above, the layer has a close hollow section, and when a layer is extruded on the external surface of the core member, the layer is provided around the core member that is closing the hollow space of the section of the first layer, e.g. the core member acts as a plug for the first layer.

Subsequently a second layer is extruded on the first layer and a third layer is extruded on the second layer, and so on. The number of layers can be varied depending on the maximum size of the cable or pipe that could be housed in the sealing module. On the last (external) layer of the plurality of layers, the body (external body) is extruded.

According to an aspect of the invention, as for example in the second embodiment (production of the sealing module from the external part thereof), the step of extruding in sequence said plurality of layers on said body can be carried out by extruding the layers on a closed hollow surface of the body, or can be extruded on a surface of the body having an open cross section.

The plurality of layers, i.e. a plurality of sheets either having an open cross section or a closed cross section are extruded in sequence on the body, preferably in the cavity of the body.

The layers are superimposed, i.e. a layer is extruded around (on) an existing, previously extruded, layer and so on. The first layer is extruded in the cavity of the body. More in detail, according to an aspect of the invention, the step of extruding in sequence the plurality of layers, one above the other, on the body and in particular in the cavity of the body, comprises a step of extruding a first layer on the external surface of the cavity of the body.

In the case the body has a closed hollow section, tubular layers are extruded one on the other with a first layer extruded on the surface (e.g. a circular closed surface) of the cavity of the body. In the case the body is provided with an open cross section, the layers in the form of sheets are extruded one on the other on the surface (e.g. on the substantially arch shaped surface) of the cavity (recess or indentation) of the body.

Subsequently a second layer is extruded on the first layer and a third layer is extruded on the second layer, and so on. The number of layers can be varied depending on the maximum size of the cable or pipe that could be housed in the sealing module. On the last layer (the one arranged at greater distance from the body) of the plurality of layers, a core member can be provided. The core member can be either extruded or provided by other known forming process such as for example molding.

The plurality of layers and, possibly, also the body and/or the core member are made of a thermoplastic material. It has to be noted that, according to different possible aspects of the invention, the plurality of layers can be made by thermoplastic material, while the body is made of other suitable material, such as plastic or rubber that are not thermoplastic, for example in the case the body is provided with a known forming process different from extrusion.

It has to be noted that, according to an aspect of the invention, different thermoplastic material can be used to produce the layers, e.g. one or more layers can be produced of a different thermoplastic material used to produce at least one different layer. In other words a multi-thermoplastic materials sealing module can be produced. It has to be also noted that the core member and/or the body of the sealing module can be produced in a thermoplastic material that is different from the thermoplastic material used to produce at least one layer.

The use of different materials may be useful to enhance the detachment of a layer from the next one; in particular according to an aspect non-compatible materials or materials with reduced compatibility may be used to facilitate the peeling of the layers.

Also, a body that is not made of a thermoplastic material can be applied to the layers that are extruded in sequence and that are made of a thermoplastic material. It has to be noted that according to an aspect of the invention, as for example in the second embodiment herein disclosed, a body previously formed can be provided and used to extrude the layers on it. Advantageously, according to an aspect of the invention (as for example in the first and second embodiment herein disclosed), the thermoplastic layers are extruded "in sequence", i.e. initially a first inner layer is extruded in a first die and directed towards and fed to a second die. At the second die a second layer is extruded and deposited onto (around in case of a closed section hollow body) the first layer, and so on, to provide a plurality of layers by means of subsequent extrusions.

According to an aspect of the invention, as for example in the third embodiment (i.e. by using a simultaneous extrusion), the method for the production of a sealing module for a pipe or a cable comprises the step of extruding simultaneously a plurality of layers made of thermoplastic material, one above the other, to simultaneously provide, at the exit of the extrusion apparatus, a plurality of inner layers for said module.

The method also includes the step of providing an external body on said plurality of layers and in particular on the most external of the layers.

With "simultaneous" extrusion of the layers it is meant that the layers are extruded substantially at the same time (together), and preferably also at the same extruding station. As a result, considering a section of a plurality of layers that were produced with a "simultaneous extrusion", such a section was extruded substantially at the same time. In other words, considering a section of a plurality of layers, the layers of this section have been extruded together.

This is typically obtained by extruding the layers from different extrusion holes that are substantially coplanar one with the other (preferably the outlet sections of the holes are substantially coplanar), i.e. they are arranged substantially on the same plane to allow extrusion of the layers substantially at same time.

According to an aspect, the layers are extruded in the form of a hollow body, around a core member. The core layer may be previously produced in a known way (e.g. by injection molding, extrusion or compression molding) or it may be extruded simultaneously with the layers. Typically, both the layers and the core member have a closed section. The layers, in particular, have a closed hollow section, typically an annular section. It is however possible to provide layers having a hollow open section (e.g. half-annular), preferably around a core.

Alternatively, the layers may be extruded onto the external body. As before, the external body may be previously produced in a known way or it may be extruded simultaneously with the layers. In this embodiment both the external body and the layers can be provided with an open hollow section. In particular, the external body is preferably provided with a cavity to receive the layers. The layers have preferably a half-annular section. It is however not excluded to extrude layers having a closed (e.g. annular) section onto a closed section hollow body (e.g. provided with a cavity having a circular section).

Also, according to an aspect of the invention, the core member, the layers and the body may be all extruded simultaneously. Preferably, the layers and the core have preferably a closed hollow section. The layers have preferably an annular section. Again, it is not excluded to extrude together the core, the layers and the body, wherein the layers have an open hollow section, e.g. a half-annular section.

More in detail, according to an aspect of the third embodiment of the invention, the step of extruding the plurality of layers, one above the other is carried out simultaneously.

In more detail, at the same time a second layer is extruded on the first layer and a third layer is extruded on the second layer, and so on. The number of layers depends on the maximum size of the cable or pipe that could be housed in the sealing module. On the last (external) layer of the plurality of layers, the body (external body) is provided, by co-extrusion or by attaching it to the "bundle" of layers that can be concentrically arranged (with a closed section) or arranged one on another with an open section.

According to an aspect of the invention, the core member is removed from the sealing module, after the extrusion step is completed. According to an aspect, the obtained layers, and possibly with their outer body, are cut into the desired length. According to another aspect, when the layers are extruded as tubular layers, the bundle of co-extruded layers (extruded simultaneously), possibly with the external body, especially if this is also co-extruded, is partially, or completely, longitudinally cut into two portions (typically into two halves), substantially along the axis of the housing extending between two opposite surfaces of the sealing module.

According to an aspect, the shape of the closed hollow section of the body (and of the layers also) can be chosen in view of the shape of the object (pipe, wire, cable etc.) to be inserted into the sealing module. According to an aspect, as for example in the third embodiment herein disclosed, the shape of the layers is circular so as to provide a closed circular hollow section, e.g. an annular section. In other words a plurality of tubular layers are extruded one on another substantially simultaneously; the layers are superimposed, i.e. they are placed one above the other and preferably in contact one to the other. Typically a layer is extruded around another layer that is also being extruded, and so on.

As previously mentioned, according to an aspect the layers may be extruded with a half annular section, so as to avoid the cutting step. Again, the outer body may be extruded with the layers or it may be separately produced.

Advantageously, the use of an extrusion process of thermoplastic material for the production of the sealing module, and in particular the use of subsequent extrusions (or simultaneous extrusion) of thermoplastic material, allow to provide a cost-effective process which can be easily and rapidly adapted for the production of sealing modules having different number of removable layers.

In fact, the number of layers can be easily selected by changing the number of extrusion steps of thermoplastic material, or (as for example for a simultaneous extrusion) by changing the extruding stations extruding stations, i.e. the shape of the extruding station, or by selectively choosing to feed only part of the extruding holes of the extruding station.

Additionally, the extrusion process provides high accuracy and control of the dimensions of each component of the sealing module, and in particular of each layer of the module adapter.

According to an aspect, the layers adhere one to the other so as to allow removal, preferably by peeling, of one or more layers.

More in detail, the layer(s) are removable (and in particular a user can peel off one or more layers) because the adhesion between the extruded layer is enough to keep the layers together, e.g. preventing relative movement between the layers, for example when the module is tilted. However, such an adhesion is loose enough to allow a user to remove, and in particular to peel, one or more layers to adapt the size of the housing of the sealing module for the cables or pipes. According to an aspect of the invention the layer(s) are removable (and in particular a user can peel off one or more layers) thanks to a proper setting of the extrusion parameters when the layers are superimposed in the production step. In particular, the extrusion parameter(s) are set so that the layers adhere one to the other; such an adhesion is enough to keep the layers together, e.g. preventing relative movement between the layers. However, as mentioned above, such an adhesion is loose enough to allow a user to remove, and in particular to peel, one or more layers to adapt the size of the housing of the sealing module for the cables or pipes. According to an aspect of the invention, it is possible to set one or more of the extrusion parameters to provide the desired adhesion between the layers, the parameters being selected from: e.g. the extrusion speed (i.e. the extrusion of the plastic material coming out the relevant extrusion die (or form the relevant portion of the extrusion die)), the extrusion temperature, the distance between the extrusion dies.

It has to be also noted that, according to an aspect of the invention, a detaching agent and/or the cooling of the extruded thermoplastic material can be used and selected so as to obtain the desired adhesion between the layers so that they can be removed or detached, and in particular peeled off, from another (adjacent) layer when required.

According to an aspect, a step of cooling a layer is provided, before a subsequent layer is extruded onto the first mentioned layer. In other words, a layer is extruded, then cooled, and subsequently a further layer of thermoplastic material is extruded on its external surface. The cooling step is carried out so that the temperature of the first layer receiving the subsequent layer of thermoplastic material allows the removal of the second layer from the first layer in the final product. As mentioned above, the adhesion between the layers is such as to allow a layer to be removed, preferably peeled off, from another layer.

According to another aspect, a detaching agent is provided so as to control the adhesion between the layers, allowing one or more layer(s) to be removed, and in particular peeled off, from another layer.

According to another aspect, as for example in the simultaneous extrusion process as for example in the third embodiment disclosed herein, According to an aspect, a step of cooling the layers is provided, after (typically just after) the simultaneous extrusion of the layers. In other words, the layers are extruded, and then they may be immediately cooled, or cooled after a reduced period of time subsequently to the extrusion. Such a cooling step is carried out so that the temperature of the layers is reduced to a temperature that prevents mixing of the layers between one another, thus assuring that a layer may be placed onto another layer without a transfer or material form one layer to another. At the same time, a certain adhesion may be provided between the layers so as to allow to obtain to reversibly constrain one layer to the other. A detaching agent, can be provided in the feeder of the thermoplastic material in the extruding station. In other words the detaching agent, for example in the form of grains or pellets, can be added to the feeder of solid thermoplastic material to the extruding station. The pellets or grains of detaching agent are dispersed in the melted thermoplastic material and, in particular, the detaching agent emerges at the external surface of the extruded thermoplastic material. This allows to provide a detaching action when a thermoplastic material is subsequently (or simultaneously) extruded thereon.

According to an aspect of the invention, a detaching agent is provided on at least part of at least the external surface of a layer, or of the core member (if provided), for example before a subsequent layer is extruded onto the first mentioned layer (i.e. a previous layer or the core member, already formed) if an extrusion is sequence is used. In other words, as before mentioned, a layer or the core member is extruded, then it receives a detaching agent and subsequently it receives a further layer by a subsequent extrusion. The coolant and the detaching agent may coincide, or they may be mixed together. As an example, the coolant may be water (preferably cold water), and a detaching agent, e.g. an oil or a lubricant, may be added to the water, so that a mixture of water and detaching agent is delivered to the layers of extruded material. According to an aspect, the coolant may be air blown on the layers.

According to an aspect of the invention, a detaching agent is provided on at least part of at least the external surface of a layer, or of the core member (if provided), for example before a subsequent layer is extruded and deposited onto the first mentioned layer in a solid state, for example in the form of a powder, applied on the external surface of a layer, or of the core member. According to a possible aspect, talc powder is used as detaching agent.

According to a possible aspect, talc powder or Teflon is used as detaching agent.

It has to be noted that the detaching agent can be provided to the thermoplastic material, i.e. before the extrusion of the thermoplastic material, and/or after the thermoplastic material has been extruded, i.e. after the thermoplastic material is outside the extruding die. In both cases, a detaching agent is preferably provided on at least part of the external surface of the extruded thermoplastic material.

According to an aspect, if for example a simultaneous extrusion is used, the process comprises a step of drying the external surface of the layers.

According to an aspect of the invention, if for example an extrusion is sequence is used, the process comprises a step of drying the external surface of a first layer, before a second layer is extruded onto said first layer. Preferably the drying step is carried out after a coolant has been provided so as to dry the external surface of the thermoplastic material before a subsequent layer of thermoplastic material is extruded on it.

In the case a detaching agent (e.g. silicone) is mixed or emulsified, or in general added, to a coolant (e.g. water) after the drying step the coolant is dried while the detaching agent remain on the external surface of the thermoplastic material, i.e. the core member or a layer of said plurality of layers.

As a result, at the end of the production steps (i.e. in the final piece), for example in the first and third embodiment of the invention, a detaching agent is interposed between the different extruded layers of the sealing module and, possibly, also between the inner layer (i.e. the first, more internal, layer) and the core member (if provided).

According to an aspect of the invention, as for example in the second embodiment of the invention, at the end of the production steps (i.e. in the final piece), a detaching agent can be interposed between the different extruded layers of the sealing module and, possibly, also between the last layer (i.e. the more external layer, at greater distance from the body) and the core member (if provided).

According to another aspect, the core member (if provided) is removed from the sealing module, after the extrusion step is completed.

It has to be noted that according to different possible aspects, the body can be extruded or it can be made by other known forming processes, such as for example molding.

It has to be also noted that according to an aspect of the invention, a layer is permanently constrained to the surface of the cavity of the body.

In other words the body is not removable (it cannot be peeled off). More in detail according to an aspect, the extruded layer in the cavity of the body is not removable (it cannot be peeled off).

The constraining of the last layer (or the first layer) to the body can be for example obtained by direct extrusion of body on the last layer (or of the first layer on the body, and in particular in its cavity), so as to avoid that the last layer to be removed from the body. This can be for example achieved by properly selecting the extrusion parameters and/or by not providing a detaching agent between the body and the last layer.

It has to be also noted that the last layer (first layer, for example if the second embodiment of the invention is carried out) can be constrained to the body with other known techniques, different from the direct extrusion of the body on the last layer. For example the last layer (first layer) and the body can be constrained by a known method, e.g. by gluing or by adhesion between the materials of the body and the layers.

According to another aspect, the sealing module is partially, or completely, cut into two portions (typically into two halves), substantially along the axis of the housing extending between two opposite surfaces of the sealing module. In particular this step is carried out when the body is provided with a closed section. With the expression partially cut it is meant that the sealing module, and in particular its external body is not completely cut so as to keep an integral connection part between two portions of the sealing module. In particular two portions of the external body are formed, which are constrained one to another and can be moved (e.g. rotated) one with respect to another, for the cable insertion, while the two portions are constrained in at least one point or area of connection. This area of connection is preferably arranged close to (or in correspondence of) an external surface of the external body so that this part can act as a hinge allowing the relative rotation of the two portions of the sealing module.

It has to be also noted that according to another possible aspect, two portions of the sealing module can be constrained one to another also by cutting completely the sealing module, and in particular the external body into two portions, and by providing a constraining or connection area between the two portions, for example by providing an additional joining part or by providing an adhesive or a welding material to join the two portions. In general the two portions are joined or connected together in a point or area of connection. As already mentioned above, this area of connection is preferably arranged close to (or in correspondence of) an external surface of the external body so that this part can act as a hinge allowing the relative rotation of the two portions of the sealing module.

It has to be also noted that the use of thermoplastic material allows to have a sealing module that is completely recyclable and that provides high flexibility in obtaining the desired properties of the sealing module. For example the thermoplastic material can be selected to provide the required mechanical properties of the sealing modules, for example in terms of elasticity.

Additionally, the extrusion of thermoplastic material allows the use of a filler giving desired behavior to the sealing module produced, for example resistance to the fire, or to high temperature, can be easily obtained by providing known fillers in the thermoplastic material to be extruded.

The present invention also relates to an apparatus for the production of the above mentioned sealing module for a pipe or a cable.

According to an aspect of the invention, the apparatus comprises a plurality of extruding stations, each extruding station comprising in turn an extrusion die, wherein at least part of the sizes of said extrusion dies are different one from the other. According to an aspect, the apparatus further comprises guiding means to direct and/or to move the thermoplastic material extruded from the extrusion die of an extruding station to the extrusion die of a subsequent extruding station. Advantageously, the use of a plurality of extruding station allows to provide an accurate control of the extrusion of each component of the sealing module, and in particular to control the extrusion of each layer forming a module adapter. As already mentioned above, extrusion parameter(s) of each extruding station (e.g. extrusion temperature and/or extrusion speed) can be set to provide the desired degree of adhesion between the different layers of the sealing module allowing removal, preferably by peeling, of one or more layers. Also, each extruding station can be set for the extrusion of a different thermoplastic material from one or more of the other extruding stations and/or it can be set to different extrusion parameters (e.g. temperature and/or speed) with respect to one/or more different extruding stations of the apparatus. It follows that the apparatus can be easily and effectively customized and controlled depending on the requirements of the sealing module to be produced by means of the apparatus.

According to an aspect, the apparatus comprises at least a coolant feeder interposed between two subsequent extruding stations, to feed a coolant to the extruded thermoplastic material. According to another aspect, the apparatus comprises a drier interposed between two subsequent extruding stations, to at least partially dry the coolant on the extruded thermoplastic material.

According to another aspect, the apparatus comprises a detaching agent feeder interposed between two subsequent extruding stations, to feed a detaching agent to the extruded thermoplastic material. As mentioned, the coolant and the detaching agent may coincide, or they can be mixed together. As a result, the coolant feeder and the detaching agent feeder can coincide, i.e. they can be the same element.

According to an aspect, a source of thermoplastic material is connected via a distribution line to at least two different extruding stations.

According to an aspect, at least part of the extrusion dies have similar shapes, with size progressively increasing (for example in the first embodiment of the invention), or decreasing (for example according the second embodiment of the invention) from one extrusion die to the subsequent extrusion die. "Similar shape" should be intended in the strict geometrical sense, i.e. two shapes are similar when they are identical, or when one shape is equal to the other shape with reduced or magnified dimensions. As an example, the extrusion dies for the adaptor (i.e. for the layers) may be all circular, with progressively increasing (or decreasing diameter, for example according to the second embodiment) diameter, for example if the body comprises a closed hollow section and the layers have a closed hollow section too. As mentioned above, according to an aspect, the body and thus the layers extruded thereon have an open section. For example the layer can be in the form of a curved sheet having an arched shape, and preferably the shape of a half of an annular shape (half of an annulus).

The dies have accordingly an arched shape and preferably the shape of a half of an annular shape (half of an annulus).

The extrusion die(s) for the body may be of different shape(s).

Also the die for extruding the body (if the body is provided by extrusion) could have a closed hollow section or an open section. In the case of an open section, the shape of the die can be rectangular, or square shaped, with a cavity (recess or indentation) having a substantially an arch shape (preferably an half of a circumference).

According to an aspect, as for example in the third embodiment herein disclosed, the apparatus for the production is suitable to carry out a simultaneous extrusion.

The apparatus according to the invention is for the production of a sealing module for a pipe or a cable, the sealing module having a hollow body and a plurality of inner layers superimposed one to the other provided within the body. The layers are removable one from the other to define the size of the cross-section of a housing extending between two opposite surfaces of the sealing module to house cables or pipes of different sizes, wherein the layers are made of a thermoplastic material.

The apparatus comprises at least an extruding station comprising a plurality of extrusion holes, said extrusion holes being configured to allow a simultaneous extrusion of said layers; at least a source of thermoplastic material to feed said extruding station.

It has to be noted that the apparatus may be provided with other extruding stations as well. As an example, the external body may be provided at a first extruding station, while the layers may be provided at a second extruding station.

Advantageously, the use of a single extruding station allows to provide a compact apparatus, that may be simply placed within a factory to produce the sealing module.

As already mentioned above, extrusion parameter(s) of each extruding station (e.g. extrusion temperature and/or extrusion speed) can be set to provide the desired degree of adhesion between the different layers of the sealing module allowing removal, preferably by peeling, of one or more layers. Also, each extrusion hole can be set for the extrusion of a different thermoplastic material with respect to one or more of the other extrusion holes and/or it can be set to different extrusion parameters (e.g. temperature and/or speed) with respect to one/or more different extrusion holes of the apparatus. It follows that the apparatus can be easily and effectively customized and controlled depending on the requirements of the sealing module to be produced by means of the apparatus.

According to an aspect, the extrusion holes are arranged one above the other. This arrangement is particularly useful when the layers have an open hollow section and are extruded onto an external body.

According to another aspect, the extrusion holes are concentric one with respect to the other. This allows to obtain closed section hollow layers, typically annular layers.

Typically, at least part of the extrusion holes have similar shapes, with size progressively increasing and they are arranged to provide a simultaneous extrusion.

"Similar shape" should be intended in the strict geometrical sense, i.e. two shapes are similar when they are identical, or when one shape is equal to the other shape with reduced or magnified dimensions. As an example, the extrusion outlets for the layers may be all annular, concentric and with progressively increasing diameter.

According to an aspect, the apparatus comprises at least a coolant feeder to feed a coolant to the extruded thermoplastic layers.

According to another aspect, the apparatus comprises a drier, that is preferably configured to at least partially dry the above mentioned coolant on the extruded thermoplastic material.

According to another aspect, the apparatus comprises a detaching agent feeder to feed a detaching agent to the extruded thermoplastic layers. As mentioned, the coolant and the detaching agent may coincide, or they can be mixed together.

The extrusion holes for the body (if the body is provided by extrusion) may be of different shape(s). Also the die for extruding the body could have a closed hollow section or an open section. In the case of an open section, the shape of the die can be rectangular with a cavity having a substantially an arch shape (preferably an half of a circumference).

According to an aspect of the invention (obviously applicable to all the embodiments herein disclosed), the thickness of the layers measured in a cross section of the sealing module is equal for all the layers. However, are not excluded embodiments wherein the thickness of a layer is different form the thickness of at least one another layer. Variable thickness can be for example obtained by attaching two or more layers, i.e. avoiding separation of one layer from at least another extruded layer.

In particular, according to an aspect, two or more layers can be extruded and substantially irreversibly attached one to the other, so as to form a unique element, i.e. so that in the final product they act as a single layer having a greater thickness than the single layer. As a result, the user is only allowed to peel these layers together one with the other, i.e. they act as a single layer. The present invention relates also to a sealing module that, as mentioned, has a hollow body and a plurality of inner layers superimposed one to the other provided within the body. The layers are removable one from the other to define the size of the cross-section of a housing extending between two opposite surfaces of the sealing module to house cables or pipes of different sizes. The plurality of layers is made of a thermoplastic material or both said body and said plurality of layers are made of a thermoplastic material. According to an aspect, the sealing module comprises a core member, the first layer being superimposed onto the core member.

According to an aspect, the core member is made of a thermoplastic material.

According to an aspect, a detaching agent is interposed between the first layer of said layers and the core member.

According to an aspect, a detaching agent is preferably interposed between at least two layers of said plurality of layers. More preferably, a detaching agent is interposed between the layers of the sealing module.

BRIEF DESCRIPTION OF DRAWINGS

With reference to the drawings, non-limiting embodiments of the present inventions will be now discussed, wherein.

MODE FOR CARRYING OUT THE INVENTION

In the following, possible embodiments of the method, apparatus and sealing modules according to the inventing will be disclosed.

More in detail, according to a first embodiment of the invention, which will be disclosed with exemplary and not limitative reference to FIGS. 1-11, the production of the sealing module according to the invention is carried out starting from the inner part thereof (i.e. the core member) and by an extrusion in sequence of the layers.

According to a second embodiment of the invention, which will be disclosed with exemplary and not limitative reference to FIGS. 12-22, the production of the sealing module is carried out starting from the external part thereof (i.e. the external body) and by an extrusion in sequence of the layers.

According to a third embodiment, which will be disclosed with exemplary and not limitative reference to FIGS. 23-31, the production of the sealing module according to the invention is carried out by simultaneous extrusion of the layers.

First Embodiment

According to a first possible embodiment, as for example shown in the FIGS. 1-11, a sealing module 1 comprises a hollow body 10 and in particular an external body, and a plurality of superimposed inner layers 11*a*-11*h* arranged inside the hollow external body 10.

As it will be discussed here below, the plurality of inner layers 11*a*-11*h* acts as an adapter portion 11 of the sealing module, in fact, the removal of one or more layers allows to modify the size of the cross section of the sealing module so as to adapt it to different cable or pipe sizes. It has to be noted that the term "adaptor" 11 is also used herein to indicate the plurality of superimposed inner layers 11*a*-11*h*.

Figure 1:
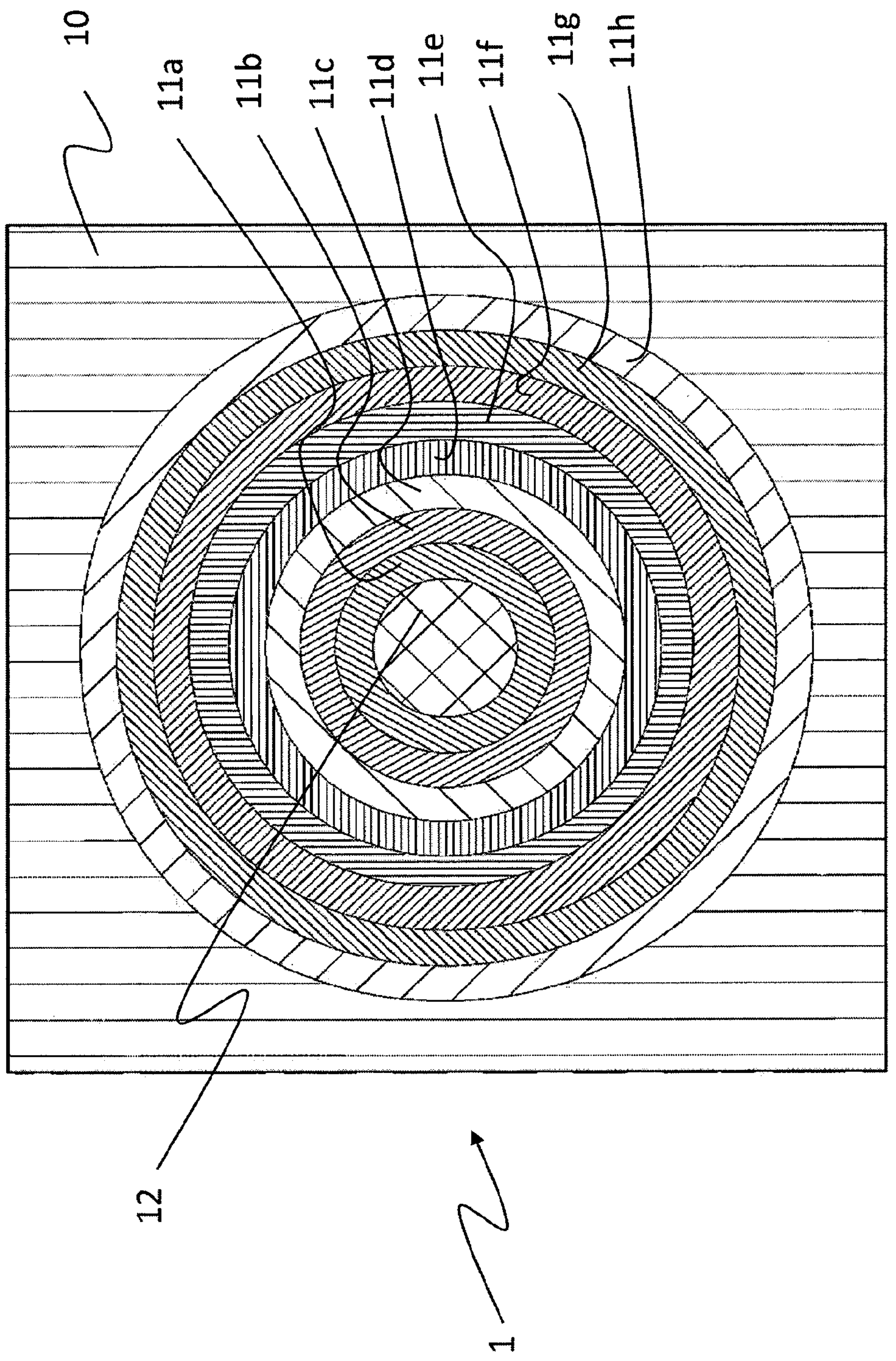
FIG. 1 is a sectional front view of a sealing module according to a possible embodiment of the invention.

In FIG. 1, the layers 11*a*-11*h* are placed around a core member 12, which is used during production of the sealing module 1. It is also possible that, the core member 12 may be removed at the end of the production step, so that, in the final piece, the core member 12 is absent.

The adaptor 11, i.e. the plurality of layers, is provided within the body 10, which is hollow so that the layers can be housed therein.

By doing so, a housing 14 extending between two opposite surfaces S1, S2 (see for example FIG. 2) of the sealing module, i.e. a pass through housing 14 extending from one surface of the sealing module to an opposite surface of the sealing module, can be provided. The size of the housing 14 can be varied by removing (e.g. peel off, preferably by hand) one or more layer(s).

The body 10 (in particular the one having a closed hollow section) is typically divided in two portions after the extrusion process (as discussed here below the body 10 can be partially or completely divided).

The layers 11*a*-11*h*, as better discussed later, are extruded and superimposed one to the other, so that the cross section of the layers is substantially the same (with obviously progressively increasing size). In other words, the layers are placed in sequence one around the other.

In fact, the layers 11*a*-11*h* have preferably a closed hollow section, e.g. as for example shown in FIG. 1, a circular closed hollow section, i.e. annular or ring shaped closed section. As mentioned above, different shapes can be used instead of a circular shape.

The body 10 can be extruded on the last (external) layer of the plurality of layer and it is preferably provided with an internal shape (internal surface) correspondent to the external surface of the last layer so as it can adhere thereon. However, the external shape of the external surface of the body 10 can be different from the shape of the internal surface. According to an aspect, as for example shown in the attached FIGS. 1-7, the body 10 (which is a closed section hollow body) has a rectangular or square shaped external surface, while it is provided with an internal surface that is correspondent to the surface of the last layer on which it is extruded. In the shown embodiment, the internal surface of the body 10 is circular as the external surface of the last (external) layer 11*h*. According to a different aspect, as mentioned, a body 10 may be obtained from a known forming process (e.g. molding or extrusion) and applied (e.g. glued or adhered) to the layers in a subsequent time with respect to the layers extrusion process.

The first layer 11*a* of the plurality of layer is extruded on the external surface of the core member 12 so that the internal surface of the first layer 11*a* have a correspondent shape with respect to the shape of the external surface of the core member.

Typically, according to a preferred aspect, all the layers have circular cross section. In any case, other shapes may be used as well. As an example, layers having a semi-circular cross section (corresponding to a half of a circular cross section and more in detail corresponding to a half of an annulus) may be used together with an open section hollow body, e.g. a body having a recess or indentation.

The layers 11*a*-11*h* adhere one to the other and are in contact one to the other to form an adaptor 11. At the end of the production step, the layers are constrained (by adhesion) one to the other, so as to prevent movement between the layers 11*a*-11*h*.

However, the adhesion between the layers, and between the first layer 11*a* and the core member 12, is loose enough to allow a user to remove (preferably by peeling) one or more layers 11*a*-11*h*, to modify the size (e.g. the diameter) of the housing 14 for passing a cable or pipe through the sealing module 1.

In particular, the size of the housing 14 is a function of the number of layers 11*a*-11*h* removed (i.e. peeled off) from the sealing module.

In fact, according to an aspect, a user can peel (preferably by hand) one or more layers 11*a*-11*h* to adapt the sealing module for the use with cables of different dimensions.

Figure 4:
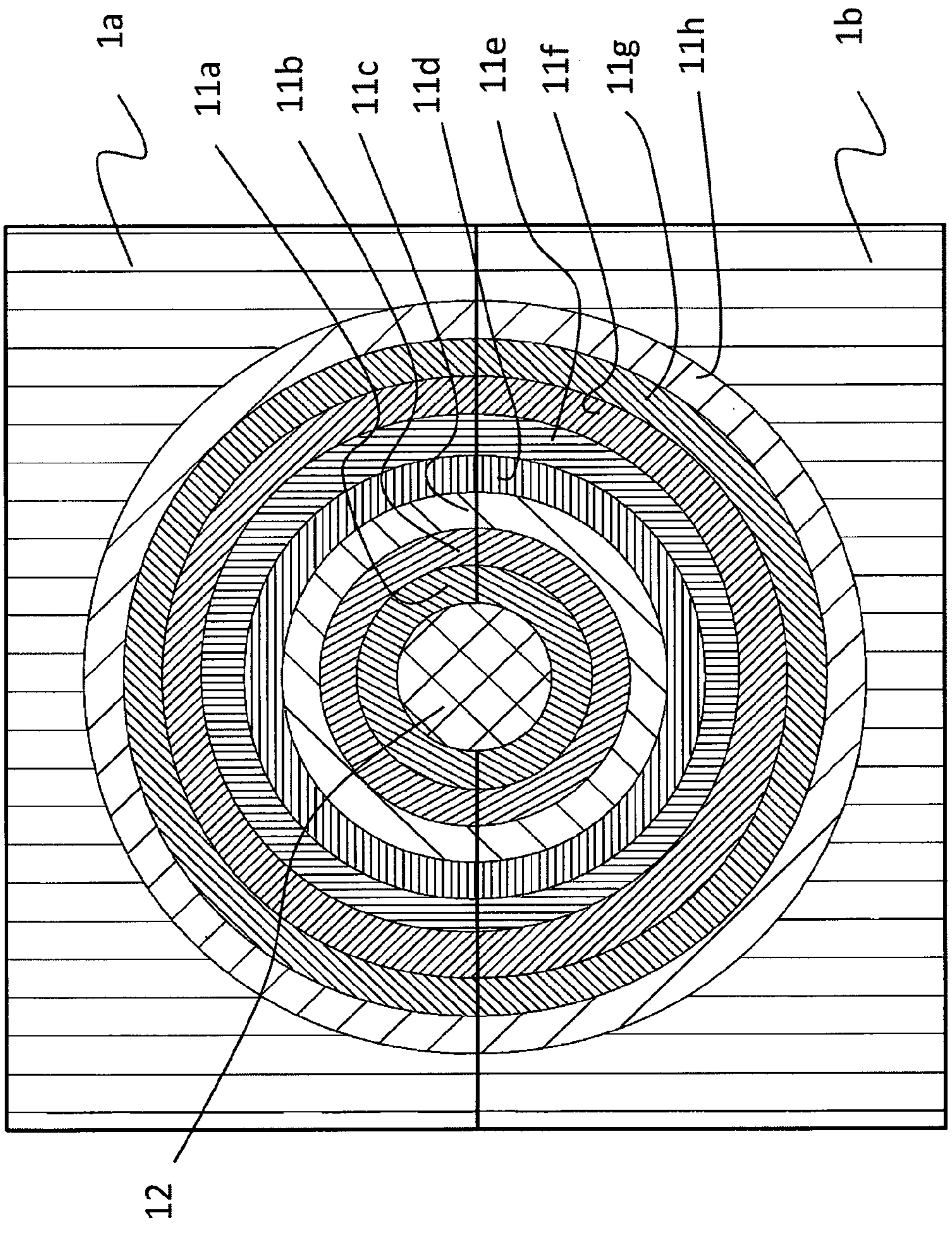
FIG. 4 is a sectional front view of the sealing module of FIG. 1, after being longitudinally cut into two halves.
Figure 5:
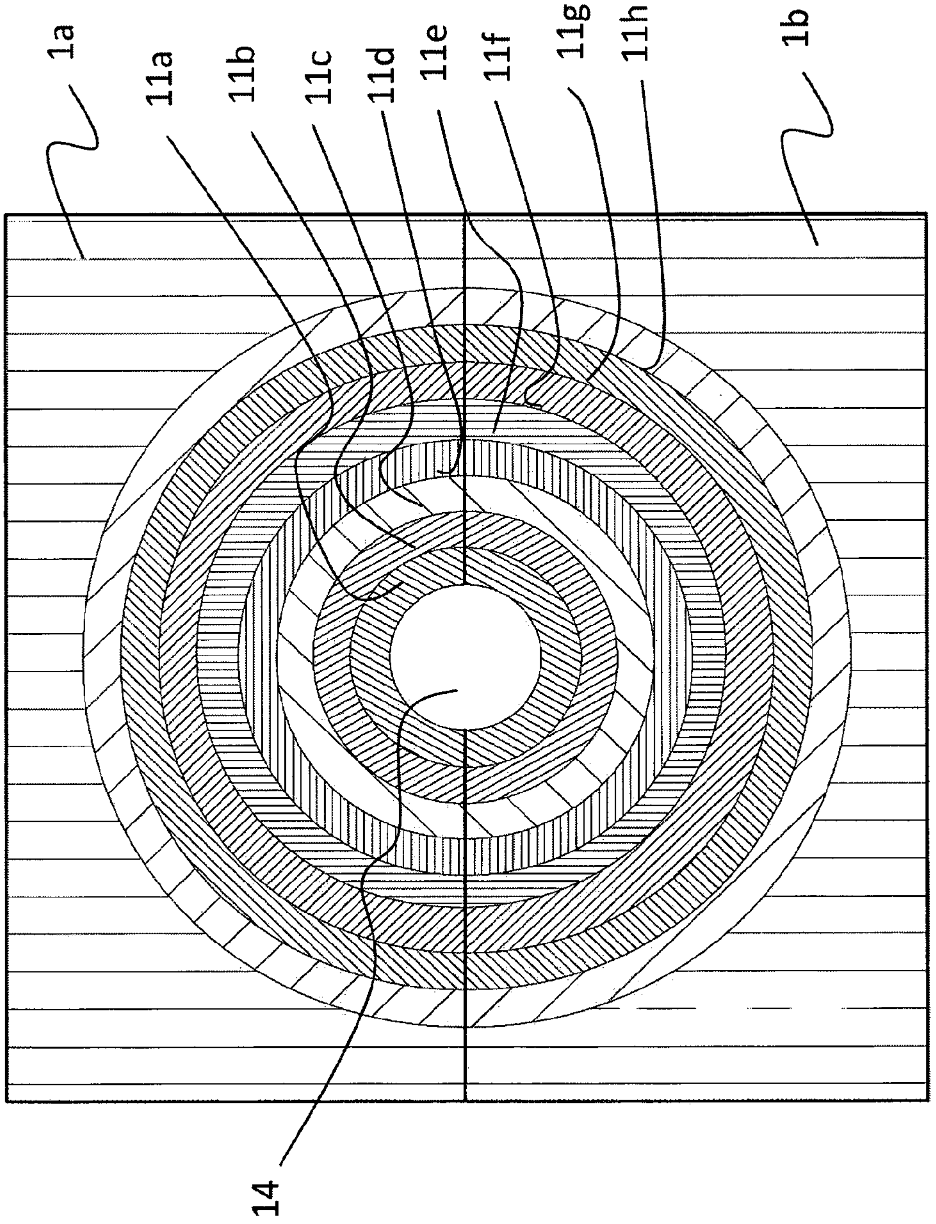
FIG. 5 is a sectional front view of the sealing module of FIG. 4, after removal of the core member.

As an example, in FIG. 4, no layer 11*a*-11*h* is removed, and the core member 12 is still within the adaptor 11. As a result, no pass through housing 14 is present because the sealing module is completely filled by the layers and the core member thus no passage for the cable is present, and a cable cannot be inserted within (and through) the sealing module 1. With reference to FIG. 5, no layer 11*a*-11*h* is removed, but the core member 12 is no longer present within the adaptor 11.

As a result, a hollow volume is formed within the sealing module. In other words an empty volume of the housing 14 is provided, so that a cable or pipe can be passed through the sealing module 1 via this empty volume of the housing 14. In this case, the opening has a small cross-section, so that only small cables/pipes (i.e. having small cross section) can be housed in the sealing module 1.

By removing one or more layer(s), the cross section of the housing 14 (i.e. the empty volume of the housing 14) can be increased and adapted to the size (e.g. external circumference) of the cable or pipe (or similar element) to be housed in the sealing module.

Figure 6:
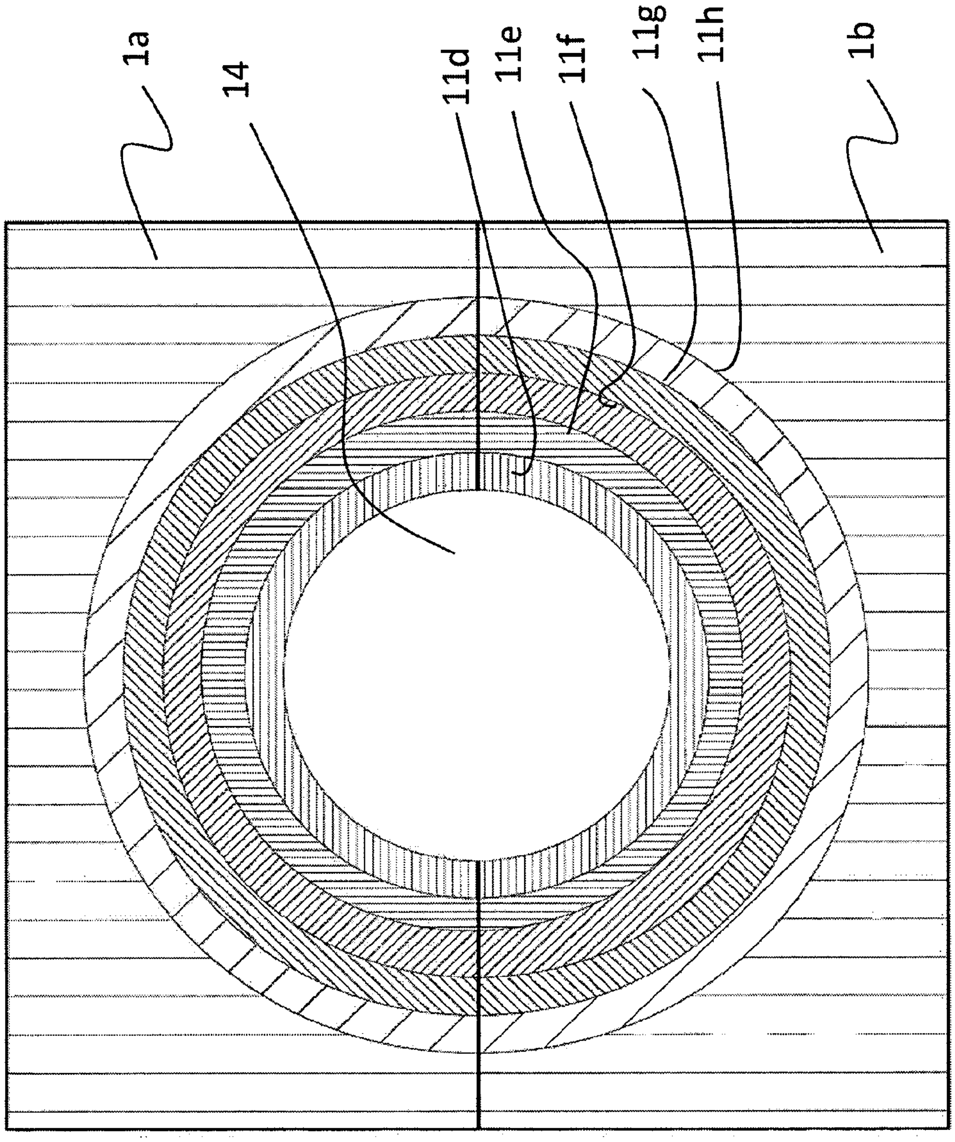
FIG. 6 is a sectional front view of the sealing module of FIG. 5, after removal of the three layers.

As an example, in FIG. 6, layers 11*a*-11*c* have been removed from the sealing module, so that the cross section of the housing 14 (i.e. empty space or not occupied space of the housing) is bigger with respect to the one of FIG. 5. As a result, bigger cables/pipes can be housed within the sealing module.

In the shown embodiment, the layers have substantially identical thickness one with respect to the other. Also on this case, it has to be noted that this condition is preferred, but it is not strictly required. The extrusion dies may thus be configured so as to produce at least two layers having thickness different one from the other. In addition (or as an alternative), two or more layers may be extruded so as to be substantially permanently attached one to the other (e.g. by properly choosing the material, the extrusion temperature, avoiding the presence of a detaching agent, etc.). As a result, the sealing module will be provided with a reduced number of layers with respect to the number of layers that are extruded, because part of the extruded layer are attached one to the other so as to form a single thicker layer in the sealing module. As an example, layers 11*b* and 11*c* may be extruded so as to be permanently joined one to the other so as to form a single layer having a thickness that is twice the thickness of the other layers. In other words, the sealing module of this example will not be provided with eight layers, but it will be provided with seven layers, one which (i.e. 11*b*+11*c*) has a greater thickness with respect to the other ones. According to an aspect, the body 10 and the layers 11*a*-11*h* (i.e. the adaptor 11) are made of a thermoplastic material, allowing an extrusion in sequence of the sealing module 1. Otherwise, only the layers 11*a*-11*h* may be extruded of thermoplastic material and extruded in sequence, while a closed section hollow body 10 (or at least one open section hollow body) may be subsequently applied to the layers 11*a*-11*h*.

According to the invention, suitable thermoplastic material are thermoplastic elastomers, thermoplastic rubbers (such as Santoprene), thermoplastic polyurethanes (TPU), thermoplastic fluoropolymer elastomers (e.g. the one knows as Viton), thermoplastic copolyester elastomers (e.g. the one traded with the name Hytrel), thermoplastic polyamides (e.g. Nylon or PA-12).

These and other thermoplastic materials are suitable materials for the production body 10 and the layers 11*a*-11*h*.

The core member 12 can be made of a thermoplastic material as well, e.g. the materials of the body and the layers 11*a*-11*h*.

In particular, the core member 12 can be extruded in the first step of production of the sealing module, or it can be produced separately from the sealing module 1, and used as a base for the extrusion of the sealing module 1. The cross section of the core member can be full (e.g. a circular full section) or hollow (e.g. an annular cross section). It has to be also noted that as an example, the core member 12 may be a rope or a cable that is used as a basis for the extrusion of the layer, and also as a driving member, i.e. a member that pulls the material after it has been extruded.

In the case the core member 12 is provided by extrusion, i.e. in a first step of extrusion of thermoplastic material, what is herein disclosed and/or claimed with respect to a first layer and a subsequent layer of the adapter can be applied to the core member and a layer of the adapter extruded on the external surface of the core member. More in detail, the first layer made of thermoplastic material extruded on the external surface of the core member preferably adhere on the core member and can be removed (peeled off) from the core member.

Returning now on the extrusion process, as before mentioned, an extrusion in sequence is a process where extrusion occurs in different steps at different places (e.g. at different extrusion dies), and the material extruded in the second (or subsequent) step is extruded and the deposited onto the material extruded in the preceding step.

Figure 7:
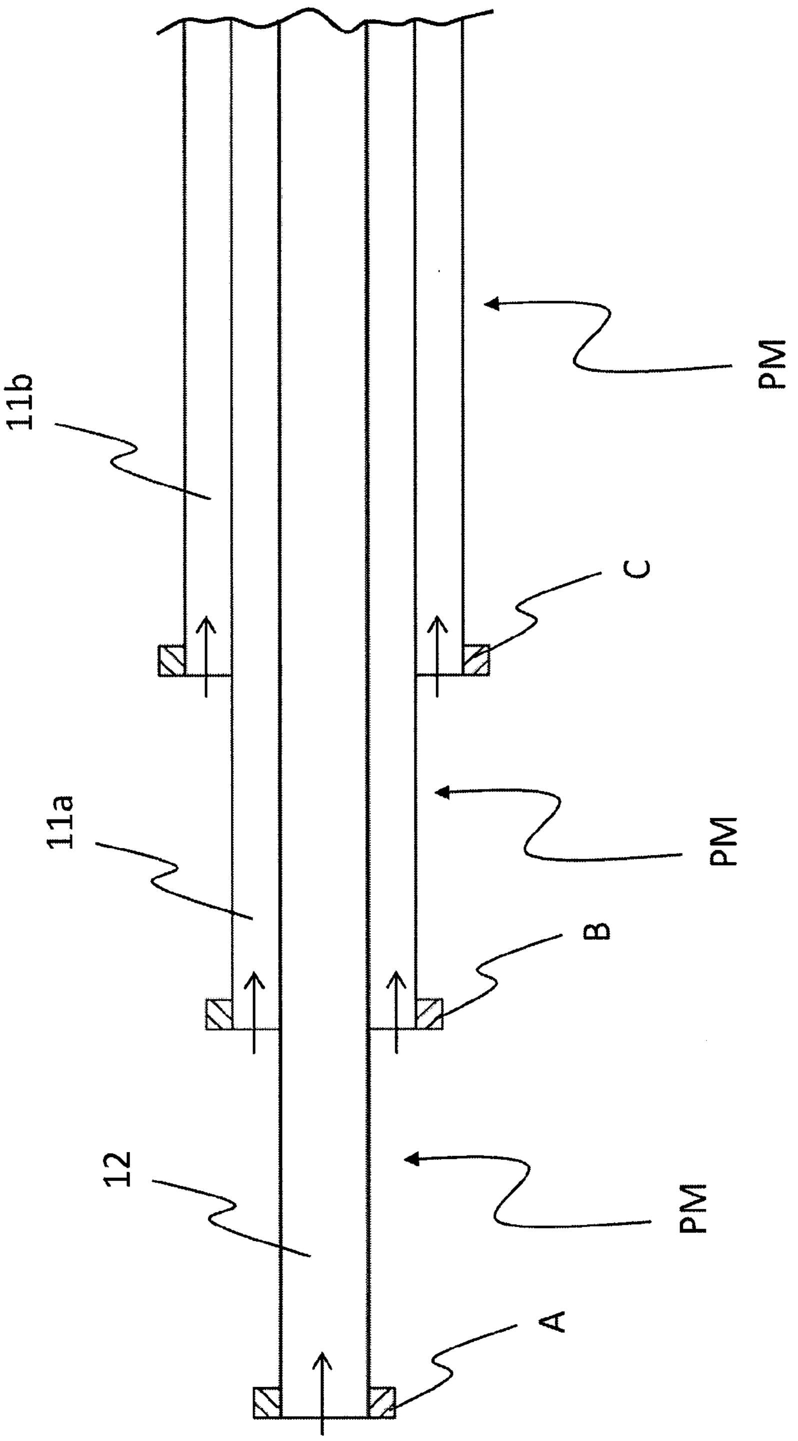
FIG. 7 is a schematic and simplified view of an extrusion in sequence to produce a sealing module according to a first embodiment of the invention.

As for example shown in FIG. 7, a schematic representation of the above mentioned method of "extrusion in sequence" is shown.

This figure is only illustrative and its only purpose is to provide a schematic reference for the description of the extrusion process in sequence. It has to be noted that in FIG. 7 some elements, such as a source of solid thermoplastic material (e.g. a feeder of hopper containing solid thermoplastic material), etc., are omitted and the other elements are schematic and simplified. In particular, FIG. 7 shows schematically the extrusion in sequence of the core member 12 and of the first two layers 11*a* and 11*b*.

At first, at an extrusion die A, the core member 12 is extruded.

Subsequently, further thermoplastic material is delivered to an extrusion die B, distant from the die A, and extruded onto the core member 12 to form the first layer 11*a* of the adaptor 11. In a similar manner, thermoplastic material is delivered at a die C, to be extruded onto the first layer 11*a*, to form the second layer 11*c*.

This operation is repeated a number of times to form all the layers of the adaptor 11.

Finally, after the last layer of the adaptor has been extruded (e.g. layer 11*h* in the adaptor of the other figures), a closed section hollow body 10 is extruded onto the last (external) layer 11*h*, or one or more open section hollow bodies are applied to the external layer 11*h*.

Figure 7A:
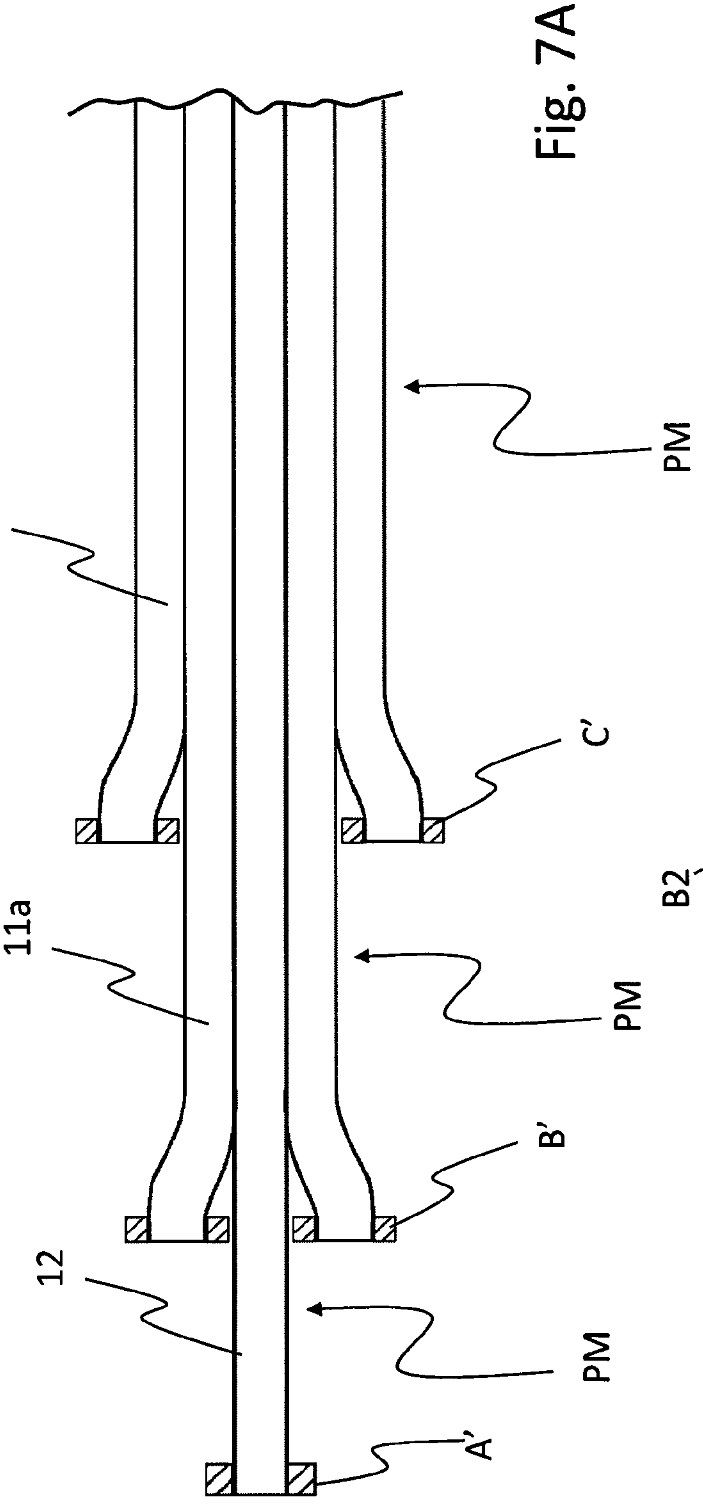
FIG. 7A is a schematic and simplified view of an extrusion in sequence alternative to the one of FIG. 7.
Figure 7B:
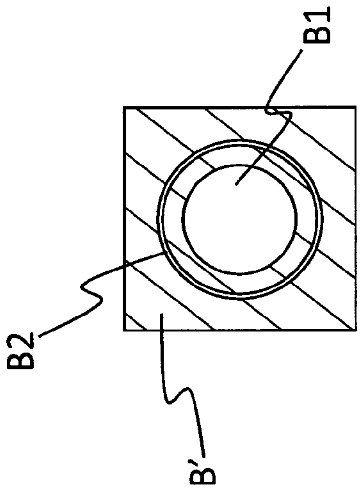
FIG. 7B is a front view of an extrusion die for the extrusion of FIG. 7A.

An alternative configuration is shown in FIGS. 7A and 7B. In FIG. 7A, after its extrusion at extrusion die A', the core member 12 is delivered to a second extrusion die B'. The second extrusion die B', schematically shown in FIG. 7B, is provided with a central hole B1 to allow passage of the core member 12, and with an annular hole B2 for the extrusion of the first layer 11*a*. The annular hole B2 is placed around the central hole B2 to allow a better deposition of the extruded material PM of the first layer 11*a* on the core 12. The third die C' is similar to the second die B', but it is provided with different size. In other words, at least the annular hole of third die C' (preferably also the central hole of third die C') is provided with a bigger size.

In the shown embodiment, all the layers 11*a*-11*h* and the core member have identical cross section (except for the size), i.e. circular in this particular case. In other words, the shapes of the cross section of the layers and of the core member are "similar", in a strict geometrical meaning.

The body 10 has a rectangular cross section. This may be achieved my means of a rectangular die.

Otherwise, the sealing module 10 can be cut after the extrusion process, to shape the body as desired.

As also discussed here below, it has to be noted that the rectangular or square section of the body 10 (external body 10) is not limitative. In fact, the body 10 can be extruded, or cut, so as to provide different shape of the cross section, for example the body 10 can be directly extruded or subsequently cut to provide a polygonal section, the number of lateral sides being selected according to the need, or a circular or oval section, etc.

It has to be also noted that, as already mentioned, in the shown schematic embodiment, the core member 12 is extruded at a first die A. It is also possible that, the core member may be produced separately (and thus before) the sealing module 1. In this case, the core member already formed can be delivered to the die B (which thus becomes the "first" die), to allow extrusion of the first layer 11*a* around the core member 12. The die A is thus omitted, or used only as a guide for the core member 12.

As mentioned the extrusion dies A, B, C are separated one from the other, and they are also typically aligned.

In other words, all the dies typically share their respective axes (in other words the axes of the dies are coincident so as to form one axis corresponding to the axis along which the extrusion process is carried out).

Extrusion parameters can be e.g. chosen between the extrusion speed, the extrusion temperature and the distance between the dies.

In fact, according to an aspect, the distance between the dies, and/or the extrusion speed and/or the extrusion temperature are set in order to allow a good adhesion between the layers, which should at the same time not be too strong, in order to allow a user to remove, preferably to peel off by hand, one or more layers 11*a*-11*h*.

For example, the extrusion temperature can be set in the range 160° Celsius-240° Celsius. The extrusion speed, that is corresponding to the moving speed of the extruded thermoplastic material between the extruding stations, can be for example in the range 1 meter/minute-2 meter/minute, preferably in the range 1 meter/minute-1.5 meter/minute.

Usually, between two subsequent extrusions (e.g. between dies B and C) the extruded thermoplastic material PM can be cooled.

With the expression "extruded thermoplastic material" it is meant the material exiting a generic die. As an example, with reference to die A, the "extruded thermoplastic material" PM is the core member 12. With reference to die B, the "extruded thermoplastic material" PM is the group comprising the core member and the first layer 11*a*, while the "extruded thermoplastic material" PM for die C is the group comprising the core member 12, the first layer 11*a* and the second layer 11*b*.

This can be done via natural cooling (exposure of the material to ambient air), or by delivering a coolant to the extruded thermoplastic material PM.

As better discussed later, with reference to the apparatus for example shown in FIGS. 8 and 9, water may be delivered (e.g. sprayed) onto the extruded thermoplastic material. As a result, one or more driers may be provided between two subsequent extrusion dies (e.g. between dies B and C) to dry the coolant.

According to an aspect, in order to prevent a too strong adhesion, a detaching agent may be provided before the thermoplastic material is extruded (e.g. in the feeder supplying solid thermoplastic material to the extrusion die) and/or after the thermoplastic material has been extruded, i.e. after the thermoplastic material exits the extrusion die. In the latter case, the detaching agent can be delivered to the extruded thermoplastic material PM before a subsequent extrusion step (e.g. between dies A and B and between dies B and C).

The coolant itself may be the detaching agent, or the coolant may contain the detaching agent (e.g. the detaching agent can be mixed or added or emulsified with a coolant).

Figure 2:
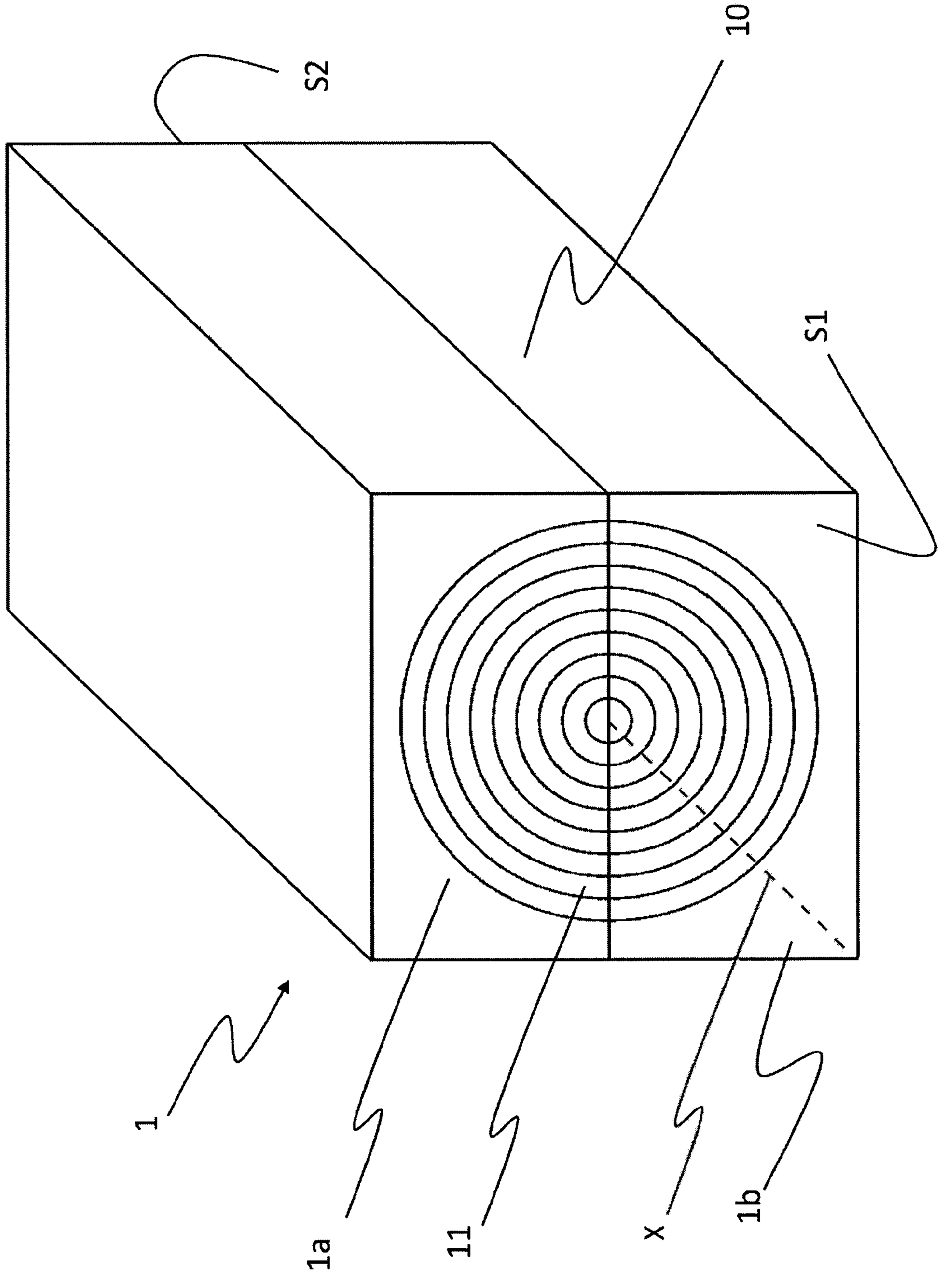
FIG. 2 is a perspective view of the sealing module of FIG. 1, wherein the lines along which it is longitudinally cut into two halves are also shown.
Figure 2A:
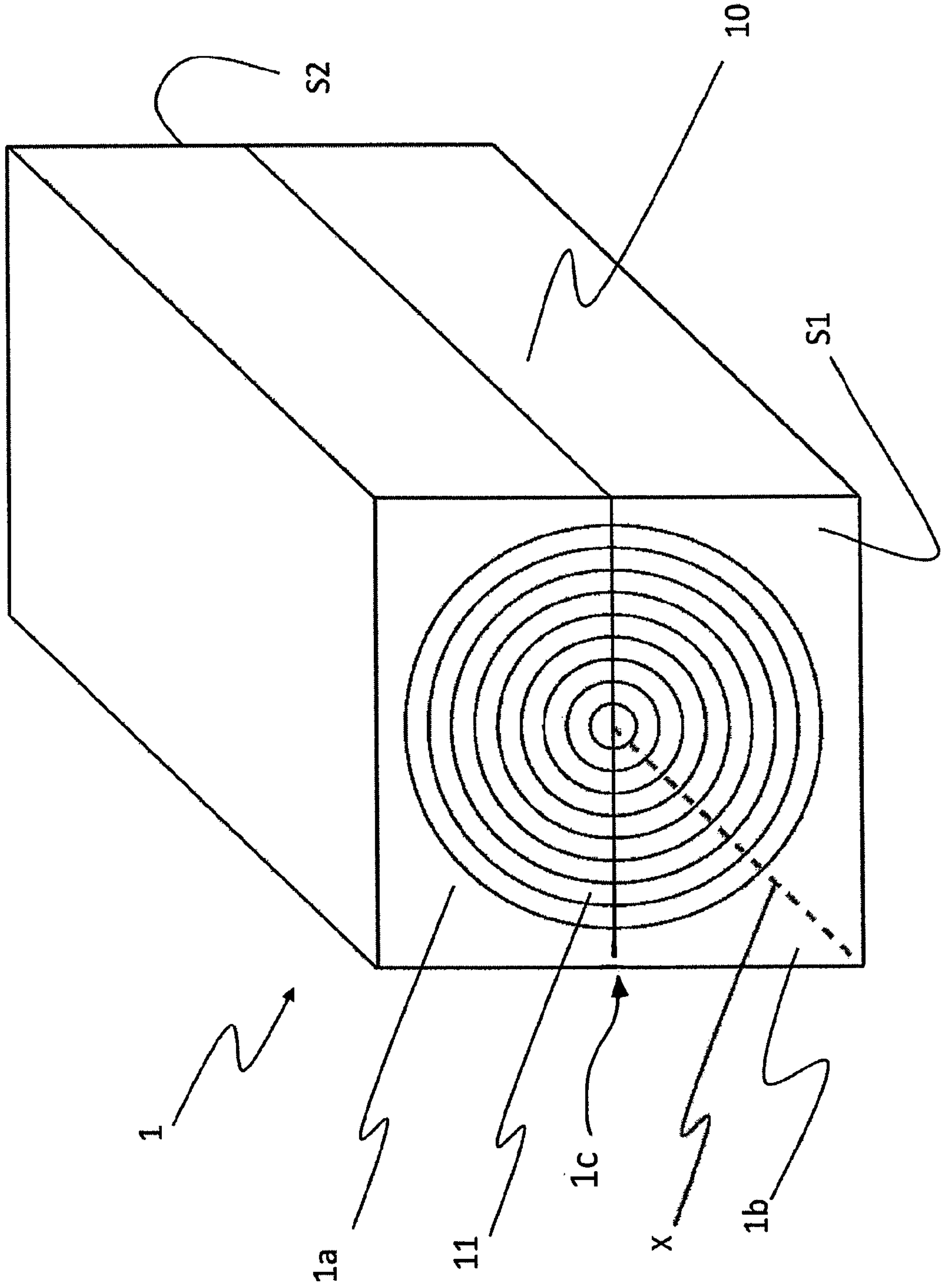
FIG. 2A is a perspective view of the sealing module, wherein the two portions of the sealing module are not completely cut and are partially connected one to another.
Figure 3:
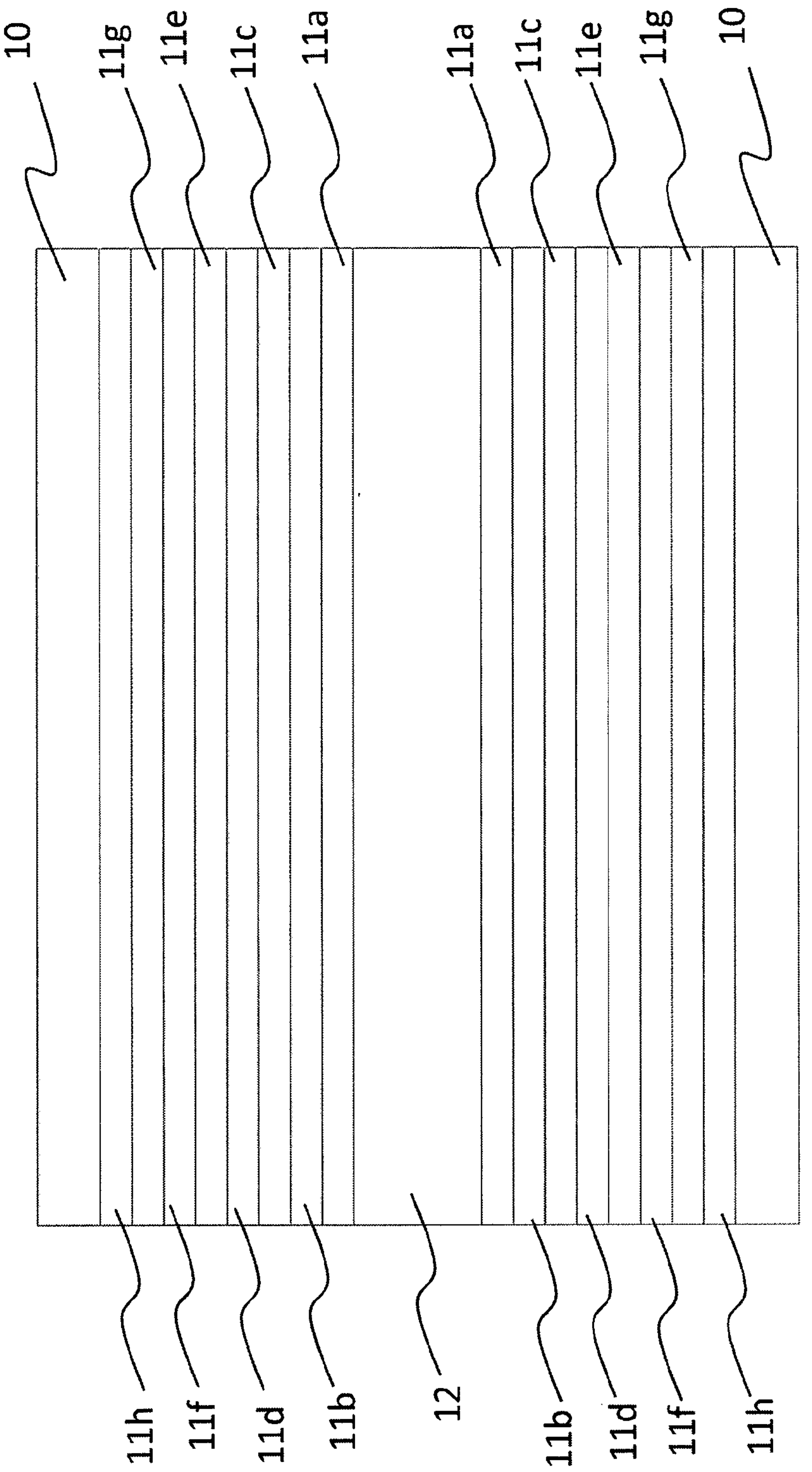
FIG. 3 is a schematic, sectional plant view of the sealing module of FIG. 1 (the view is rotated by 90 degrees)

According to an aspect, silicone as detaching agent is used added to water used a coolant. After completion of all the extrusion steps, the core member may be removed from the sealing module 1. Also, the sealing module 1, in particular the closed section hollow body 10 and the adaptor 11 (possibly also the core member 12, if present), can be completely or partially cut into two portions 1*a*, 1*b*. FIG. 2A shows a sealing module that is partially cut. As already mentioned above, with the expression partially cut it is meant that the sealing module, and in particular its external body is not completely cut so as to keep an integral connection part 1*c* between two portions 1*a*, 1*b* of the sealing module. In particular two portions 1*a*, 1*b* of the external body 10 are formed, which are constrained one to another and can be moved (e.g. rotated) one with respect to another, for the cable insertion, while the two portions are constrained in at least one point or area of connection 1*c*. This area of connection is preferably arranged close to (in correspondence of) the external surface of the external body 10 so that this part can act as a hinge allowing the relative rotation of the two portions of the sealing module. The extension of the area of point of connection 1*c* can be varied with respect to the one shown in FIG. 2A and for example can be limited to the longitudinal edge of the two portions 1*a*, 1*b*.

According to an aspect, as already mentioned above, the two portions 1*a*, 1*b* can be constrained one to another by providing a constraining or connection area between the two portions, for example by providing an additional joining part or by providing an adhesive or by welding, thus joining the two portions. In general the two portions are joined or connected together in a point or area of connection 1*c*. As already mentioned above, this area of connection is preferably arranged close to (or in correspondence of) an external surface of the external body so that this part 1*c* can act as a hinge allowing the relative rotation of the two portions of the sealing module. The sealing module 1 is cut along the axis X of the housing 14, i.e. along the axis passing through the two opposite surfaces of the sealing module through which the cable is passed. It has to be noted that the axis X corresponds to the axis of the cable or pipes that is passed through the sealing module. Typically the sealing module 1 is cut along the axis X, so as to be divided (partially or completely) into two portions 1*a*, 1*b* substantially symmetrical. This operation simplifies the removal of one or more layers 11*a*-11*h*, and the insertion of a pipe or cable within the housing 14.

Figure 6B:
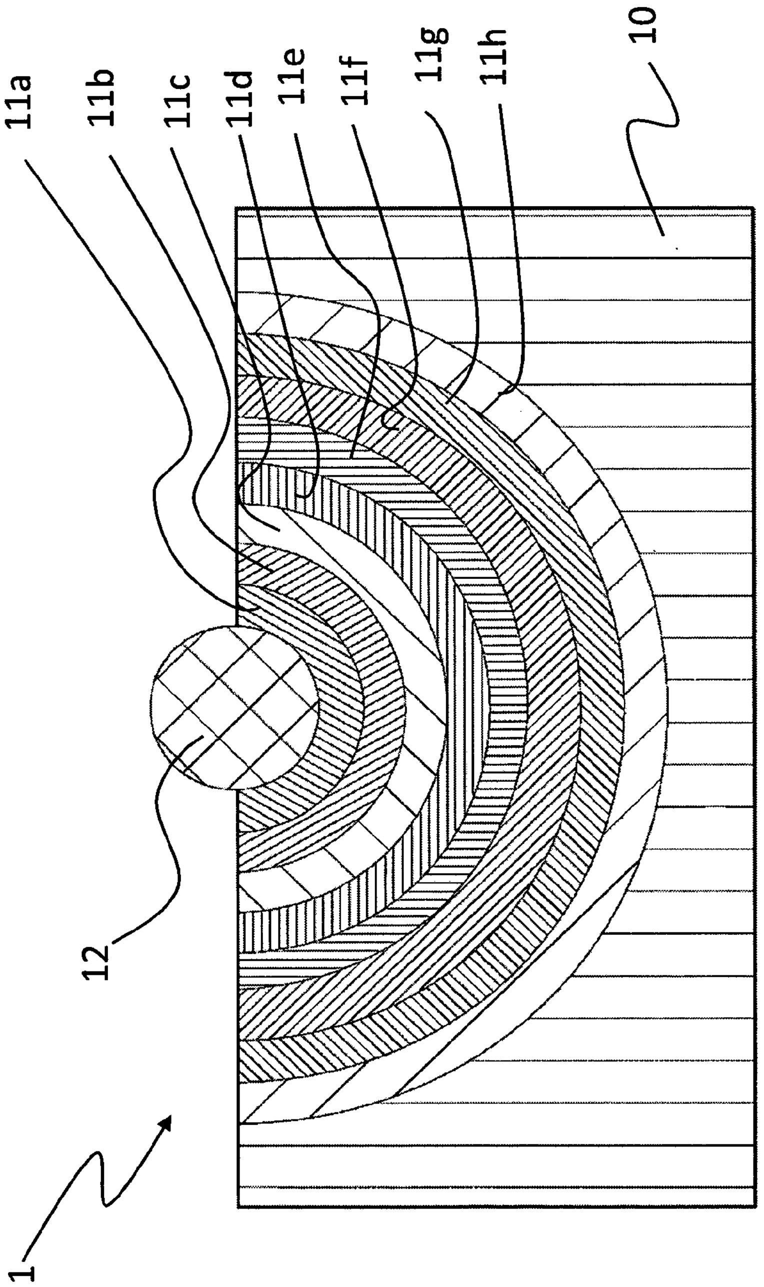
FIG. 6B is a sectional front view of a sealing module having an open section hollow body.

A sealing module 1 having a closed section hollow body 10 has been shown in the figures in detail. An open section hollow body may be formed such that its finished product is e.g. similar to the portion 1*a* or 1*b* of the sealing module 1 shown in the FIGS. 1-6. A sealing module 1 from an open section hollow body 10 is e.g. shown in FIG. 6B.

In the shown embodiment, all the layers 11*a*-11*h* and the core member have identical cross section (except for the size), i.e. circular or of a half of circle (half of a annulus) in this particular case. In other words, the shapes of the cross section of the layers and of the core member are "similar", in a strict geometrical meaning.

For example, the body 10 can be provided with a rectangular cross section with the cavity preferably having a substantially arch shape. This may be achieved by means of a rectangular die having a corresponding substantially arch shape cavity.

The layers 11*a*-11*h* have can have therefore shape of half of circle (half of a annulus).

Figure 8:
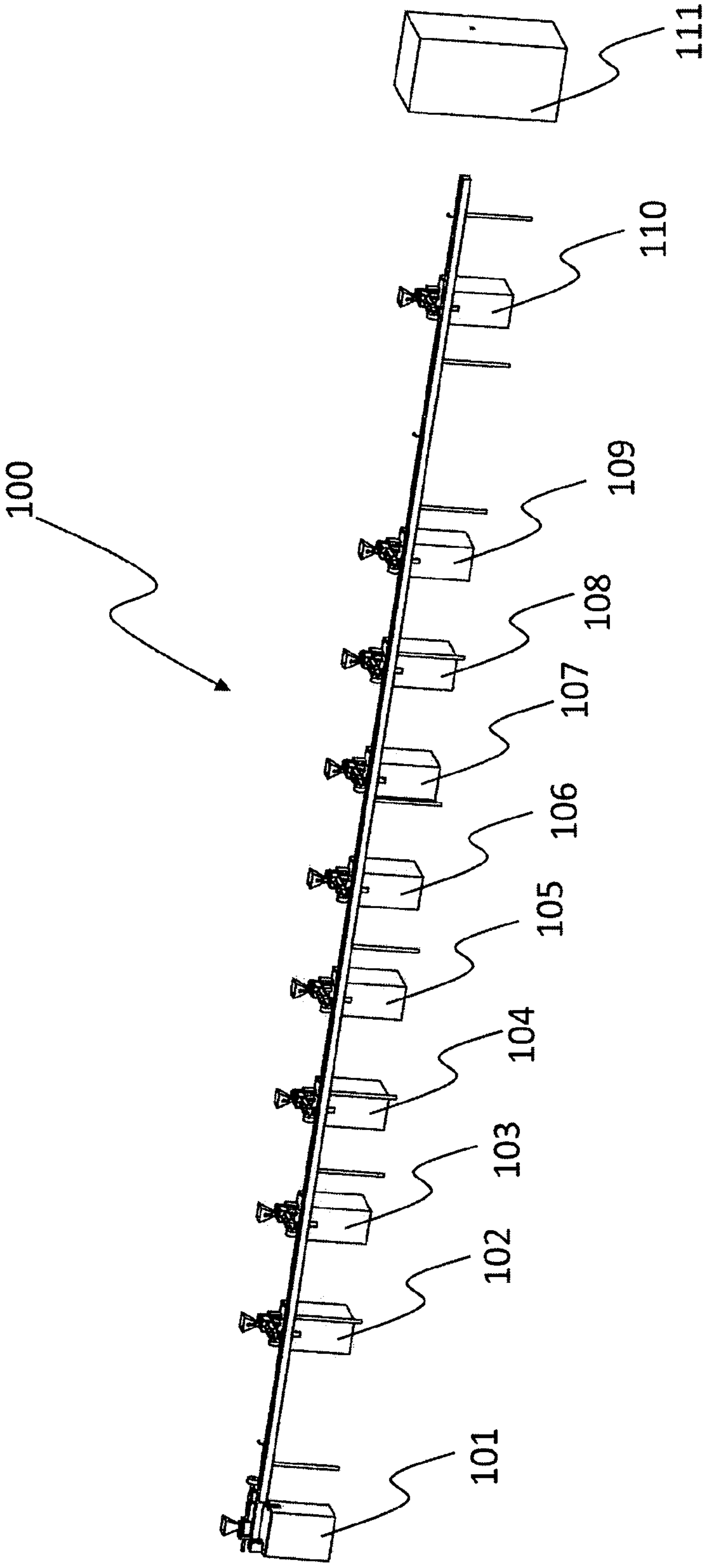
FIG. 8 is a perspective and simplified view of an apparatus according to a first embodiment of the invention for producing a sealing module by means of an extrusion in sequence.

A first possible embodiment of an apparatus 100 for the production of a sealing module 1 is disclosed with reference to FIGS. 8-11. In FIG. 8 the main elements of the apparatus 100 are shown.

In more detail, the apparatus 100 is provided with a plurality of extruding stations 101, 102, 103, 104, 105, 106, 107, 108, 109, 110. The number of extruding stations may vary with respect to what shown. For example, with reference to the figures:

station 101 extrudes the core member 12;
station 102 extrudes layer 11*a* on the core member 12;
station 103 extrudes layer 11*b* on layer 11*a;*
station 104 extrudes layer 11*c* on layer 11*b;*
station 105 extrudes layer 11*d* on layer 11*c;*
station 106 extrudes layer 11*e* on layer 11*d;*
station 107 extrudes layer 11*f* on layer 11*e;*
station 108 extrudes layer 11*g* on layer 11*f;*
station 109 extrudes layer 11*h* on layer 11*g;*
station 110 extrudes the body 10 on layer 11*h;*

Figure 9:
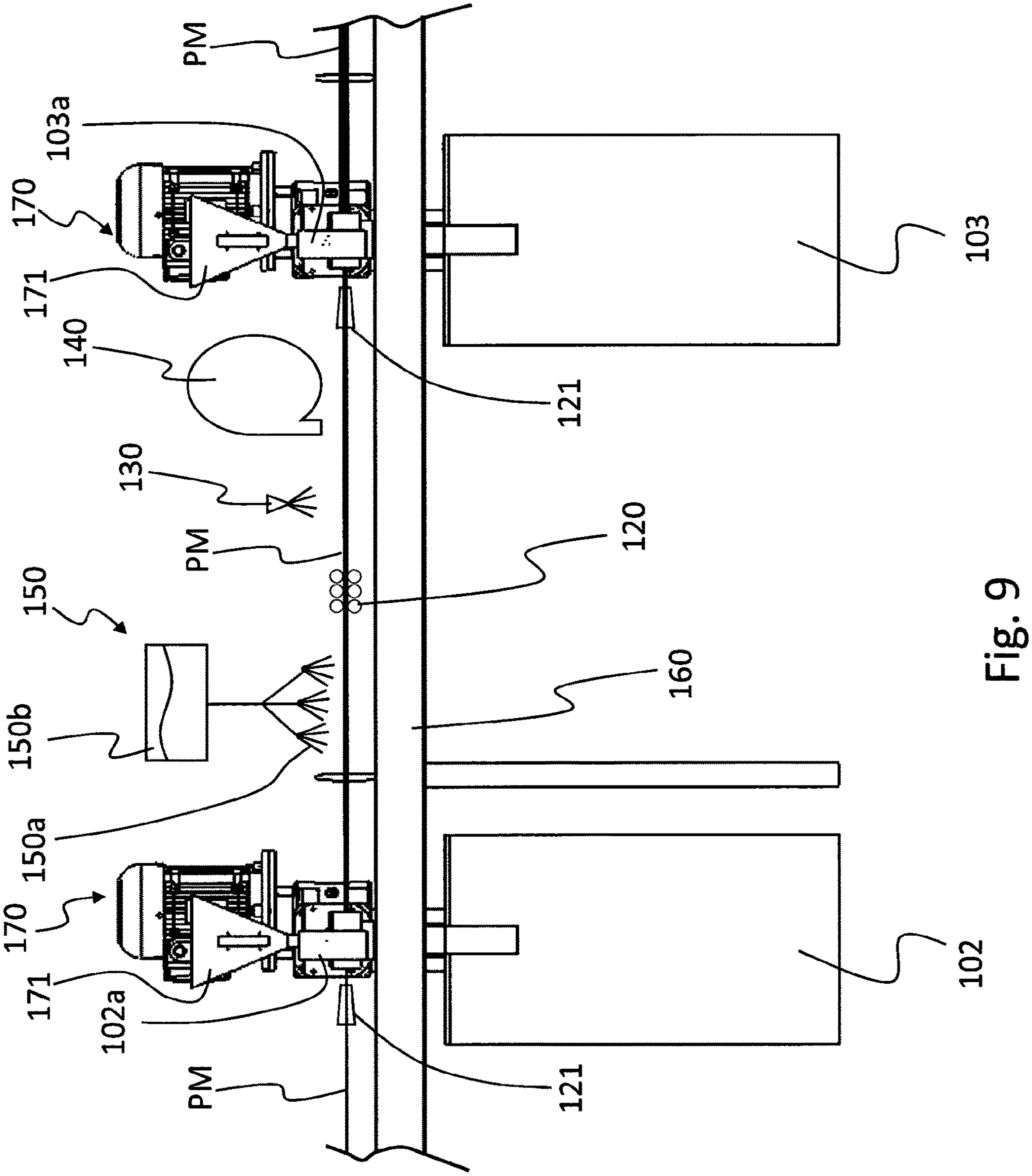
FIG. 9 is an enlarged view of a detail of FIG. 8, with components of the apparatus added in a schematic and simplified view.

Each extruding station 101-110 is provided with an extrusion die 102*a*, 103*a*, two of which are visible in greater detail in the partial enlarged view of FIG. 9. From now on, reference will be made to the two shown extruding stations 102 and 103, as well as to the extrusion dies 102*a*, 103*a*. However, the following description applies as well to all the other extruding stations and extrusion dies, and in particular to all of the couples of subsequent extruding stations.

As known, the extrusion dies 102*a*, 103*a* comprise a body and a hole within the body. It has to be noted that the shape of the hole (and in particular its cross section shape) correspond to the shape of body, layer or core member to be extruded. For example the hole can be circular, annular, or have the shape of half a annular shape, ecc. Thermoplastic material is forced through the hole of the extrusion die 102*a*, 103*a*, so that the external shape of the thermoplastic material is shaped as the hole of the extrusion die.

The extruding stations 102, 103 also provided with known means (not shown in detail) to feed thermoplastic material to the extrusion die 102*a*, 103*a* and means for melting the thermoplastic material (e.g. a melting cylinder) and a moving means such as a moving screw.

It has to be noted that according to an aspect of the invention, the extruding station according to the invention comprises a pump, e.g. a volumetric pump, or other suitable supply means, to effectively control the quantity of melted thermoplastic material supplied to the extrusion die.

The pump, or similar means, is preferably provided upstream of the extrusion die. Preferably the pump, or similar means, is arranged between the extrusion die and the melting cylinder.

By doing so it is possible to reach high accuracy in controlling the thickness of each layer of thermoplastic material.

The extruding stations 101-110 are preferably also disposed so that the extrusion dies 102*a*, 103*a* are aligned one after the other, i.e. so that the extruded thermoplastic material PM from one extrusion die 102*a* is naturally directed towards the subsequent extrusion die 103*a*. In other words, the axes of the extrusion dies (i.e. of the holes of the extrusion dies 102*a*, 103*a*) substantially coincide.

In order to provide the above discussed extrusion in sequence, each extrusion die 103*a* has preferably a greater dimension with respect to the previous extrusion die 102*a*. With "die of greater dimension" it is meant that an extrusion die 103*a* has a hole (in particular the hole for the material to be extruded) greater than the hole of the previous extrusion die 102*a*. This condition (which is shown in simplified manner also in FIG. 7) does not obviously apply to the extrusion die of the first extruding station 101, because no previous "extrusion die" exists.

Guiding means 120, 121 (shown schematically in FIG. 9) are preferably provided to guide the extruded thermoplastic material PM between the various extruding stations 102, 103. In the figures, rollers 120 are shown, which support the extruded thermoplastic material PM from between extrusion dies 102*a* and 103*a*. The rollers 120 may be motorized, so as to pull the extruded thermoplastic material. A greater number of rollers is normally used with respect to what shown.

Also rollers are typically provided between each couple of extruding stations. The rollers may be driven by a common motor (not shown), so that all the rollers are rotated at the same angular velocity. As mentioned, the core 12 may be also used as the element for driving the extruded material PM.

According to an aspect, inclined surfaces 121 at the extruding dies 102*a*, 103*a* may be used, so as to precisely direct the extruded thermoplastic material PM within the extrusion dies 102*a*, 103.

In general, fixed and/or movable guiding means 120, 121, may be used to guide and/or move and/or direct the extruded thermoplastic material PM between the different extruding stations 102, 103.

In general, the guiding means allow to guide and support the extruded thermoplastic material PM, and to direct it towards the subsequent extrusion die (if present). As mentioned, the guiding means can be motorized to push or pull the extruded thermoplastic material PM.

The apparatus 100 may be provided with various means to carry out different operations on the extruded thermoplastic material PM between two subsequent extruding stations 102, 103. Examples of these means are for example schematically shown in FIG. 9.

The apparatus 100 may be provided with a coolant feeder 150 to provide coolant to the material extruded from an extrusion die 102*a*, before it reaches the subsequent extrusion die 103*a*. The coolant, typically water, is preferably delivered to the extruded thermoplastic material PM in misted form, e.g. by means of one or more sprayers or sprinkler 150*a*.

Also, the speed and/or the extrusion temperature, together with the distance between two subsequent extruding stations 102, 103, may be set to provide for drying of the coolant at ambient temperature. Otherwise, a drier 140 may be provided to dry the coolant. The drier 140 may be arranged e.g. to direct air (e.g. hot air) towards the extruded thermoplastic material. A drier 140 may be also provided without the coolant feeder, e.g. to generally dry the extruded thermoplastic material exiting an extrusion die 102*a*.

Below the extrusion dies, a recovery tray 160 may be provided, usually to recover the coolant falling from the extruded thermoplastic material PM.

Furthermore, a detaching agent feeder 130 may be user to deliver a detaching agent to the extruded thermoplastic material PM. The detaching agent may be for example an oil or other suitable lubricant, or can be in the form of a powder (e.g. talc powder).

It has to be noted that a detaching agent, can be provided in the feeder of thermoplastic material of the extruding station. In other words the detaching agent, for example in the form of grains or pellets, can be added to the feeder of solid thermoplastic material at the extruding station. The pellets or grains of detaching agent are dispersed in the melted thermoplastic material and, in particular, the detaching agent emerges at the external surface of the extruded thermoplastic material. This allows to provide a detaching action when a thermoplastic material is subsequently extruded thereon so that the adhesion between the layer is such as to allow removal, preferably by peeling, of one or more layer.

According to an aspect, detaching grains or pellets, e.g. of the type known in the field of extrusion of thermoplastic material can be added to the thermoplastic material in the feeder of hopper of the extruding station.

Otherwise, as before mentioned, a detaching agent may be mixed with the coolant.

As an example, the coolant feeder 150 may comprise a coolant tank 150*b*, housing the coolant in liquid form. The detaching agent, e.g. silicone, may be e.g. dispersed within the coolant in the coolant tank 150*b*.

The last extruding station 110 is used to extrude the body 10 of the sealing module 1. A cutting station 111 may be provided to cut the extruded thermoplastic material PM, to obtain directly a sealing module 1, or a semi-finished product. As an example, the last extruding station may extrude a body having a cylindrical section. Further cutting operation may be provided (typically on a different apparatus from the apparatus 100) to e.g. cut the body into a rectangular section.

It has to be noted that the body 10 (external body 10) can be extruded or cut so as to provide different shape of the cross section, for example the body 10 can be directly extruded or subsequently cut to provide a polygonal section, the number of lateral sides being selected according to the need, or a circular or oval section, etc.

The feeding of plastic material to the extruding stations 101-110 may be operated in different ways. In the embodiment of FIGS. 8 and 9, each extruding station is provided with a (known) source 170 of material to be extruded. The source 170 typically comprises (in a known manner) a hopper 171 to receive plastic material, and to feed it to an extrusion screw (not shown) that melts (possibly together with a relevant heater) and forces the material towards the relevant extruding station 101-110.

Figure 10:
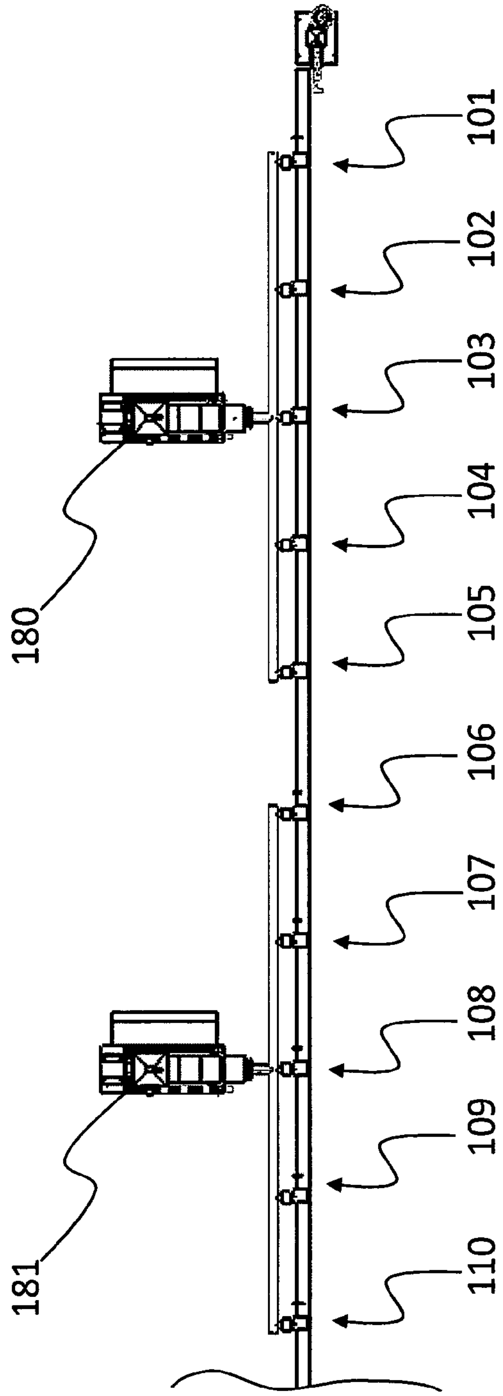
FIG. 10 is a plant schematic view of an alternative apparatus according to a first embodiment of the invention for producing a sealing module by means of an extrusion in sequence.
Figure 11:
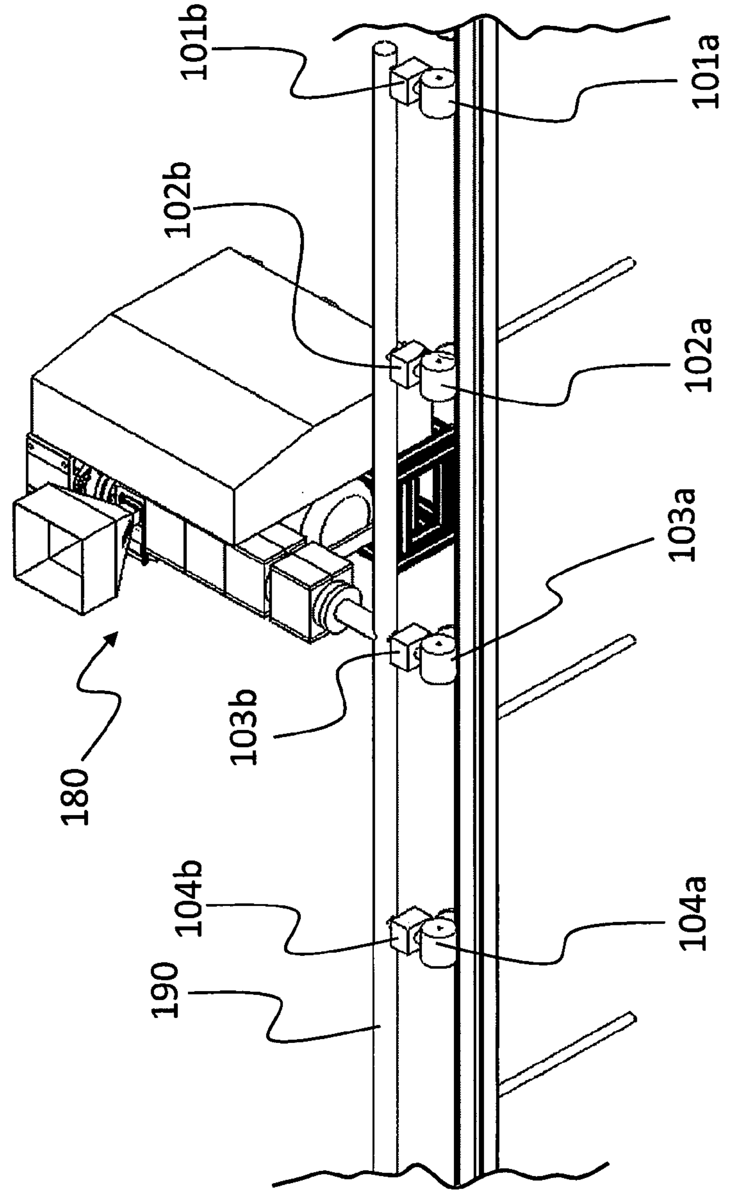
FIG. 11 is a perspective view of a portion of the apparatus of FIG. 10.

As an alternative, a source 180, 181 may feed material to different extruding stations (i.e. to different extrusion dies 101*a*-110*a*), as e.g. shown in FIGS. 10 and 11, for example via suitable ducts preferably heated ducts intended to maintain the temperature of the material at a desired value or within a desired temperature range.

In such an embodiment, there are two sources 180, 181, each feeding material to five different extruding dies 101*a*-110*a*. In different embodiments, a single source 180, 181 may feed material to a different number of extruding stations).

A detailed discussion, with reference in particular to FIG. 11, will be made of source 180. This discussion applies as well also to source 181.

Source 180 can be any known source of material that is configured to supply material to an extrusion die. Downstream the source 180 there is a distribution line 190 that supplies the material to be extruded from the source 180 to different extrusion dies 101*a*-105*a* of different extruding stations 101-105.

Preferably, upstream of each extrusion die 101*a*-105*a* there is a pump, preferably a volumetric pump 101*b*-105*b* to accurately dose the material to each extrusion die 101*a*-105*a*.

In the shown embodiment, the first source 180 feeds material to the first fie extruding stations 101-105, while the second source 181 feeds material to the last five extruding stations 106-110. Different embodiment may be provided, e.g. wherein the first source and the second source feed alternately material to the extruding station, e.g. the first extruding station is fed by the first source, the second extruding station is fed by the second source, the third extruding station is fed by the first source, and so on.

Operation of the apparatus 100 according to the invention, preferably for carrying out the method according to the invention is evident from the above and can be summarized as follow. A core member is extruded by the first extruding station 101 and directed towards the second extruding station 102.

As an alternative, not shown, the core member 12 can be produced by means of another apparatus and fed to the extruding station 102. The extruding station 102 extrudes layer 11*a* around the core member 12.

The subsequent extruding station 103 extrudes the second layer 11*b* around layer 11*a*, and so on until the last layer 11*h*, i.e. until the adaptor 11 is complete.

Subsequently, the extruding station 110 extrudes the body 10 around the plurality of layers 11*a*-11*h*, and in particular on the external surface of the last layer 11*h* of said plurality of layers.

The cutting station may thus cut the extruded thermoplastic material PM to the dimension of the sealing module 1.

Between each couple of subsequent extruding stations, coolant and/or a detaching agent may be delivered to the extruded thermoplastic material PM via the coolant feeder 150 and/or the detaching agent feeder 130.

It has to be also noted that the a detaching agent can be provided before the thermoplastic material is extruded, i.e. provided to the thermoplastic material in the solid state for example in the thermoplastic material feeder or hopper of an extruding station. The provision of a detaching agent before the extrusion of the thermoplastic material can be carried out in alternative, or in combination, with the provision of a detaching agent to the thermoplastic material after its extrusion, i.e. to the thermoplastic material exiting the extrusion die.

It has to be noted that, in both the above mentioned cases, a detaching agent is present on the external surface of the extruded thermoplastic material on which subsequently a thermoplastic material is extruded. In other words, according to an aspect of the invention a detaching agent is provided on the external surface of a layer on which a subsequent layer is extruded and/or on the external surface of the core member on which a layer of said plurality of layer is extruded.

The presence of the detaching agent at the interface between a core member and a layer and/or between a layer and a subsequent layer (i.e. between two layers) allows to provide the desired adhesion of these elements while allowing a separation, i.e. allowing a removal or peeling (preferably a peeling by hand) of the thermoplastic material.

It has to be noted that, according to different possible embodiments, the desired adhesion between the thermoplastic materials extruded in sequence allowing a separation (removal or peeling) can be obtained by a proper of the extrusion parameters, as for example mentioned above, in combination or in alternative to a provision of detaching agent. As mentioned above, according to possible embodiment the detaching agent can be carried out before and/or after the extrusion of the thermoplastic material. Therefore, a detaching agent is present between two layers of thermoplastic material extruded in sequence, i.e. between two layers of thermoplastic materials of the sealing module according to the invention.

The movement of the thermoplastic material from one extruding station to a subsequent extruding station is provided by guiding means 120, 121.

Possibly, the extruded thermoplastic material (in particular when wet with a coolant) may be dried by means of drier 140.

It has to be noted that according to an aspect, the last layer 11*h* of the adaptor on which the body is extruded in the last extruding station 110, is preferably cooled in a quick cooling step and without the addition detaching agent, i.e. without detaching agent added in the material used for the extrusion of the last layer after its extrusion outside the extrusion die and before the body 10 is extruded on it.

Also the thermoplastic material used for the extrusion of the sealing body 10 on the external surface of the last layer 11*h* of the adaptor is not provided with a detaching agent so that the body 10 is constrained to the last layer 11*h*. Therefore, according to an aspect, the last layer 11*h* is not removable (it cannot be peeled off) and it is permanently constrained to the internal surface of the body 10. In other words the last layer 11*h* and the body 10 can be constrained one to another to be not separable.

On the contrary, as mentioned before, the extrusion parameter(s) and/or the provision of detaching agent and/or the provision of a controlled cooling step, are selected so as the core member 12 can be removed (peeled off) from the first layer 11*a* of the adapter, as well as the layer of the adapter can be removable (peeled off) from another layer, as already discussed above.

As mentioned, at the end of the extrusion step, when the module 1 is obtained, it may be longitudinally (i.e. along the axis of the opening 14) cut (partially or completely) into two halves if the body is provided with a closed hollow section. Thus, the opening 14 is divided in two halves, having an open cross section, so as to allow an easy insertion of the cable/pipe within the opening 14 itself. This step is not necessary if the body 10 is provided with an open section.

Furthermore, the core member may be removed from the sealing module 1, so that the final piece is already provided with an opening 14.

Second Embodiment

According to a second possible embodiment, as for example shown in the FIGS. 12-22, a sealing module 1 comprises a hollow body 10 and in particular an external body, and a plurality of superimposed inner layers 11*a*-11*h* arranged inside the hollow external body 10.

As it will be discussed here below, the plurality of inner layers 11*a*-11*h* acts as an adapter portion 11 of the sealing module, in fact, the removal of one or more layers allows to modify the size of the cross section of the sealing module so as to adapt it to different cable or pipe sizes. It has to be noted that the term "adaptor" 11 is also used herein to indicate the plurality of superimposed inner layers 11*a*-11*h*.

In the FIGS. 12-17, the layers 11*a*-11*h* are placed on the body 10 in a cavity 50 of the body. More in detail, the adaptor 11, i.e. the plurality of layers, is provided within the body 10, which is hollow so that the layers can be housed therein.

By doing so, a housing 14 extending between two opposite surfaces S1, S2 (see for example FIG. 13) of the sealing module, i.e. a pass through housing 14 extending from one surface of the sealing module to an opposite surface of the sealing module, can be provided. The size of the housing 14 can be varied by removing (e.g. peel off, preferably by hand) one or more layer(s). The body 10 (in particular the one having a closed hollow section as for example shown in FIG. 17) is typically divided in two portions after the extrusion process (as discussed here below the body 10 can be partially or completely divided.

The layers 11*a*-11*h*, as better discussed later, are extruded and superimposed one to the other, so that the cross section of the layers is substantially the same (with obviously progressively decreasing size). In other words, the layers are placed in sequence one around (on) the other. According to an aspect, the layers 11*a*-11*h* have a closed hollow section, e.g. as for example shown in FIG. 17, a circular closed hollow section, i.e. annular or ring shaped closed section. As mentioned above, different shapes can be used instead of a circular shape. In fact, according to different possible embodiments as for example shown in FIGS. 12-16, the body can be provided with an open hollow section, i.e. it is provided with an open cavity 50 (the cavity is not completely surrounded by the body shape in cross section) and the layers intended to be extruded in the cavity are sheets having an open section (not forming a closed hollow section). More in detail, according to an aspect, as for example shown in the FIGS. 12-16, the layers can be in the form of a curved sheet having an arched shape, and preferably half of an annular shape (half of an annulus).

The first layer 11*a* of the plurality of layer is extruded on a surface of the body 10 and in particular on the surface of the cavity 50. The first layer 11*a* have a correspondent shape with respect to the shape of the surface of the cavity 50 of the body so as it can adhere thereon.

According to an aspect, as for example shown in the attached FIGS. 12-16, the body 10 has a rectangular or square shaped external surface, with a cavity 50 having the shape of half annulus if seen in cross section.

The body 10 can be provided either by extrusion in a first extruding station (as it will be discussed in greater detail here below) or the body 10 may be obtained from a separate and other forming process (e.g. molding or extrusion). The layers are then extruded on the body.

A core member 12, can be extruded on the last layer 11*h* of the plurality of layer and it is preferably provided with a shape correspondent to the external surface of the last layer so as it can adhere thereon. Typically, according to an embodiment, as for example shown in FIGS. 12-16, all the layers have shape corresponding to a half of a circular cross section and more in detail corresponding to a half of an annulus together with an open section hollow body.

In any case, other shapes may be used as well.

Figure 17:
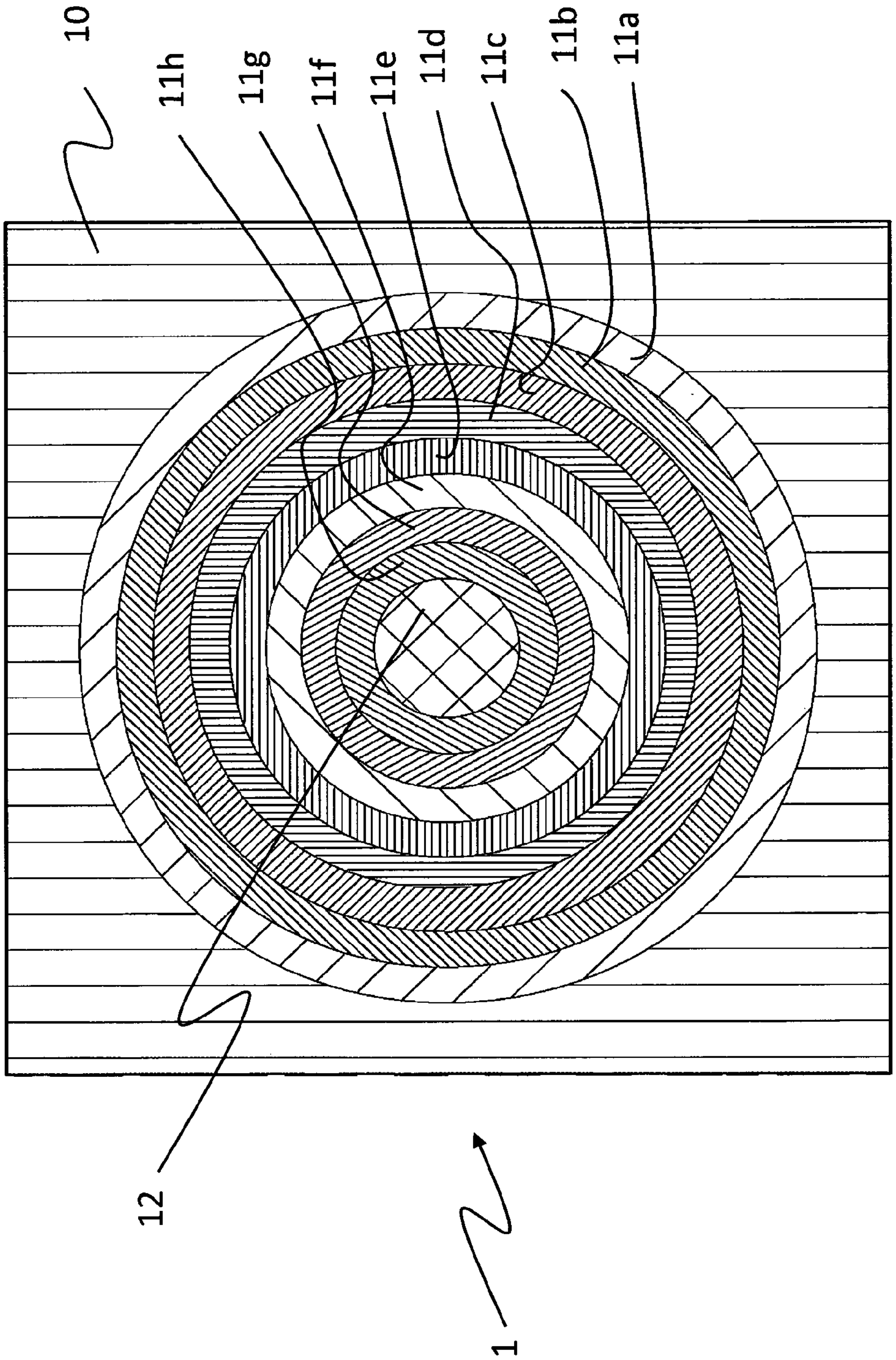
FIG. 17 is sectional front view of another embodiment of the sealing module according to the invention wherein the hollow body has a closed section.

As an example, according to another aspect, all the layers have a closed cross section, e.g. a circular cross section (as for example shown in FIG. 17).

The layers 11*a*-11*h* adhere one to the other and are in contact one to the other to form an adaptor 11. At the end of the production step, the layers are constrained (by adhesion) one to the other, so as to prevent movement between the layers 11*a*-11*h*.

However, the adhesion between the layers, and between the first layer 11*a* and the core member 12 (if provided), is loose enough to allow a user to remove (preferably by peeling) one or more layers 11*a*-11*h*, to modify the size (e.g. the diameter) of the housing 14 for passing a cable or pipe through the sealing module 1.

In particular, the size of the housing 14 is a function of the number of layers 11*a*-11*h* removed (i.e. peeled off) from the sealing module.

In fact, according to an aspect, a user can peel (preferably by hand) one or more layers 11*a*-11*h* to adapt the sealing module for the use with cables of different dimensions.

Figure 12:
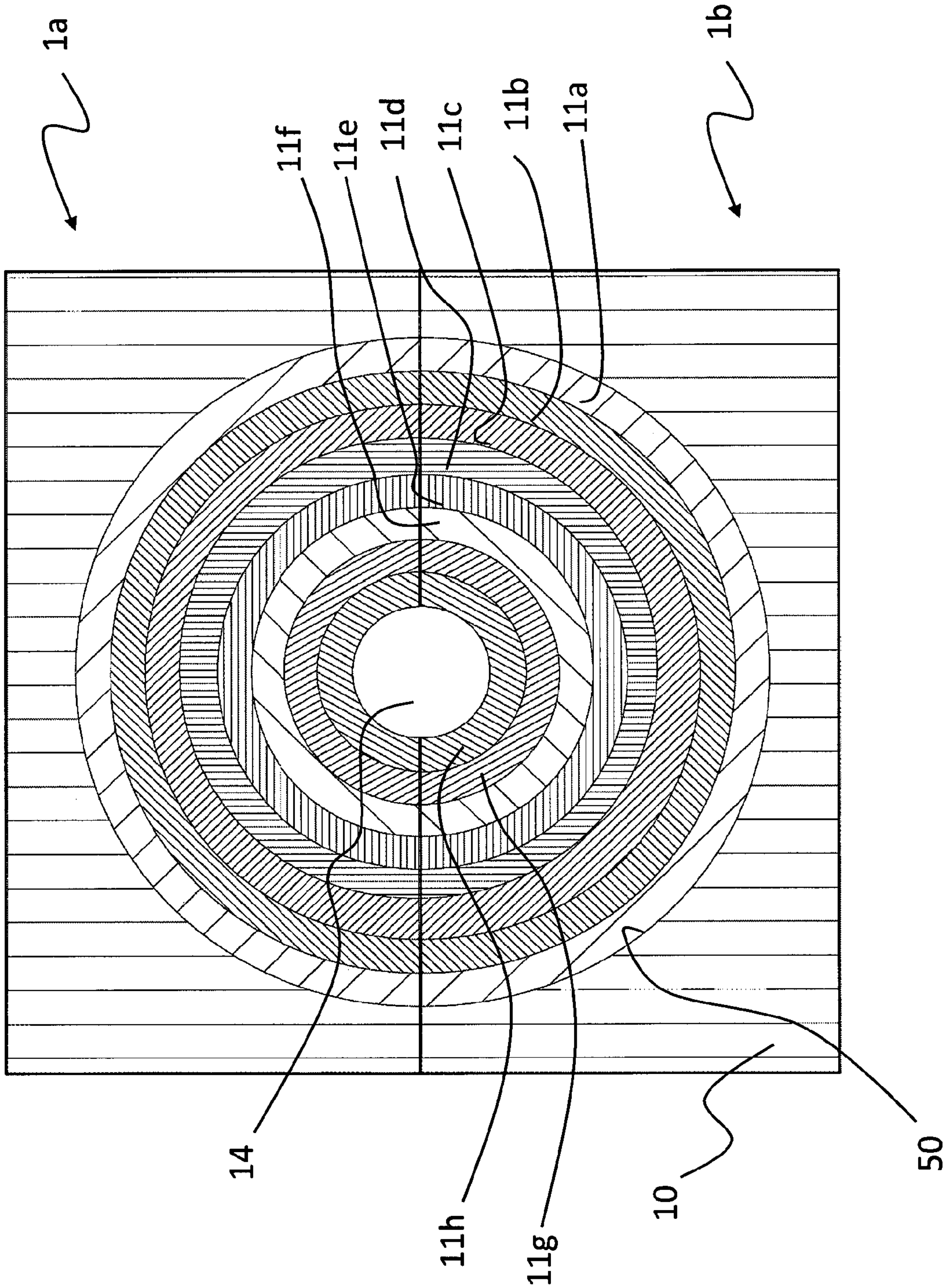
FIG. 12 is a sectional front view of a sealing module according to a possible embodiment of the invention.
Figure 15:
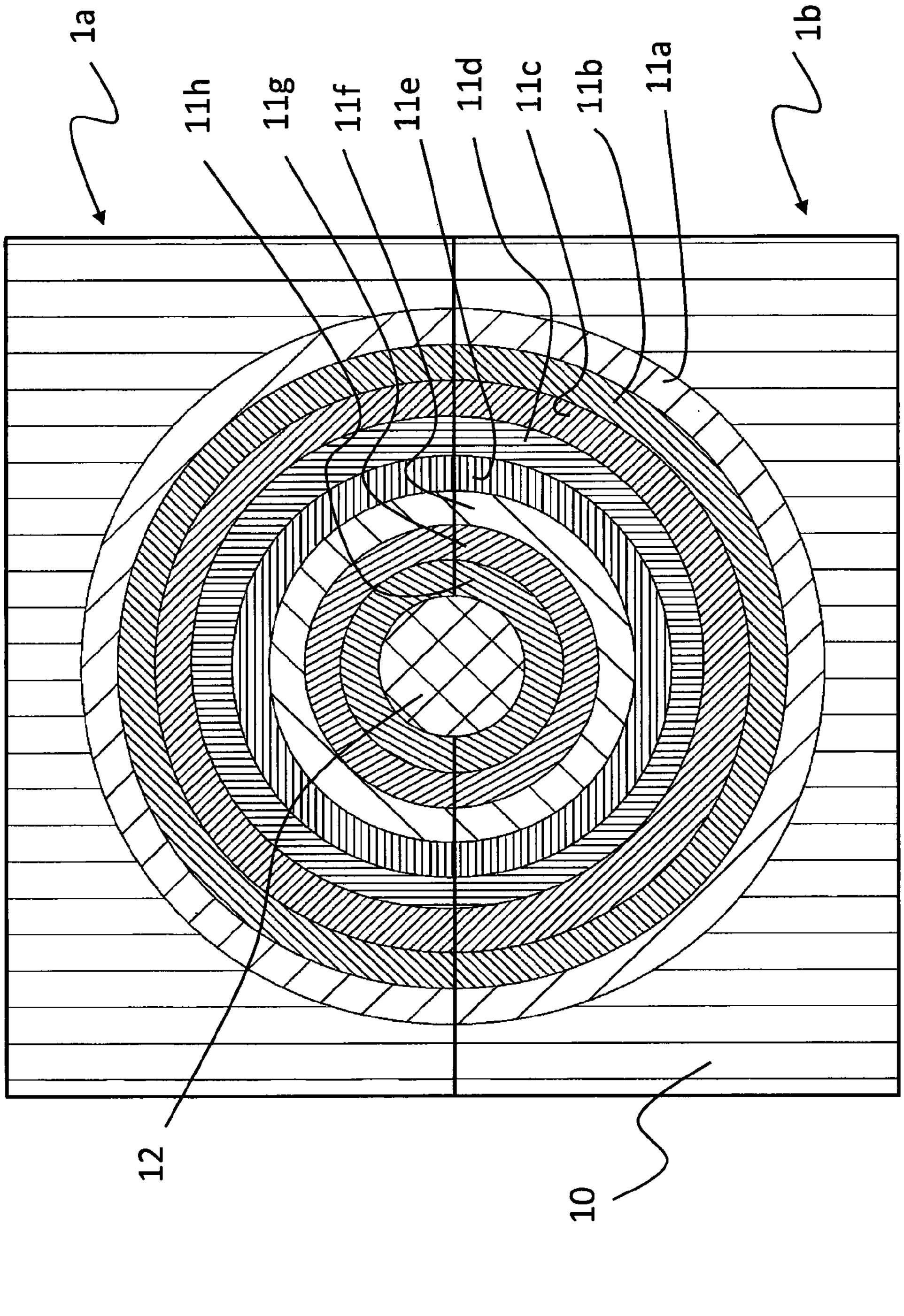
FIG. 15 is a sectional front view of the sealing module of FIG. 12 wherein a core member is also shown.

As an example, in FIG. 15, no layer 11*a*-11*h* is removed, and a core member 12 is provided within the adaptor 11. As a result, no pass through housing 14 is present because the sealing module is completely filled by the layers and the core member thus no passage for the cable is present, and a cable cannot be inserted within (and through) the sealing module 1. With reference to FIG. 12, no layer 11*a*-11*h* is removed, but the core member 12 is no longer present within the adaptor 11.

As a result, an hollow volume is formed within the sealing module. In other words an empty volume of the housing 14 is provided, so that a cable or pipe can be pass through the sealing module 1 via this empty volume of the housing 14. In this case, the opening has a small cross-section, so that only small cables/pipes (i.e. having small cross section) can be housed in the sealing module 1.

By removing one or more layer(s), the cross section of the housing 14 (i.e. the empty volume of the housing 14) can be increased and adapted to the size (e.g. external circumference) of the cable or pipe (or similar element) to be hosed in the sealing module.

Figure 16:
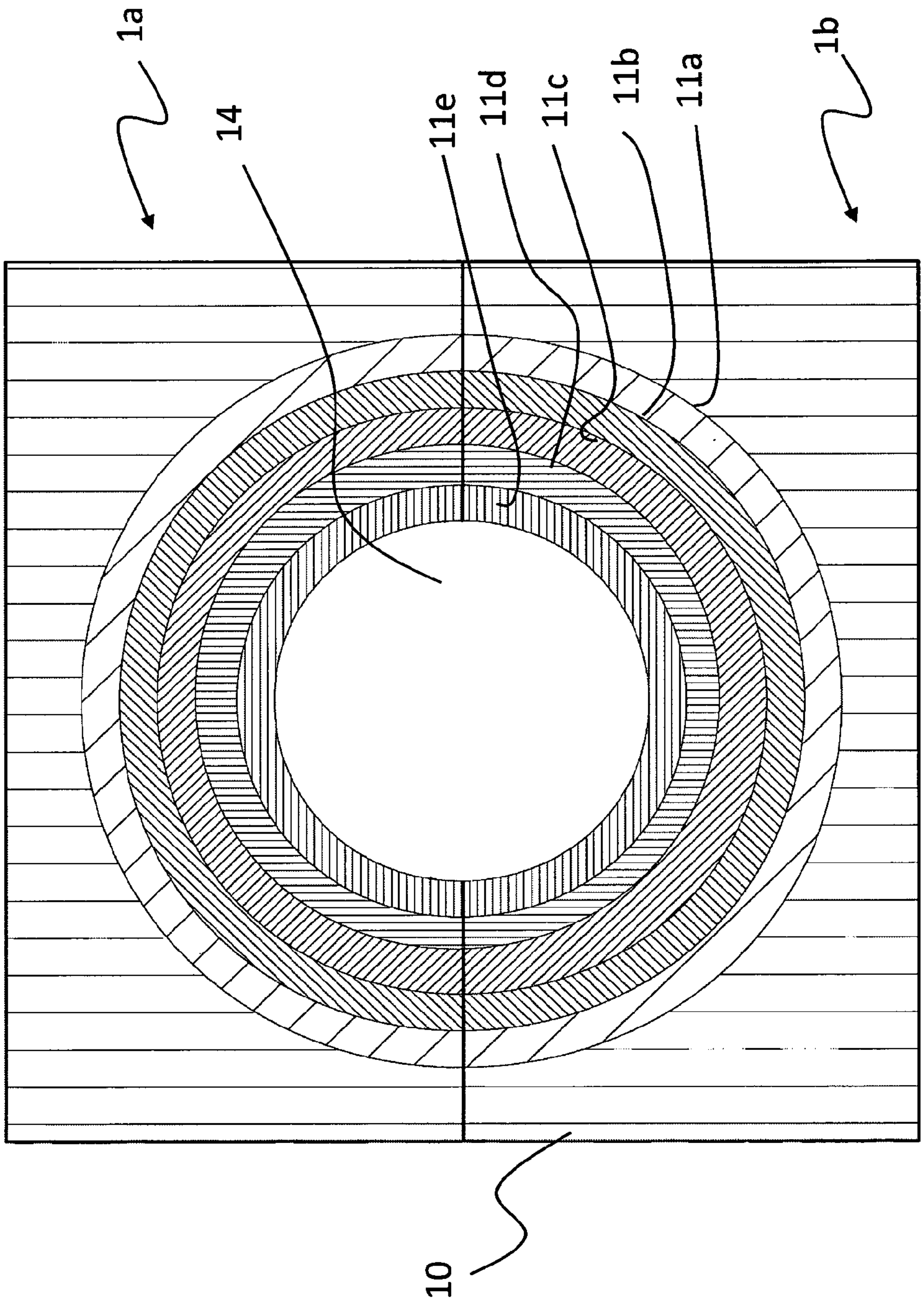
FIG. 16 is sectional front view of the sealing module of FIG. 12, after removal three layers.

As an example, in FIG. 16, layers 11*h*-11*f* have been removed from the sealing module, so that the cross section of the housing 14 (i.e. empty space or not occupied space of the housing) is bigger with respect to the one of FIG. 12. As a result, bigger cables/pipes can be housed within the sealing module.

In the shown embodiment, the layers have substantially identical thickness one with respect to the other. Also on this case, it has to be noted that this condition is preferred, but it is not strictly required.

The extrusion dies may thus be configured so as to produce at least two layers having thickness different one from the other. In addition (or as an alternative), two or more layers may be extruded so as to be substantially permanently attached one to the other (e.g. by properly choosing the material, the extrusion temperature, avoiding the presence of a detaching agent, etc.). As a result, the sealing module will be provided with a reduced number of layers with respect to the number of layers that are extruded, because part of the extruded layer are attached one to the other so as to form a single thicker layer in the sealing module. As an example, layers 11*b* and 11*c* may be extruded so as to be permanently joined one to the other so as to form a single layer having a thickness that is twice the thickness of the other layers. In other words, the sealing module of this example will not be provided with eight layers, but it will be provided with seven layers, one which (i.e. 11*b*+11*c*) has a greater thickness with respect to the other ones.

According to an aspect, the body 10 and the layers 11*a*-11*h* (i.e. the adaptor 11) are made of a thermoplastic material, allowing an extrusion in sequence of the sealing module 1. Otherwise, only the layers 11*a*-11*h* may be extruded of thermoplastic material and extruded in sequence, while a closed section hollow body 10 (or an open section hollow body) may be provided and the layers extruded on it.

According to the invention, suitable thermoplastic material are thermoplastic elastomers, thermoplastic rubbers (such as Santoprene), thermoplastic polyurethanes (TPU), thermoplastic fluoropolymer elastomers (e.g. the one knows as Viton), thermoplastic copolyester elastomers (e.g. the one traded with the name Hytrel), thermoplastic polyamides (e.g. Nylon or PA-12).

These and other thermoplastic materials are suitable materials for the production body 10, if it is produced by extrusion, and the layers 11*a*-11*h*.

The core member 12 can be made of a thermoplastic material as well, e.g. the materials of the body 10 and/or of the layers 11*a*-11*h*.

In particular, the body 10 can be extruded in the first step of production of the sealing module, or it can be produced separately from the sealing module 1, and used as a base for the extrusion of the sealing module 1 and in particular of the layers 11*a*-11*h*.

In the case the body 10 is provided by extrusion, i.e. in a first step of extrusion of thermoplastic material, the first layer 11*a* made of thermoplastic material extruded on the body and in particular in the cavity 50 of the body, preferably adhere on the body to be constrained to it. In other words, the first layer 11*a* cannot be removed (peeled off) from the body 10.

This can be for example achieved by properly selecting the extrusion parameters and/or by not providing a detaching agent between the body and the first layer extruded thereon.

Returning now on the extrusion process, as before mentioned, an extrusion in sequence is a process where extrusion occurs in different steps at different places (e.g. at different extrusion dies), and the material extruded in the second (or subsequent) step is extruded and the deposited onto the material extruded in the preceding step.

Figure 18:
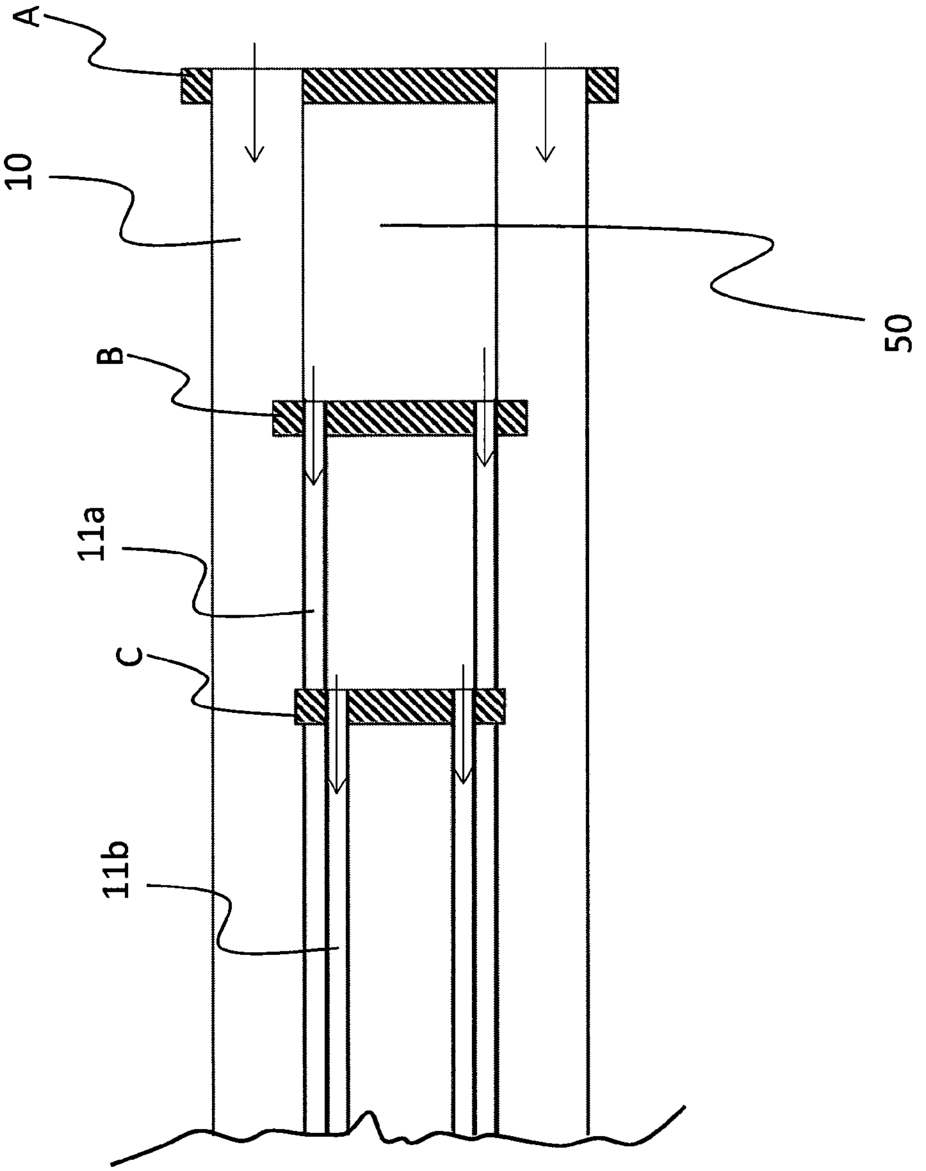
FIG. 18 is a schematic and simplified view of an extrusion in sequence to produce a sealing module according to a second embodiment of the invention.

As for example shown in FIG. 18, a schematic representation of the above mentioned method of "extrusion in sequence" is shown.

This figure is only illustrative and its only purpose is to provide a schematic reference for the description of the extrusion process in sequence. It has to be noted that in FIG. 18 some elements, such as a source of solid thermoplastic material (e.g. a feeder of hopper containing solid thermoplastic material), etc., are omitted and the other elements are schematic and simplified. In particular, FIG. 18 shows schematically the extrusion in sequence of the body 10 and of the first two layers 11*a* and 11*b*.

At first, at an extrusion die A, the body 10 is extruded.

Subsequently, further thermoplastic material is delivered to an extrusion die B, distant from the die A, and extruded onto the body 10 to form the first layer 11*a* of the adaptor 11. In a similar manner, thermoplastic material is delivered at a die C, to be extruded onto the first layer 11*a*, to form the second layer 11*b*.

This operation is repeated a number of times to form all the layers of the adaptor 11.

Finally, after the last layer of the adaptor has been extruded (e.g. layer 11*h* in the adaptor of the other figures), a core member 12 can be extruded onto the last layer 11*h*.

The core member 12 can be extruded in a step of production of the sealing module, or it can be produced separately from the sealing module 1, and subsequently provided. The cross section of the core member can be full (e.g. a circular full section) or hollow (e.g. an annular cross section). In the shown embodiment, all the layers 11*a*-11*h* and the core member have identical cross section (except for the size), i.e. circular or of a half of circle (half of a annulus) in this particular case. In other words, the shapes of the cross section of the layers and of the core member are "similar", in a strict geometrical meaning.

The body 10 has a rectangular cross section with the cavity 50 preferably having a substantially arch shape. This may be achieved my means of a rectangular die having a corresponding substantially arch shaped cavity.

Otherwise, the sealing module 10 can be cut after the extrusion process, to shape the body as desired.

As also discussed here below, it has to be noted that the rectangular or square section of the body 10 (external body 10) is not limitative. In fact, the body 10 can be extruded, or cut, so as to provide different shape of the cross section, for example the body 10 can be directly extruded or subsequently cut to provide a polygonal section, the number of lateral sides being selected according to the need, or a circular or oval section, etc.

It has to be also noted that, as already mentioned, in the shown schematic embodiment, the body 10 is extruded at a first die A. In different embodiments, the body may be produced separately (and thus before) the sealing module 1. In this case, the body already formed can be delivered to the die B (which thus becomes the "first" die), to allow extrusion of the first layer 11*a* on the body 10. The die A is thus omitted, or used only as a guide for the body 10.

As mentioned the extrusion dies A, B, C are separated one from the other, and they are also typically aligned.

In other words, all the dies typically share their respective axes (in other words the axes of the dies are coincident so as to form one axis corresponding to the axis along which the extrusion process is carried out).

Extrusion parameters can be e.g. chosen between the extrusion speed, the extrusion temperature and the distance between the dies.

In fact, according to an aspect, the distance between the dies, and/or the extrusion speed and/or the extrusion temperature are set in order to allow a good adhesion between the layers, which should at the same time not be too strong, in order to allow a user to remove, preferably to peel off by hand, one or more layers 11*a*-11*h*.

For example, the extrusion temperature can be set in the range 160° Celsius-240° Celsius. The extrusion speed, that is corresponding to the moving speed of the extruded thermoplastic material between the extruding stations, can be for example in the range 1 meter/minute-2 meter/minute, preferably in the range 1 meter/minute-1.5 meter/minute.

Usually, between two subsequent extrusions (e.g. between dies B and C) the extruded thermoplastic material PM can be cooled.

With the expression "extruded thermoplastic material" it is meant the material exiting a generic die. As an example, with reference to die A, the "extruded thermoplastic material" PM is the body 10. With reference to die B, the "extruded thermoplastic material" PM is the group comprising the body 10 and the first layer 11*a*, while the "extruded thermoplastic material" PM for die C is the group comprising the body 10, the first layer 11*a* and the second layer 11*b*.

This can be done via natural cooling (exposure of the material to ambient air), or by delivering a coolant to the extruded thermoplastic material PM.

As better discussed later, with reference to the apparatus for example shown in FIGS. 19 and 20, water may be delivered (e.g. sprayed) onto the extruded thermoplastic material. As a result, one or more driers may be provided between two subsequent extrusion dies (e.g. between dies B and C) to dry the coolant.

According to an aspect, in order to prevent a too strong adhesion, a detaching agent may be provided before the thermoplastic material is extruded (e.g. in the feeder supplying solid thermoplastic material to the extrusion die) and/or after the thermoplastic material has been extruded, i.e. after the thermoplastic material exits the extrusion die. In the latter case, the detaching agent can be delivered to the extruded thermoplastic material PM before a subsequent extrusion step (e.g. between dies A and B and between dies B and C).

Figure 13:
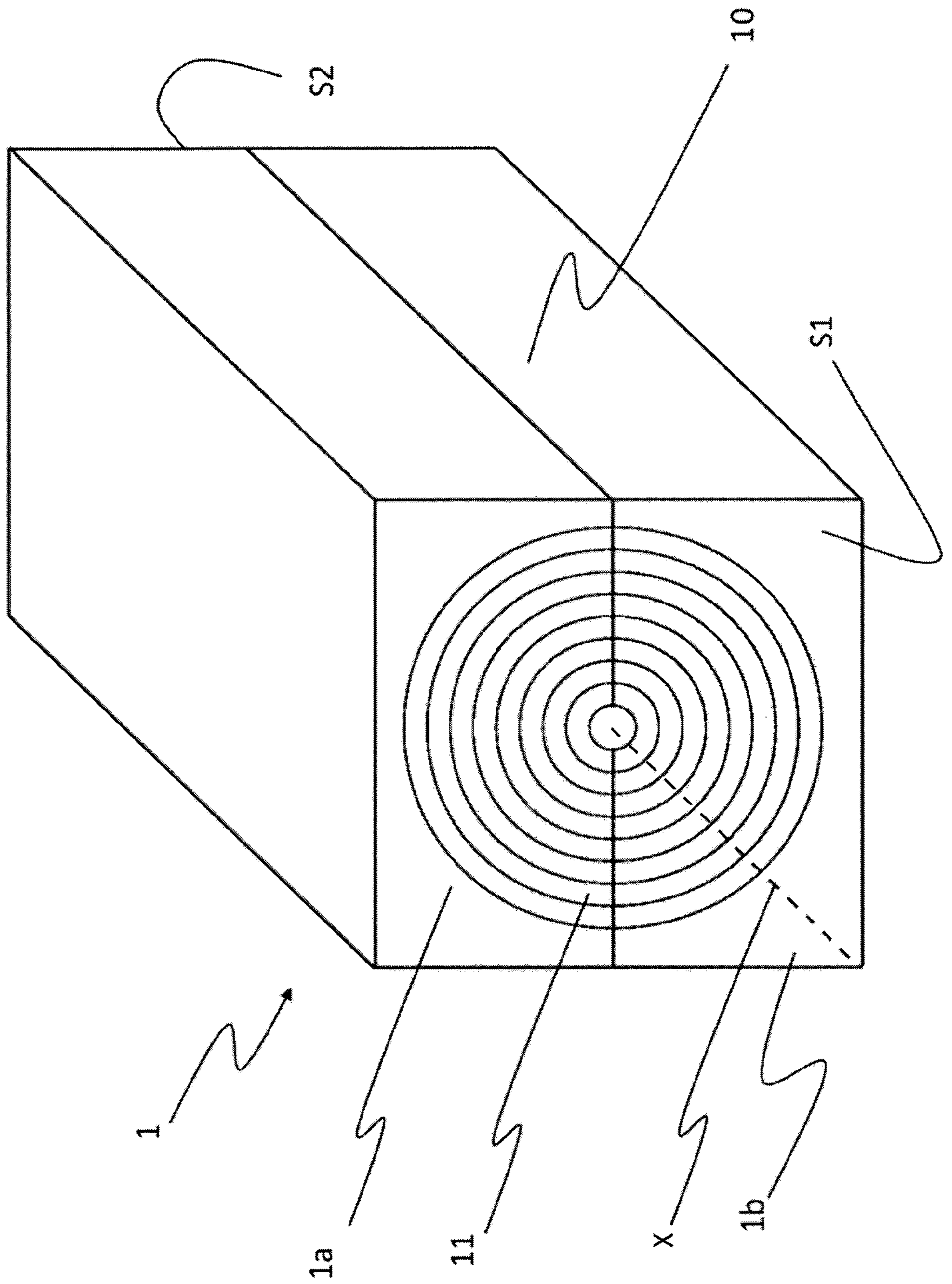
FIG. 13 is a perspective view of the sealing module of FIG. 12.
Figure 13A:
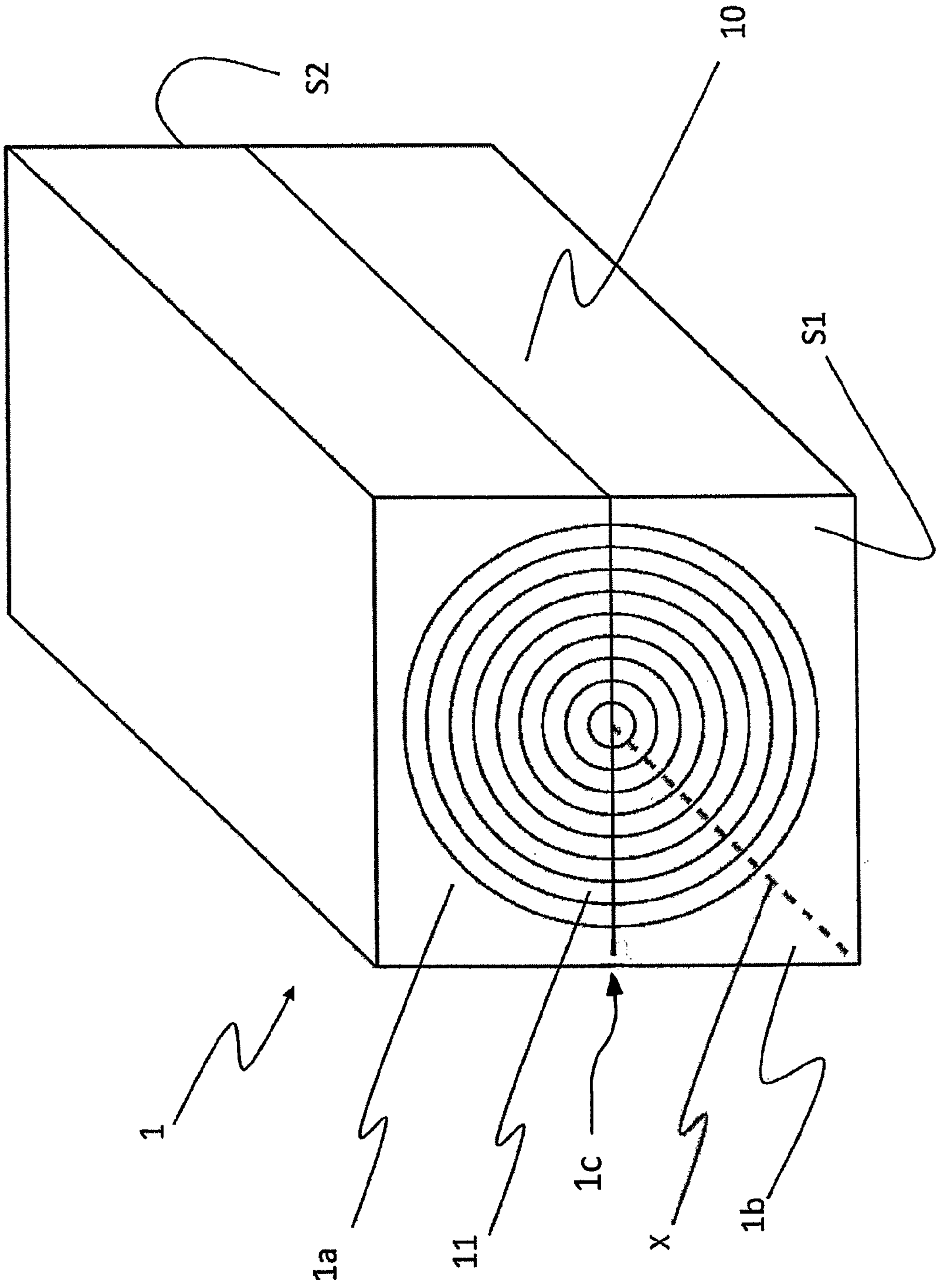
FIG. 13A is a perspective view of the sealing module of FIG. 12 wherein the two portions of the sealing module are not completely cut and are partially connected one to another.
Figure 14:
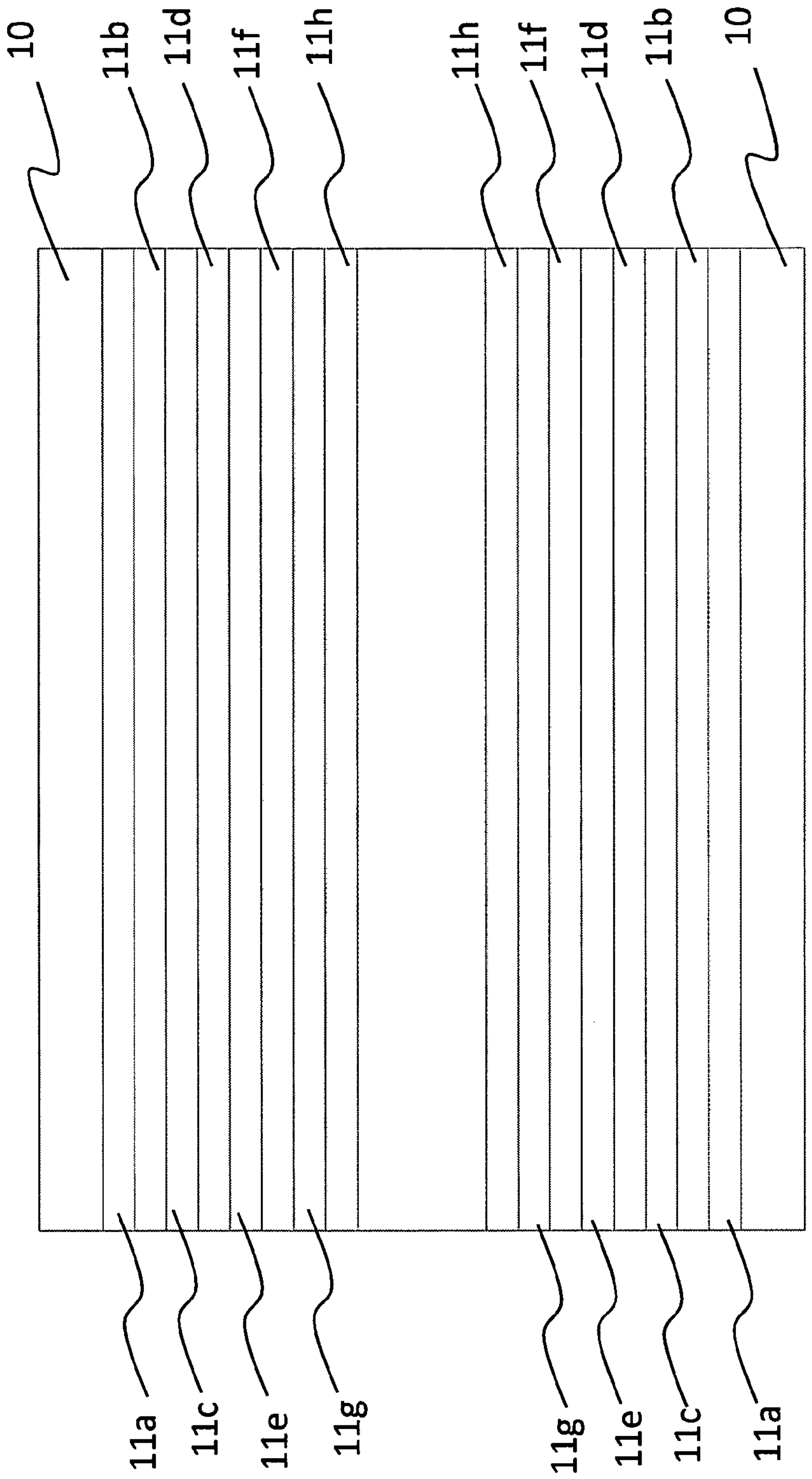
FIG. 14 is a schematic, sectional plant view of the sealing module of FIG. 12 (the view is rotated by 90 degrees)

The coolant itself may be the detaching agent, or the coolant may contain the detaching agent (e.g. the detaching agent can be mixed or added or emulsified with a coolant). According to an aspect, silicone as detaching agent is used added to water used a coolant. After completion of all the extrusion steps, the core member may be removed from the sealing module 1. Also, the sealing module 1, in particular the sealing body 10 if provided with a close hollow shape and the adaptor 11 (possibly also the core member 12, if present), can be completely or partially cut into two portions 1*a*, 1*b*. FIG. 13A shows a sealing module that is partially cut. As already mentioned above, with the expression partially cut it is meant that the sealing module, and in particular its external body is not completely cut so as to keep an integral connection part 1*c* between two portions 1*a*, 1*b* of the sealing module. In particular two portions 1*a*, 1*b* of the external body 10 are formed, which are constrained one to another and can be moved (e.g. rotated) one with respect to another, for the cable insertion, while the two portions are constrained in at least one point or area of connection 1*c*. This area of connection is preferably arranged close to (in correspondence of) the external surface of the external body 10 so that this part can act as a hinge allowing the relative rotation of the two portions of the sealing module. The extension of the area of point of connection 1*c* can be varied with respect to the one shown in FIG. 13A and for example can be limited to the longitudinal edge of the two portions 1*a*, 1*b*.

According to an aspect, as already mentioned above, the two portions 1*a*, 1*b* can be constrained one to another by providing a constraining or connection area between the two portions, for example by providing an additional joining part or by providing an adhesive or by welding, thus joining the two portions. In general the two portions are joined or connected together in a point or area of connection 1*c*. As already mentioned above, this area of connection is preferably arranged close to (or in correspondence of) an external surface of the external body so that this part 1*c* can act as a hinge allowing the relative rotation of the two portions of the sealing module. The sealing module 1 is cut along the axis X of the housing 14, i.e. along the axis passing through the two opposite surfaces of the sealing module through which the cable is passed. It has to be noted that the axis X corresponds to the axis of the cable or pipes that is passed through the sealing module. Typically the sealing module 1 is cut along the axis X, so as to be divided (partially or completely) into two portions 1*a*, 1*b* substantially symmetrical. This operation simplifies the removal of one or more layers 11*a*-11*h*, and the insertion of a pipe or cable within the housing 14.

This step can be avoided if for example the body 10 has an open section.

Figure 12B:
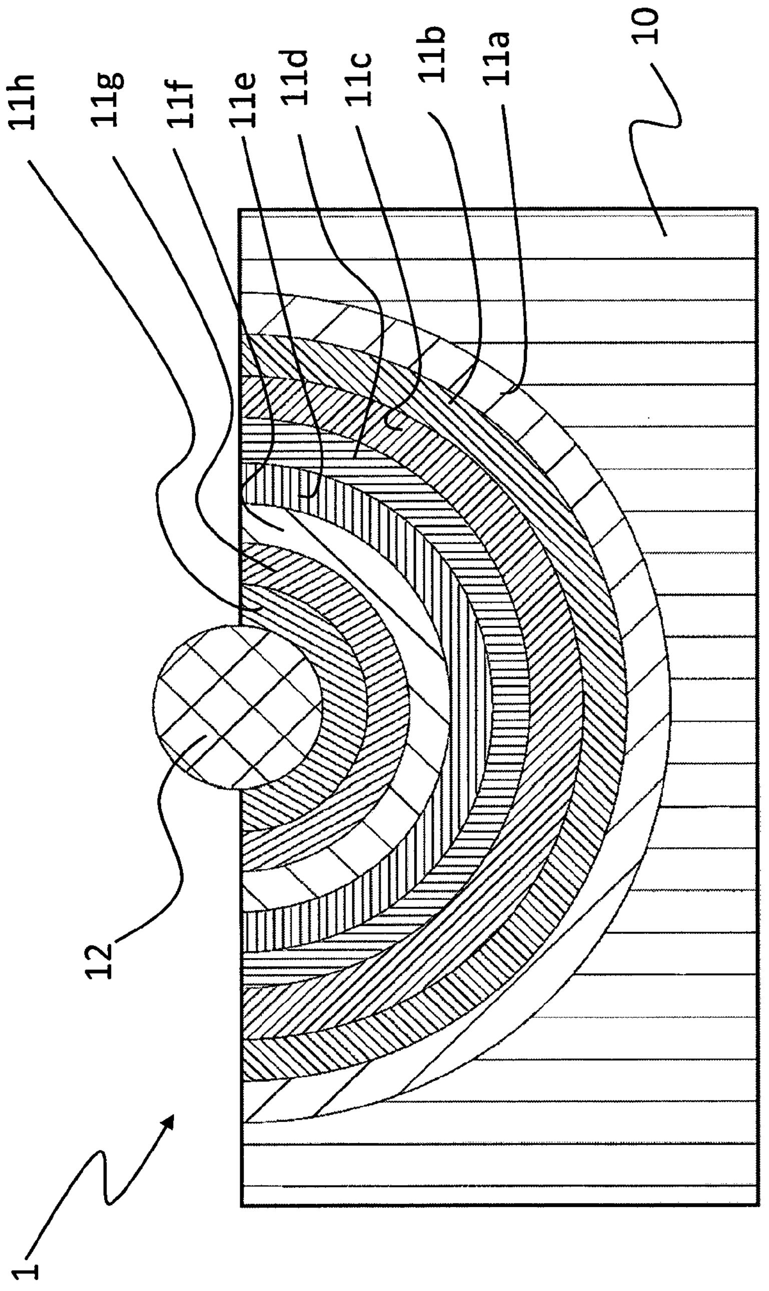
FIG. 12B is a sectional front view of a sealing module having an open section hollow body.

A sealing module 1 having an open section hollow body may be formed such that its finished product is e.g. similar to the portion 1*a* or 1*b* of the sealing module 1, as for example shown in the FIGS. 12-16. A sealing module 1 from an open section hollow body 10 is e.g. shown in FIG. 12B. A sealing module having a closed section hollow body 10 is for example shown in FIG. 17.

Figure 19:
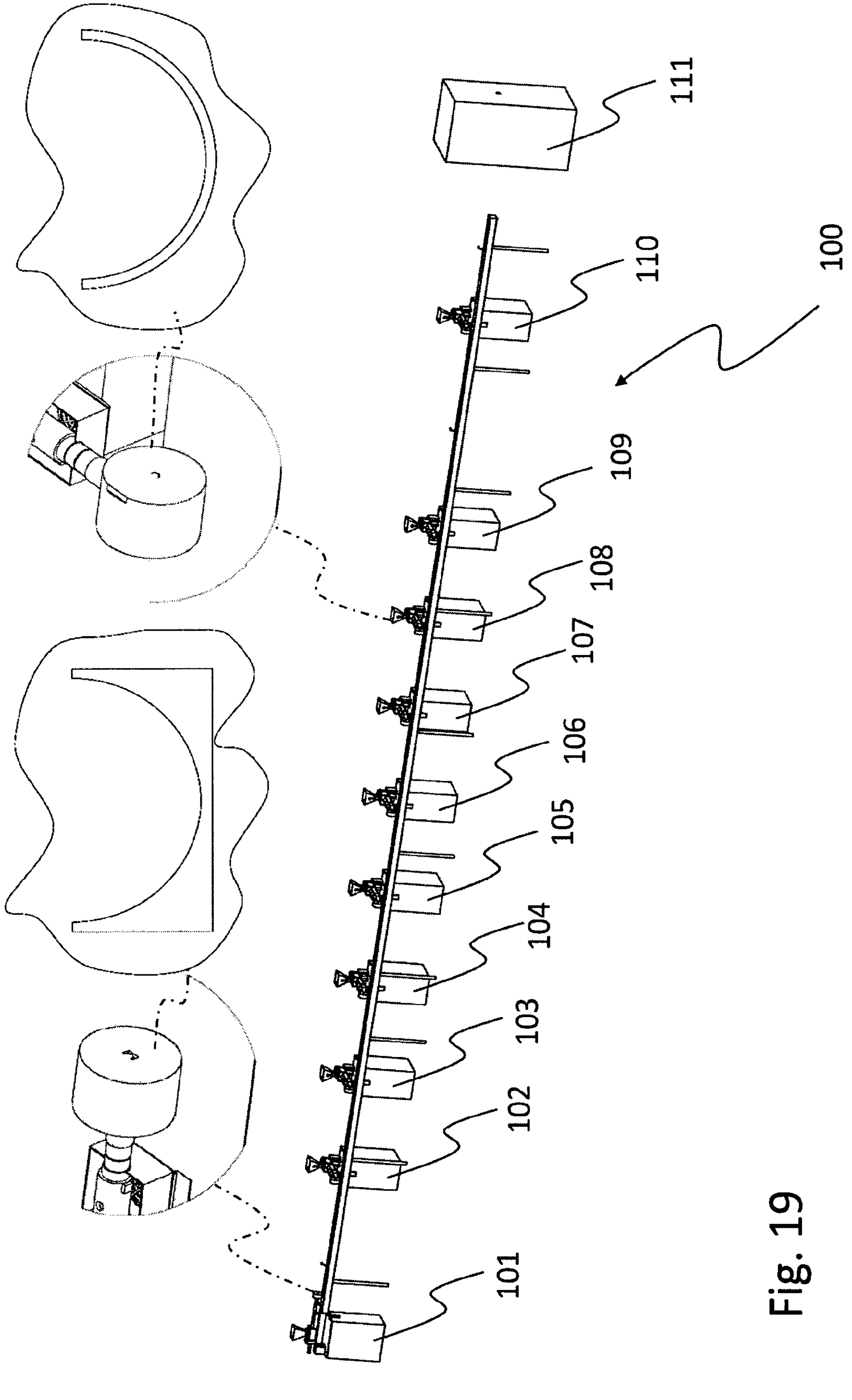
FIG. 19 is a perspective and simplified view of an apparatus for producing a sealing module according to a second embodiment of the invention by means of an extrusion in sequence.

In more detail, a possible second embodiment of an apparatus 100 for the production of a sealing module 1 is disclosed with reference to FIGS. 19-22. In FIG. 19 the main elements of the apparatus 100 are shown.

In more detail, the apparatus 100 is provided with a plurality of extruding stations 101, 102, 103, 104, 105, 106, 107, 108, 109, 110. The number of extruding stations may vary with respect to what shown. For example, with reference to the FIGS. 19-22:

station 101 extrudes the body 10;

station 102 extrudes layer 11*a* on the body 10;

station 103 extrudes layer 11*b* on layer 11*a;* station 104 extrudes layer 11*c* on layer 11*b;* station 105 extrudes layer 11*d* on layer 11*c;* station 106 extrudes layer 11*e* on layer 11*d;* station 107 extrudes layer 11*f* on layer 11*e;* station 108 extrudes layer 11*g* on layer 11*f;* station 109 extrudes layer 11*h* on layer 11*g;* station 110 can be used to extrude the core member 12 on layer 11*h;*

Figure 20:
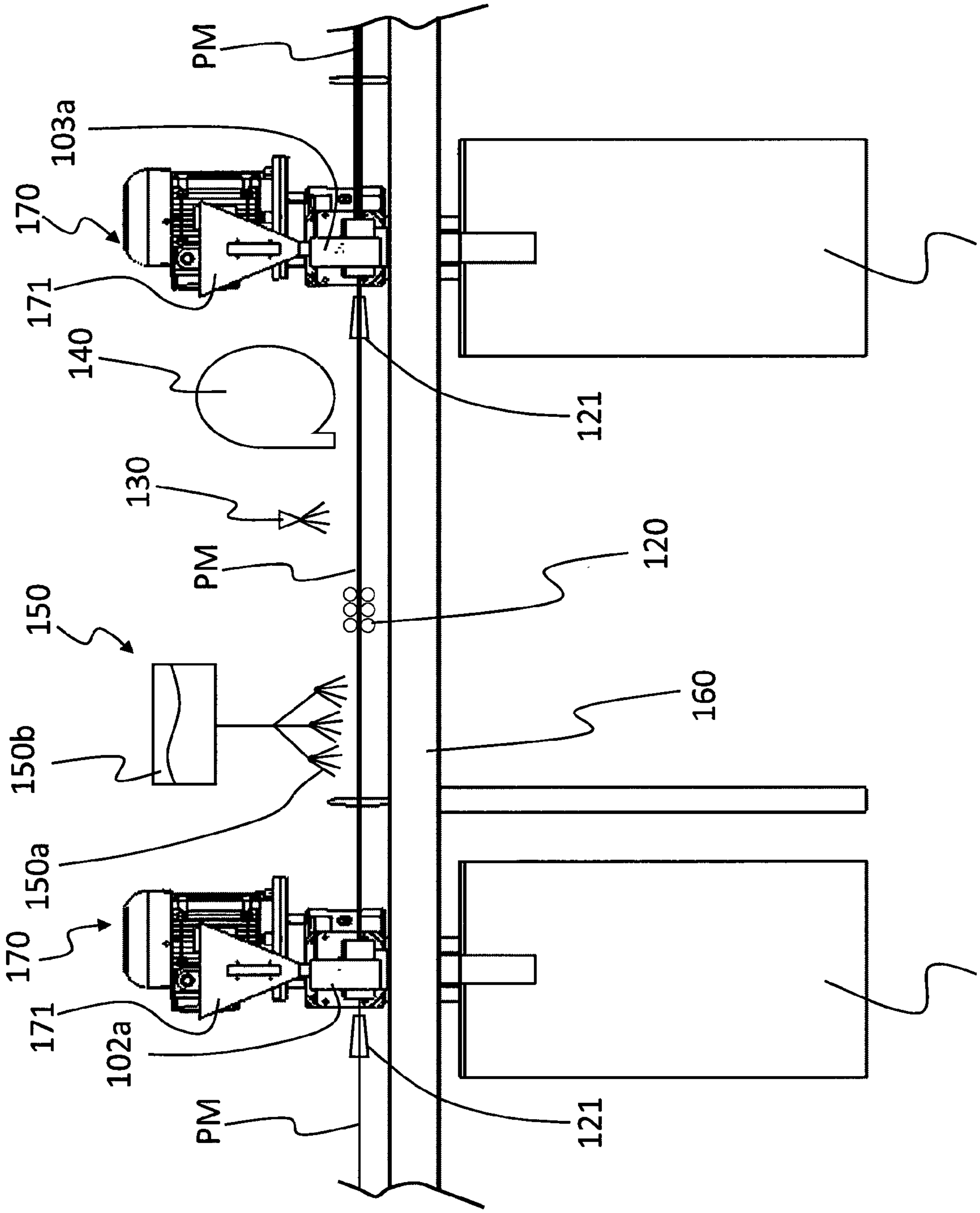
FIG. 20 is an enlarged view of a detail of FIG. 19, with components of the apparatus added in a schematic and simplified view.

Each extruding station 101-110 is provided with an extrusion die 102*a*, 103*a*, two of which are visible in greater detail in the partial enlarged view of FIG. 20. From now on, reference will be made to the two shown extruding stations 102 and 103, as well as to the extrusion dies 102*a*, 103*a*. However, the following description applies as well to all the other extruding stations and extrusion dies, and in particular to all of the couples of subsequent extruding stations.

As known, the extrusion dies 102*a*, 103*a* comprise a body and a hole within the body. It has to be noted that the shape of the hole (and in particular its cross section shape) correspond to the shape of body, layer or core member to be extruded. For example the hole can be circular, annular, or have the shape of half a annular shape, ecc.

According to an aspect, as for example shown in the FIGS. 18-19, the holes for extruding the layers have an arch shape (half annular shape) with decreasing size from the first layer to the last layer.

It has to be noted that, if the layers are extruded in a close shape (e.g. annular) these are subsequently extruded within the close section hollow body. In this case to facilitate the contact of a layer on the previously extruded layer, or on the body, directing means, such as for example an air jet, can be used.

Returning now to the apparatus, thermoplastic material is forced through the hole of the extrusion die 102*a*, 103*a*, so that the external shape of the thermoplastic material is shaped as the hole of the extrusion die.

The extruding stations 102, 103 also provided with known means (not shown in detail) to feed thermoplastic material to the extrusion die 102*a*, 103*a* and means for melting the thermoplastic material (e.g. a melting cylinder) and a moving means such as a moving screw.

It has to be noted that according to an aspect of the invention, the extruding station according to the invention comprises a pump, e.g. a volumetric pump, or other suitable supply means, to effectively control the quantity of melted thermoplastic material supplied to the extrusion die.

The pump, or similar means, is preferably provided upstream of the extrusion die. Preferably the pump, or similar means, is arranged between the extrusion die and the melting cylinder.

By doing so it is possible to reach high accuracy in controlling the thickness of each layer of thermoplastic material.

The extruding stations 101-110 are preferably also disposed so that the extrusion dies 102*a*, 103*a* are aligned one after the other, i.e. so that the extruded thermoplastic material PM from one extrusion die 102*a* is naturally directed towards the subsequent extrusion die 103*a*. In other words, the axes of the extrusion dies (i.e. of the holes of the extrusion dies 102*a*, 103*a*) substantially coincide.

In order to provide the above discussed extrusion in sequence, each extrusion die 103*a* has preferably a reduced dimension with respect to the previous extrusion die 102*a*. With "die of reduced dimension" it is meant that an extrusion die 103*a* has a hole smaller than the hole of the previous extrusion die 102*a*. This condition (which is shown in simplified manner also in FIG. 18) does not obviously apply to the extrusion die of the first extruding station 101, because no previous "extrusion die" exists.

Guiding means 120, 121 (shown schematically in FIG. 20) are preferably provided to guide the extruded thermoplastic material PM between the various extruding stations 102, 103. In the FIGS. 18-22, rollers 120 are shown, which support the extruded thermoplastic material PM from between extrusion dies 102*a* and 103*a*. The rollers 120 may be motorized, so as to pull the extruded thermoplastic material. A greater number of rollers is normally used with respect to what shown.

Also rollers are typically provided between each couple of extruding stations. The rollers may be driven by a common motor (not shown), so that all the rollers are rotated at the same angular velocity.

According to an aspect of the invention, inclined surfaces 121 at the extruding dies 102*a*, 103*a* may be used, so as to precisely direct the extruded thermoplastic material PM within the extrusion dies 102*a*, 103. In general, fixed and/or movable guiding means 120, 121, may be used to guide and/or move and/or direct the extruded thermoplastic material PM between the different extruding stations 102, 103.

In general, the guiding means allow to guide and support the extruded thermoplastic material PM, and to direct it towards the subsequent extrusion die (if present). As mentioned, the guiding means can be motorized to push or pull the extruded thermoplastic material PM.

The apparatus 100 may be provided with various means to carry out different operations on the extruded thermoplastic material PM between two subsequent extruding stations 102, 103. Examples of these means are for example schematically shown in FIG. 20.

The apparatus 100 may be provided with a coolant feeder 150 to provide coolant to the material extruded from an extrusion die 102*a*, before it reaches the subsequent extrusion die 103*a*. The coolant, typically water, is preferably delivered to the extruded thermoplastic material PM in misted form, e.g. by means of one or more sprayers or sprinkler 150*a*.

Also, the speed and/or the extrusion temperature, together with the distance between two subsequent extruding stations 102, 103, may be set to provide for drying of the coolant at ambient temperature. Otherwise, a drier 140 may be provided to dry the coolant. The drier 140 may be arranged e.g. to direct air (e.g. hot air) towards the extruded thermoplastic material. A drier 140 may be also provided without the coolant feeder, e.g. to generally dry the extruded thermoplastic material exiting an extrusion die 102*a*.

Below the extrusion dies, a recovery tray 160 may be provided, usually to recover the coolant falling from the extruded thermoplastic material PM.

Furthermore, a detaching agent feeder 130 may be user to deliver a detaching agent to the extruded thermoplastic material PM. The detaching agent may be for example an oil or other suitable lubricant, or can be in the form of a powder (e.g. talc powder).

It has to be noted that a detaching agent, can be provided in the feeder of thermoplastic material of the extruding station. In other words the detaching agent, for example in the form of grains or pellets, can be added to the feeder of solid thermoplastic material at the extruding station. The pellets or grains of detaching agent are dispersed in the melted thermoplastic material and, in particular, the detaching agent emerges at the external surface of the extruded thermoplastic material. This allows to provide a detaching action when a thermoplastic material is subsequently extruded thereon so that the adhesion between the layer is such as to allow removal, preferably by peeling, of one or more layer.

According to an aspect, detaching grains or pellets, e.g. of the type known in the field of extrusion of thermoplastic material can be added to the thermoplastic material in the feeder of hopper of the extruding station.

Otherwise, as before mentioned, a detaching agent may be mixed with the coolant.

As an example, the coolant feeder 150 may comprise a coolant tank 150*b*, housing the coolant in liquid form. The detaching agent, e.g. silicone, may be e.g. dispersed within the coolant in the coolant tank 150*b*.

The last extruding station 110 can be used to extrude the core member 12 of the sealing module 1. A cutting station 111 may be provided to cut the extruded thermoplastic material PM, to obtain directly a sealing module 1, or a semi-finished product. Further cutting operation may be provided (typically on a different apparatus from the apparatus 100) to e.g. cut the body into a rectangular section.

It has to be noted that the body 10 (external body 10) can be provided or extruded or cut so as to provide different shape of the cross section, for example the body 10 can be directly extruded or subsequently cut to provide a polygonal section, the number of lateral sides being selected according to the need, or a circular or oval section, etc.

The feeding of plastic material to the extruding stations 101-110 may be operated in different ways. In the embodiment of FIGS. 19 and 20, each extruding station is provided with a (known) source 170 of material to be extruded. The source 170 typically comprises (in a known manner) a hopper 171 to receive plastic material, and to feed it to an extrusion screw (not shown) that melts (possibly together with a relevant heater) and forces the material towards the relevant extruding station 101-110.

Figure 21:
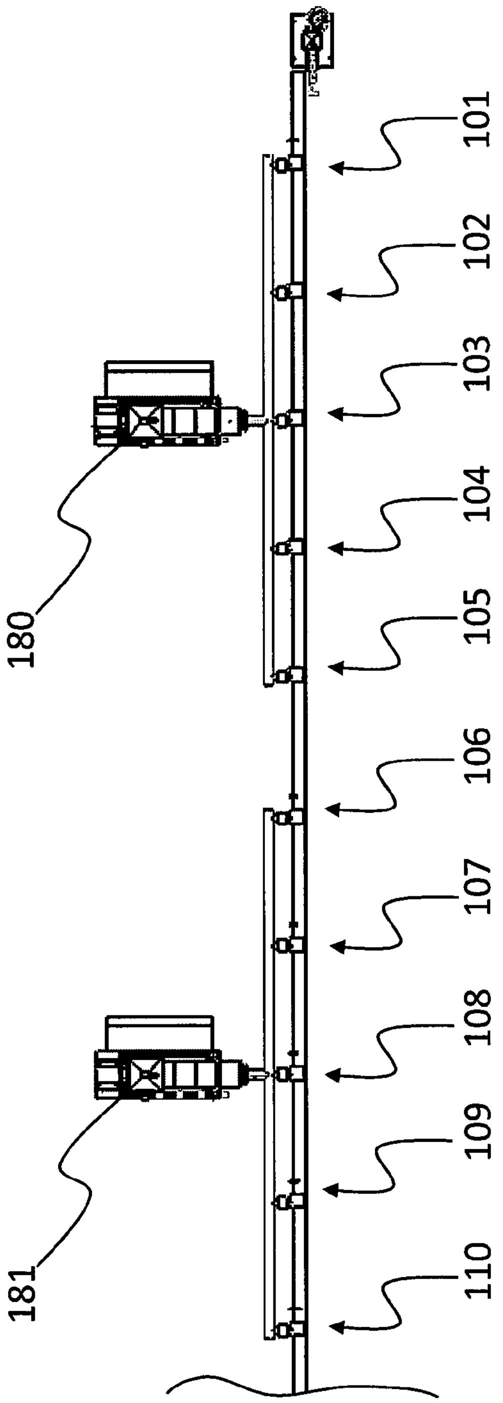
FIG. 21 is a plant schematic view of an alternative apparatus for producing a sealing module according to a second embodiment of the invention by means of an extrusion in sequence.
Figure 22:
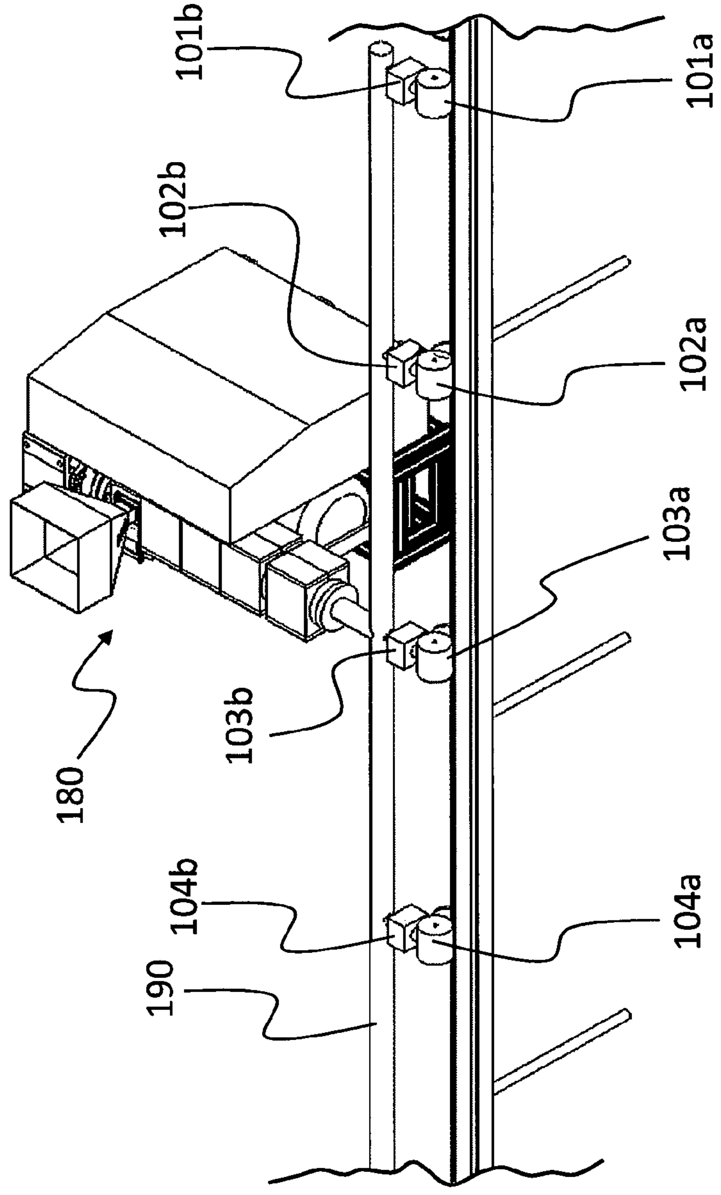
FIG. 22 is a perspective view of a portion of the apparatus of FIG. 21.

As an alternative, a source 180, 181 may feed material to different extruding stations (i.e. to different extrusion dies 101*a*-110*a*), as e.g. shown in FIGS. 21 and 22, for example via suitable ducts preferably heated ducts intended to maintain the temperature of the material at a desired value or within a desired temperature range.

In such an embodiment, there are two sources 180, 181, each feeding material to five different extruding dies 101*a*-110*a*. In different embodiments, a single source 180, 181 may feed material to a different number of extruding stations).

A detailed discussion, with reference in particular to FIG. 22, will be made of source 180. This discussion applies as well also to source 181.

Source 180 can be any known source of material that is configured to supply material to an extrusion die. Downstream the source 180 there is a distribution line 190 that supplies the material to be extruded from the source 180 to different extrusion dies 101*a*-105*a* of different extruding stations 101-105.

Preferably, upstream of each extrusion die 101*a*-105*a* there is a pump, preferably a volumetric pump 101*b*-105*b* to accurately dose the material to each extrusion die 101*a*-105*a*.

In the shown embodiment, the first source 180 feeds material to the first fie extruding stations 101-105, while the second source 181 feeds material to the last five extruding stations 106-110.

Different embodiment may be provided, e.g. wherein the first source and the second source feed alternately material to the extruding station, e.g. the first extruding station is fed by the first source, the second extruding station is fed by the second source, the third extruding station is fed by the first source, and so on.

Operation of the apparatus 100 according to the invention, preferably for carrying out the method according to the invention is evident from the above and can be summarized as follow. A body is extruded by the first extruding station 101 and directed towards the second extruding station 102.

As an alternative, not shown, the body 10 can be produced by means of another apparatus and fed to the extruding station 102. The extruding station 102 extrudes layer 11*a* around (on) the body 10.

The subsequent extruding station 103 extrudes the second layer 11*b* around (on) layer 11*a*, and so on until the last layer 11*h*, i.e. until the adaptor 11 is complete.

Subsequently, the extruding station 110 can be used to extrude the core member 12 on the plurality of layers 11*a*-11*h*, and in particular on the external surface of the last layer 11*h* of said plurality of layers.

The cutting station may thus cut the extruded thermoplastic material PM to the dimension of the sealing module 1.

Between each couple of subsequent extruding stations, coolant and/or a detaching agent may be delivered to the extruded thermoplastic material PM via the coolant feeder 150 and/or the detaching agent feeder 130.

It has to be also noted that the a detaching agent can be provided before the thermoplastic material is extruded, i.e. provided to the thermoplastic material in the solid state for example in the thermoplastic material feeder or hopper of an extruding station. The provision of a detaching agent before the extrusion of the thermoplastic material can be carried out in alternative, or in combination, with the provision of a detaching agent to the thermoplastic material after its extrusion, i.e. to the thermoplastic material exiting the extrusion die.

It has to be noted that, in both the above mentioned cases, a detaching agent is present on the external surface of the extruded thermoplastic material on which subsequently a thermoplastic material is extruded. In other words, according to an aspect of the invention a detaching agent is provided on the external surface of a layer on which a subsequent layer is extruded.

The presence of the detaching agent at the interface between a core member and a layer and/or between a layer and a subsequent layer (i.e. between two layers) allows to provide the desired adhesion of these elements while allowing a separation, i.e. allowing a removal or peeling (preferably a peeling by hand) of the thermoplastic material.

It has to be noted that, according to different possible embodiments, the desired adhesion between the thermoplastic materials extruded in sequence allowing a separation (removal or peeling) can be obtained by a proper of the extrusion parameters, as for example mentioned above, in combination or in alternative to a provision of detaching agent. As mentioned above, according to an aspect of the invention the detaching agent can be carried out before and/or after the extrusion of the thermoplastic material. Therefore, a detaching agent is present between two layers of thermoplastic material extruded in sequence, i.e. between two layers of thermoplastic materials of the sealing module according to the invention.

The movement of the thermoplastic material from one extrusion station to a subsequent extrusion station is provided by guiding means 120, 121.

Possibly, the extruded thermoplastic material (in particular when wet with a coolant) may be dried by means of drier 140.

It has to be noted that according to an aspect, the body 10 extruded in the first extruding station 110, is preferably cooled in a quick cooling step and without the addition detaching agent, i.e. without detaching agent added in the material used for the extrusion of the body.

Also the thermoplastic material used for the extrusion of the first layer 11*a* on the body 10 is not provided with a detaching agent so that the body 10 is constrained to the first layer 11*a*. Therefore, according to an embodiment, the first layer 11*a* is not removable (it cannot be peeled off) and it is permanently constrained to the body 10. In other words the first layer 11*a* and the body 10 can be constrained one to another to be not separable.

On the contrary, as mentioned before, the extrusion parameter(s) and/or the provision of detaching agent and/or the provision of a controlled cooling step, are selected so as the core member 12 can be removed (peeled off) from the last layer 11*h* of the adapter, as well as the layer of the adapter can be removable (peeled off) from another layer, as already discussed above.

As mentioned, at the end of the extrusion step, when the module 1 is obtained, it may be longitudinally (i.e. along the axis of the opening 14) cut (partially or completely) into two halves if the body is provided with a closed hollow section. Thus, the opening 14 is divided in two halves, having an open cross section, so as to allow an easy insertion of the cable/pipe within the opening 14 itself. This step is not necessary if the body 10 is provided with an open section.

Furthermore, the core member may be removed from the sealing module 1, so that the final piece is already provided with an opening 14.

Third Embodiment

According to a third possible embodiment, as for example shown in the FIGS. 23-31, a sealing module 1 comprises a hollow body 10 and in particular an external body, and a plurality of superimposed inner layers 11*a*-11*h* arranged inside the hollow external body 10.

As it will be discussed here below, the plurality of inner layers 11*a*-11*h* acts as an adapter portion 11 of the sealing module; in fact, the removal of one or more layers allows to modify the size of the cross section of the sealing module so as to adapt it to different cable or pipe sizes. It has to be noted that the term "adaptor" 11 is also used herein to indicate the plurality of superimposed inner layers 11*a*-11*h*.

In the FIGS. 23-31, the layers 11*a*-11*h* are placed on the body 10. The adaptor 11, i.e. the plurality of layers, is provided within the body 10, which is hollow so that the layers can be housed therein.

By doing so, a housing 14 extending between two opposite surfaces S1, S2 (see for example FIG. 24) of the sealing module, i.e. a pass through housing 14 extending from one surface of the sealing module to an opposite surface of the sealing module, can be provided. The size of the housing 14 can be varied by removing (e.g. peel off, preferably by hand) one or more layer(s). The body 10 (in particular the one having a closed hollow section) is typically divided (partially or completely) in two portions after the extrusion process.

The layers 11*a*-11*h*, as better discussed later, are extruded and superimposed one to the other, so that the cross section of the layers is substantially the same (with obviously progressively decreasing size).

Figure 27:
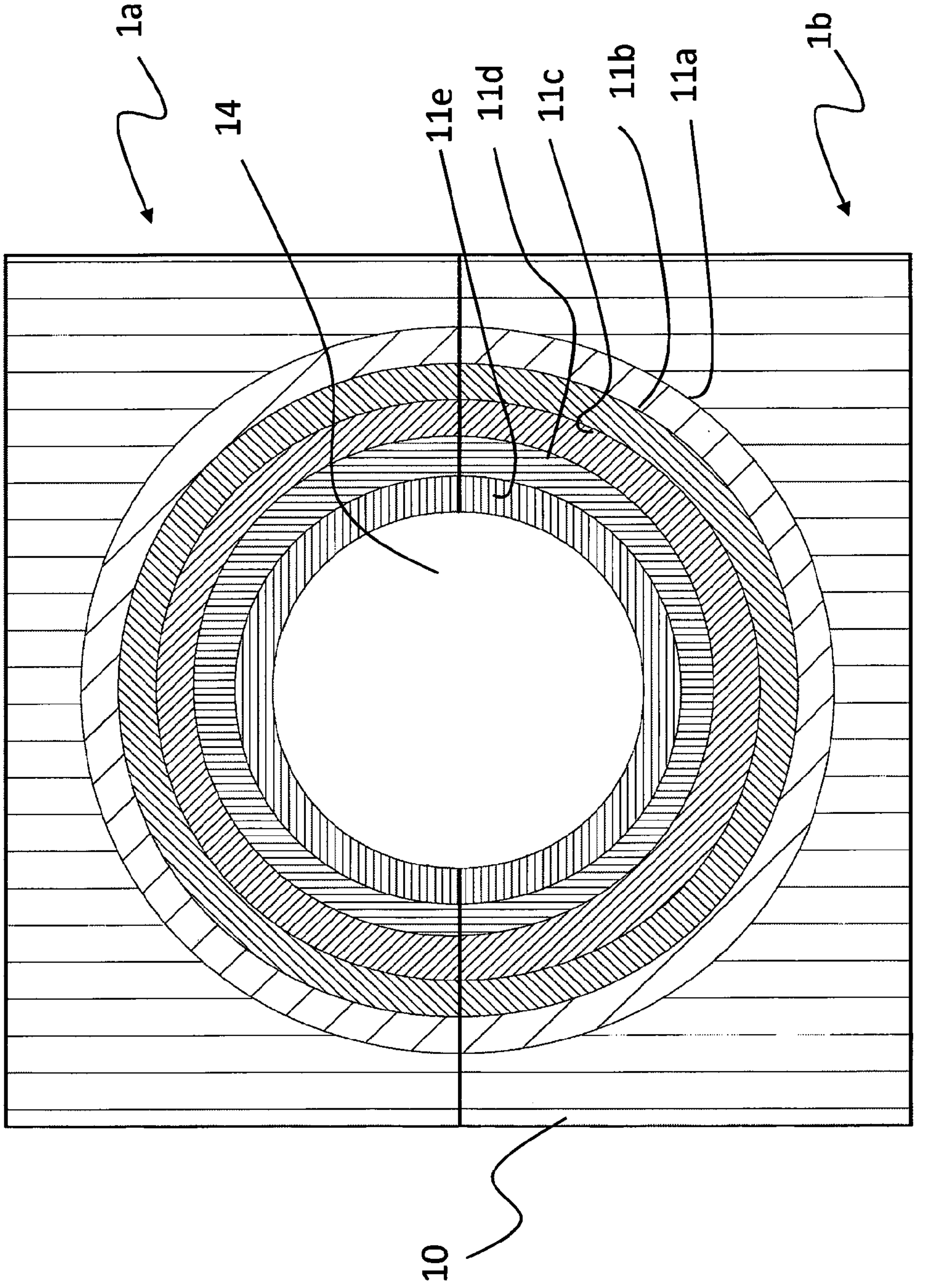
FIG. 27 is a sectional front view of the sealing module of FIG. 23, after removal three layers.
Figure 28:
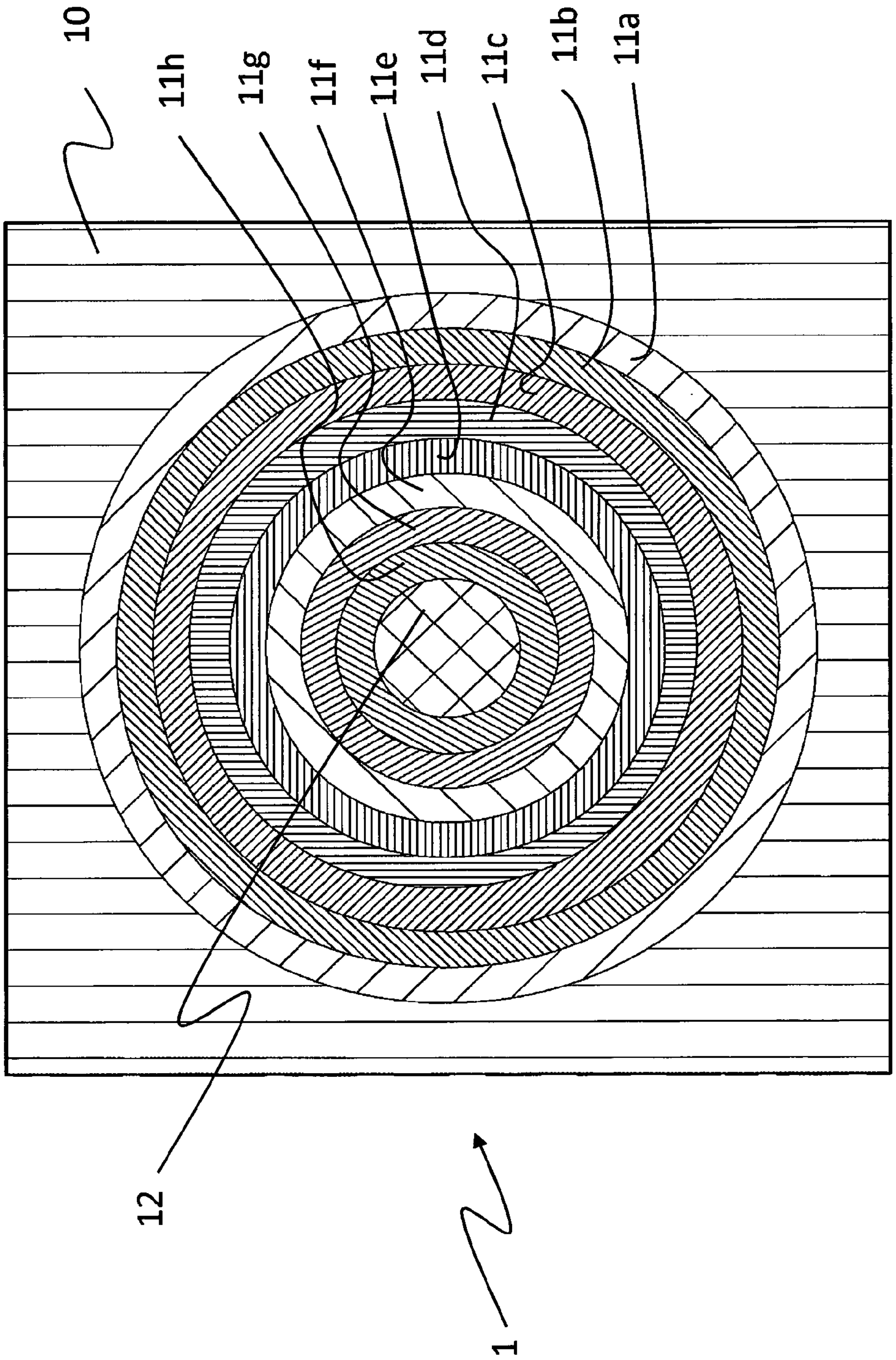
FIG. 28 is a sectional front view of another embodiment of the sealing module according to the invention wherein the hollow body has a closed section.

According to an embodiment, the layers 11*a*-11*h* may have a closed hollow section, e.g. as for example shown in FIG. 28, a circular closed hollow section, i.e. annular or ring shaped closed section. As mentioned above, different shapes can be used instead of a circular shape. In fact, according to different possible embodiments as for example shown in FIGS. 23-27, the body can be provided with an open hollow section, i.e. it is provided with an open cavity 50 (the cavity is not completely surrounded by the body shape in cross section) and the layer intended to be extruded in the cavity are sheets having an open section (not forming a closed hollow section). More in detail, according to an embodiment, as for example shown in the FIGS. 23-27, the layers can be in the form of a curved sheet having an arched shape, and preferably half of an annular shape (half of an annulus).

It has to be noted that after cutting the sealing module of FIG. 28, the embodiments of FIGS. 23-27 can be obtained.

According to an aspect of the invention, the layers 11*a*-11*h* are simultaneously extruded on a surface of the body 10 and in particular on the surface of the cavity 50. The layers 11*a*-11*h* have a correspondent shape with respect to the shape of the surface of the cavity 50 of the body so that the plurality of layers can adhere thereon.

According to an aspect, as for example shown in the attached FIGS. 23-31, the body 10 has a rectangular or square shaped external surface, with a cavity 50 having the shape of half annulus if seen in cross section.

The body 10 can be provided either by extrusion in a first extruding station (as it will be discussed in greater detail here below) or the body 10 may be obtained from other forming process (e.g. molding or extrusion). The layers are then simultaneously extruded on the body.

A core member 12 can be extruded as well together with the layers 11*a*-11*h* and it is preferably provided with a shape (internal surface) that allow it to be placed internally with respect to the plurality of layers 11*a*-11*h*.

Alternatively, the layers 11*a*-11*h* may be extruded simultaneously onto the core member 12, and the external body 10 may be provided on the layers in a subsequent time.

Also, core member 12, layers 11*a*-11*h* and external body 10 may be extruded together.

In general, the core member 12 can be extruded simultaneously to the layers or it can be produced separately from the sealing module 1, and subsequently provided. The cross section of the core member can be full (e.g. a circular full section) or hollow (e.g. an annular cross section). It has to be also noted that as an example, the core member 12 may be a rope or a cable that is used as a basis for the extrusion of the layer, and also as a driving member, i.e. a member that pulls the material after it has been extruded.

The layers 11*a*-11*h* adhere one to the other to form an adaptor 11. In other words, at the end of the production step, the layers are constrained (by adhesion) one to the other, so as to prevent movement between the layers 11*a*-11*h*.

However, the adhesion between the layers, and between the layers and the core member 12 (if provided), is loose enough to allow a user to remove (preferably by peeling) one or more layers 11*a*-11*h*, to modify the size (e.g. the diameter) of the housing 14 for passing a cable or pipe through the sealing module 1.

In particular, the size of the housing 14 is a function of the number of layers 11*a*-11*h* removed (i.e. peeled off) from the sealing module.

In fact, according to an aspect, a user can peel (preferably by hand) one or more layers 11*a*-11*h* to adapt the sealing module for the use with cables of different dimensions.

Figure 23:
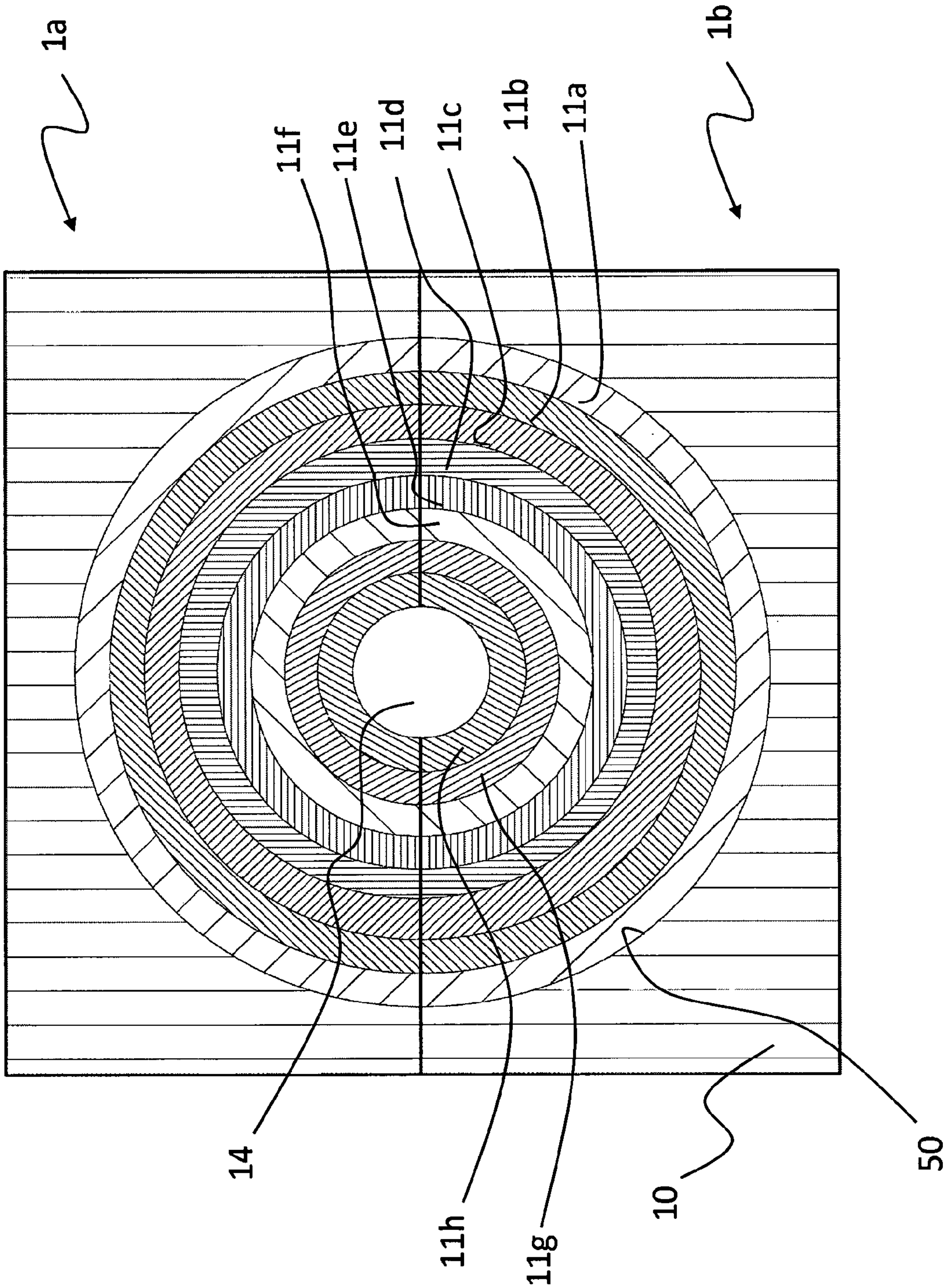
FIG. 23 is a sectional front view of a sealing module according to a possible embodiment of the invention.
Figure 26:
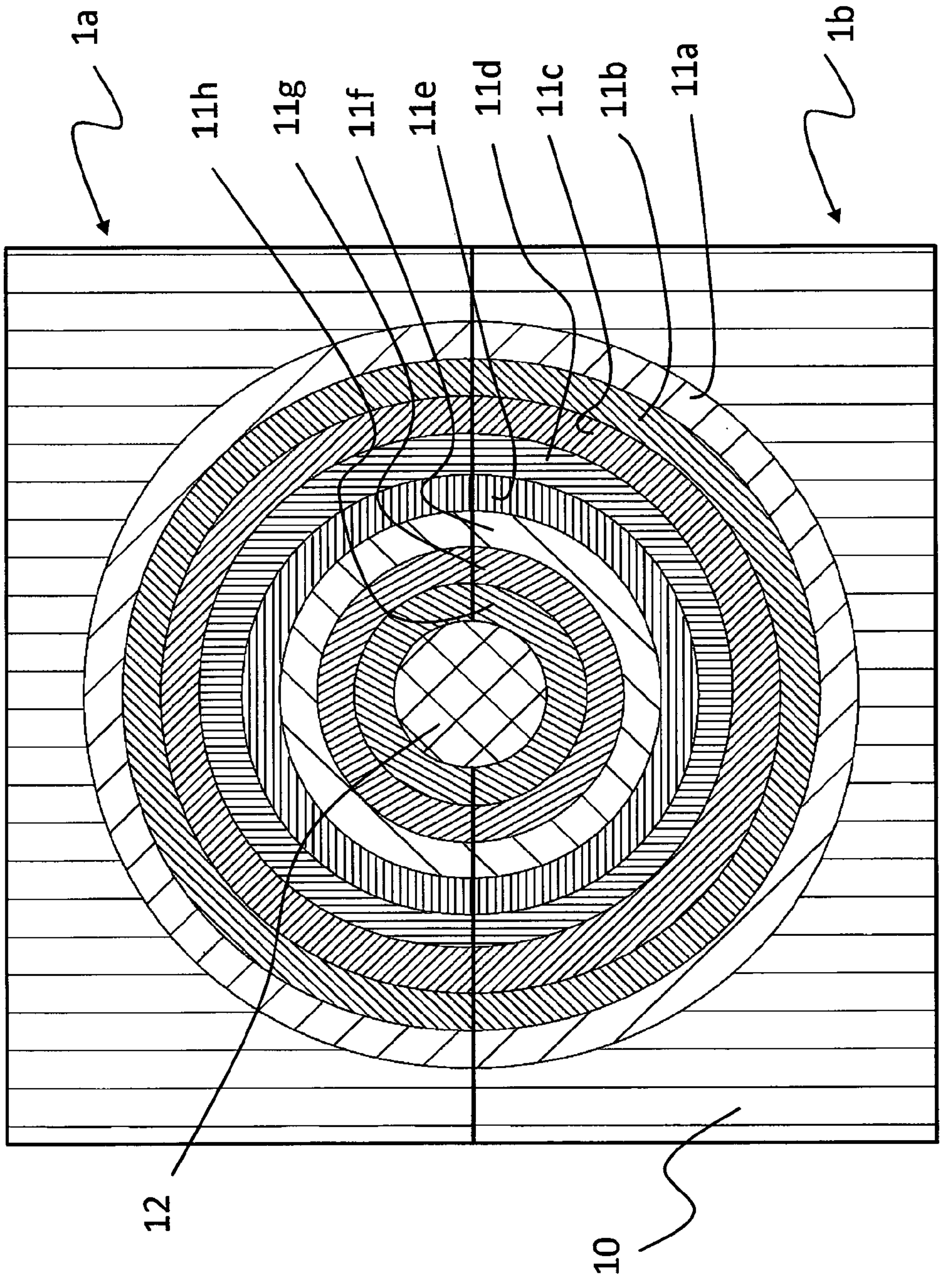
FIG. 26 is a sectional front view of the sealing module of FIG. 23 wherein a core member is also shown.

As an example, in FIG. 26, no layer 11*a*-11*h* is removed, and the core member 12 is still within the adaptor 11. As a result, no pass through housing 14 is present because the sealing module is completely filled by the layers and the core member thus no passage for the cable is present, and a cable cannot be inserted within (and through) the sealing module 1. With reference to FIG. 23, no layer 11*a*-11*h* is removed, but the core member 12 is no longer present within the adaptor 11.

As a result, a hollow volume is formed within the sealing module. In other words an empty volume of the housing 14 is provided, so that a cable or pipe can be pass through the sealing module 1 via this empty volume of the housing 14. In this case, the opening has a small cross-section, so that only small cables/pipes (i.e. having small cross section) can be housed in the sealing module 1.

By removing one or more layer(s), the cross section of the housing 14 (i.e. the empty volume of the housing 14) can be increased and adapted to the size (e.g. external circumference) of the cable or pipe (or similar element) to be hosed in the sealing module.

As an example, in FIG. 27, layers 11*h*-11*f* have been removed from the sealing module, so that the cross section of the housing 14 (i.e. empty space or not occupied space of the housing) is bigger with respect to the one of FIG. 26. As a result, bigger cables/pipes can be housed within the sealing module.

In the shown embodiment, the layers have substantially identical thickness one with respect to the other. Also on this case, it has to be noted that this condition is preferred, but it is not strictly required.

The extruding station may thus be configured so as to produce at least two layers having thickness different one from the other. In addition (or as an alternative), two or more layers may be extruded so as to be substantially permanently attached one to the other (e.g. by properly choosing the material, the extrusion temperature, avoiding the presence of a detaching agent, etc.). As a result, the sealing module will be provided with a reduced number of layers with respect to the number of layers that are extruded, because part of the extruded layer are attached one to the other so as to form a single thicker layer in the sealing module. As an example, layers 11*b* and 11*c* may be extruded so as to be permanently joined one to the other so as to form a single layer having a thickness that is twice the thickness of the other layers. In other words, the sealing module of this example will not be provided with eight layers, but it will be provided with seven layers, one of which (i.e. 11*b*+11*c*) has a greater thickness with respect to the other ones. According to an embodiment, the body 10 (and possibly also the core member 12), in addition to the layers 11*a*-11*h* (i.e. the adaptor 11), is made of a thermoplastic material, allowing an extrusion simultaneous of the elements of the sealing module 1. Otherwise, only the layers 11*a*-11*h* may be extruded of thermoplastic material, while a closed section hollow body 10 (or at least one open section hollow body) may be provided and the layers extruded on it or constrained to it after extrusion.

According to the invention, suitable thermoplastic material are thermoplastic elastomers, thermoplastic rubbers (such as Santoprene), thermoplastic polyurethanes (TPU), thermoplastic fluoropolymer elastomers (e.g. the one knows as Viton), thermoplastic copolyester elastomers (e.g. the one traded with the name Hytrel), thermoplastic polyamides (e.g. Nylon or PA-12).

These and other thermoplastic materials are suitable materials for the production body 10, if it is produced by extrusion, and the layers 11*a*-11*h*.

The core member 12 can be made of a thermoplastic material as well, e.g. the materials of the body 10 and/or of the layers 11*a*-11*h*.

The body 10 can be extruded in the first step of production of the sealing module, possibly simultaneously with respect to the layers, or it can be produced separately from the sealing module 1, and used as a base for the extrusion of the sealing module 1 and in particular of the layers 11*a*-11*h*.

In the case the body 10 is provided by extrusion, i.e. in a first step of extrusion of thermoplastic material, the layer 11*a* of the plurality of layers 11*a*-11*h* contacting the cavity 50 of the body preferably adheres on the body so as to be constrained to it. In other words, such a layer 11*a* cannot be removed (peeled off) from the body 10.

This can be for example achieved by properly selecting the extrusion parameters and/or by not providing a detaching agent between the body and the layer contacting the cavity of the body 10. It has to be also noted that the body can be constrained to the first layers with other known techniques, different from the direct extrusion of the layers on the body. For example the layers and the body can be constrained by an adhesive and in general by any known method, e.g. by gluing or by adhesion between the materials of the body and the layers.

Returning now on the extrusion process, as before mentioned, a simultaneous extrusion of the layers it is meant that the layers are extruded at the same time, preferably at the same extruding station.

Figure 29:
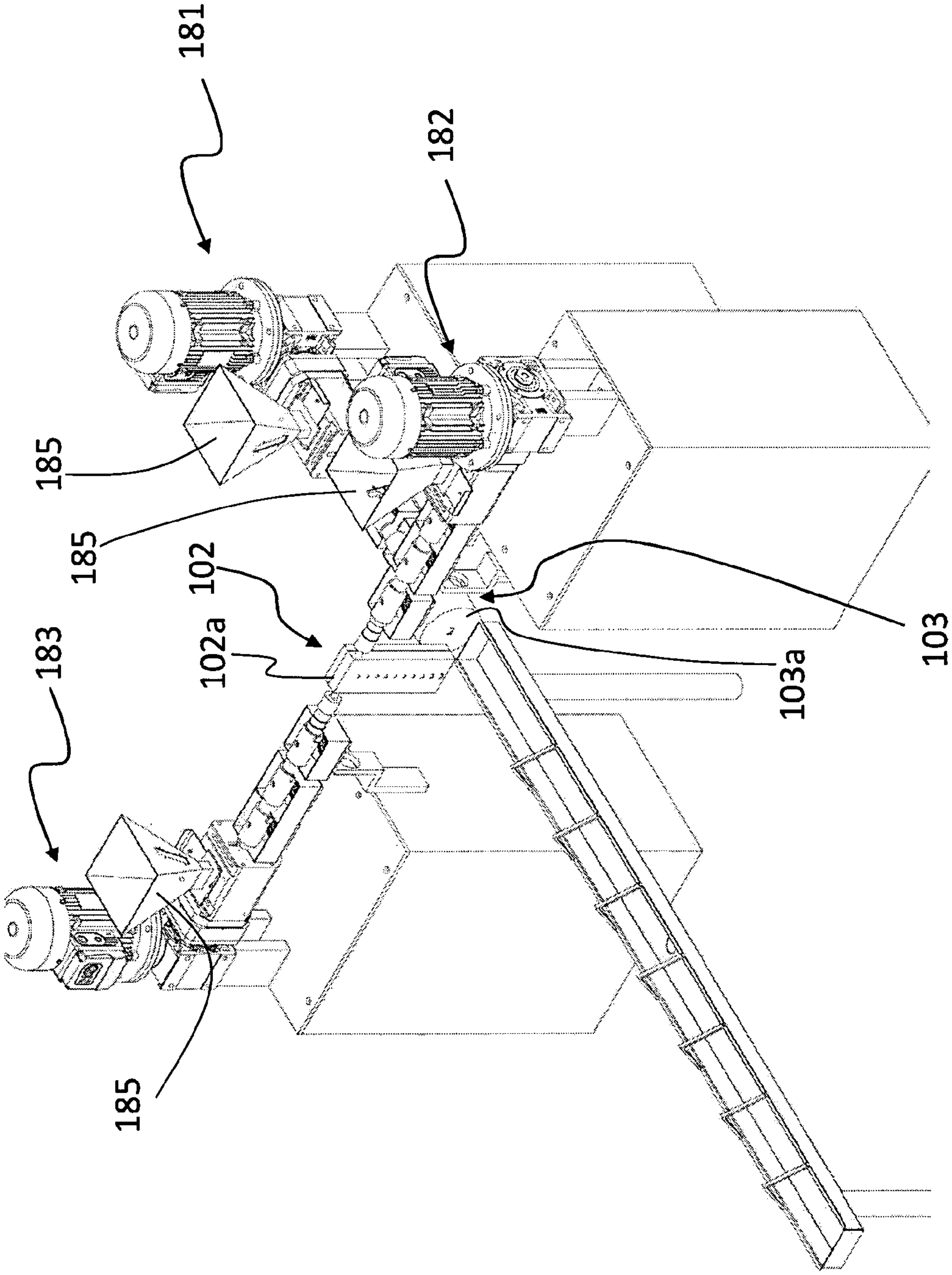
FIG. 29 is a perspective view of a third embodiment of an apparatus for the production of a sealing module according to the invention.
Figure 30:
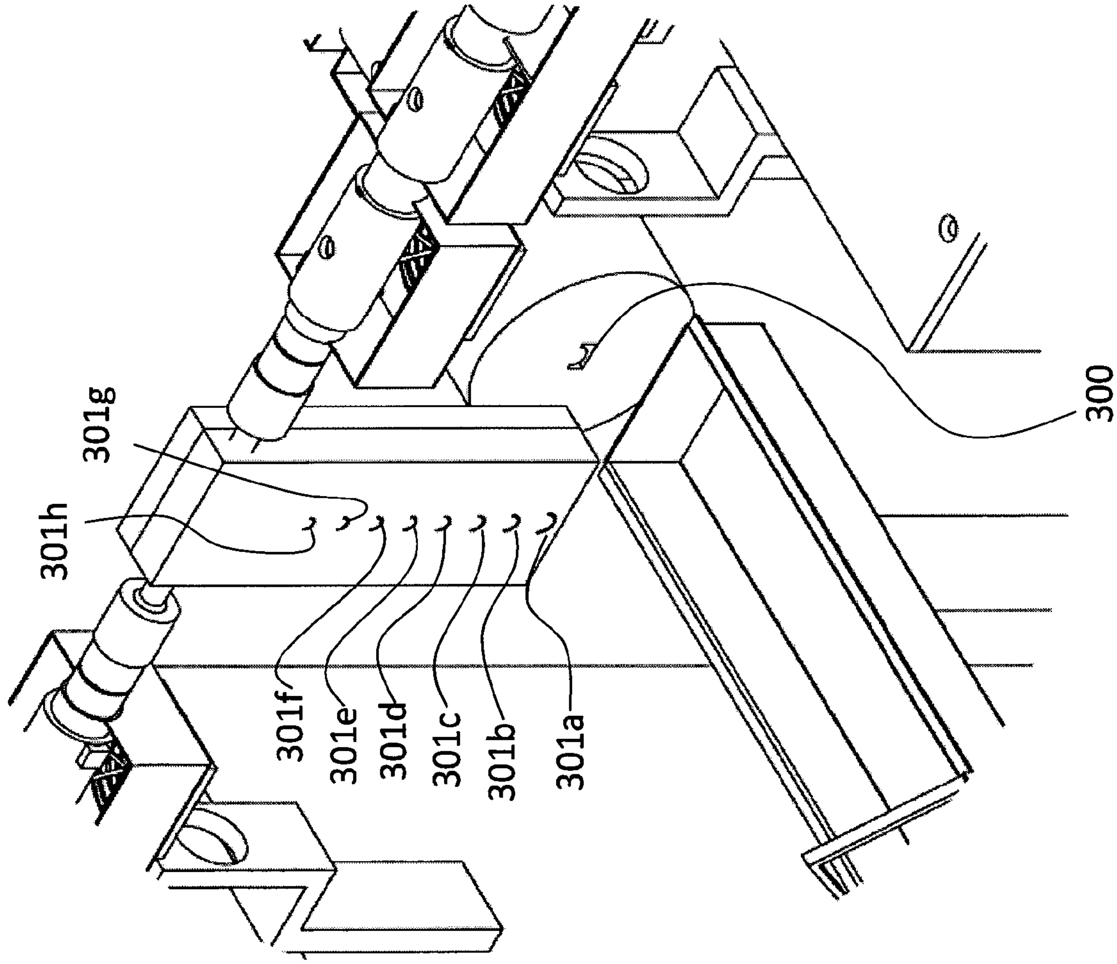
FIG. 30 is a detailed view of the extrusion station.

FIGS. 29 and 30 show a possible embodiment of the apparatus according to the invention for carrying out a simultaneous extrusion of the layers and, optionally, of the body 10 and/or of the core member 12.

The apparatus 100 comprises at least an extruding station 102 comprising a plurality of extrusion holes 301*a*-301*h* configured to allow a simultaneous extrusion of the layers 11*a*-11*h*. One or more additional extrusion hole 300, 302 can be provided to extrude the body 10 and the core member 12.

At least one source 181, 182, 183 of thermoplastic material is provided to feed said extruding station and in particular the extrusion holes of the extrusion dies. For example two or more sources 181, 182, 183 of thermoplastic material can be connected to the at least one extruding station.

It has to be noted that the holes 300, 301*a*-301*h*, 302 can be arranged on a single extrusion die 102*a*, provided with channels to receive the thermoplastic material from one or more sources 181, 182, 183 and supply it to the extrusion holes.

However, it is not excluded that more than one extrusion die 102*a* is provided and one or more extrusion holes is/are arranged on the each extrusion die 102*a*. In other words, instead of providing a single extrusion die with a plurality of holes, two or more extrusion die can be provided each having one or more extrusion hole. The two or more dies and in particular the extrusion holes thereof are arranged to allow the simultaneous extrusion of the layers.

The feeding of plastic material to the extruding station may be operated in different ways. As an example, each extruding station may be provided with a (known) source 180 of material to be extruded. The source 180 typically comprises (in a known manner) a hopper 185 to receive plastic material, and to feed it to an extrusion screw (not shown) that melts (possibly together with a relevant heater) and forces the material towards the relevant extrusion die.

As an alternative, a source 180 may feed material to different extrusion dies, for example via suitable ducts, preferably heated ducts, intended to maintain the temperature of the material at a desired value or within a desired temperature range.

A pump, preferably a volumetric pump can be provided to accurately dose the material to be supplied.

According to an embodiment, as for example shown in FIGS. 29 and 30, an extrusion die 102*a* is provided with extrusion holes 301*a*-301*h* to simultaneously extrude the layers 11*a*-11*h*. The extrusion die 102*a* is connected to two sources 182, 183 of thermoplastic material. Another extrusion station 103 and another extrusion die 103*a* is provided to extrude the body 10 from an extrusion hole 300. The extrusion die 103*a* is connected to another source 181 of thermoplastic material. If two or more extrusion dies are provided, a same source of thermoplastic material can be connected to them for example via a distribution line of the thermoplastic material.

In any configuration, the extrusion holes are arranged so as to allow the mentioned simultaneous extrusion at least of the plurality of layers.

According to an embodiment, the extrusion holes 300, 301*a*-301*h*, 302, and in particular the outlet sections of the extrusion holes, are substantially coplanar one with the other, i.e. are arranged substantially on the same plane. Typically such a plane is perpendicular to the direction along which the extrusion occurs. In particular, according to a preferred embodiment, such a plane is arranged substantially vertically (considering the condition in use of the apparatus). Therefore a simultaneous extrusion, i.e. an extrusion at the same time of the layers and possibly of the body 10 and/or of the core member 12 can be achieved.

At least part of the extrusion holes have similar shapes, with different size and in particular progressively increasing. According to an aspect, the holes have increasing size towards the body 10.

In the shown embodiment, all the layers 11*a*-11*h* and the core member have identical cross section (except for the size), i.e. circular or of a half of circle (half of a annulus) in this particular case. In other words, the shapes of the cross section of the layers and of the core member are "similar", in a strict geometrical meaning. The shape of the holes 301*a*-301*h* have a shape correspondent to that of the layers to be extruded, such as for example a circular or of a half of circle (half of a annulus).

The body 10 has a rectangular cross section with the cavity 50 preferably having a substantially arch shape. This may be achieved my means of a rectangular hole 300 of a die having a corresponding substantially arch shape cavity (see for example FIGS. 29 and 30). If however, a closed section hollow body has to be extruded, the hole 300 of the die will be accordingly provided with closed section shape (see for example FIG. 31).

It has to be noted that according to a possible embodiment, as for example shown in FIGS. 29 and 30, the extrusion holes 300, 301*a*-301*h*, 302 are arranged one above the other.

This configuration is typically used if the layers 11*a*-11*h*, and possibly the body 10, have an open section shape.

Figure 31:
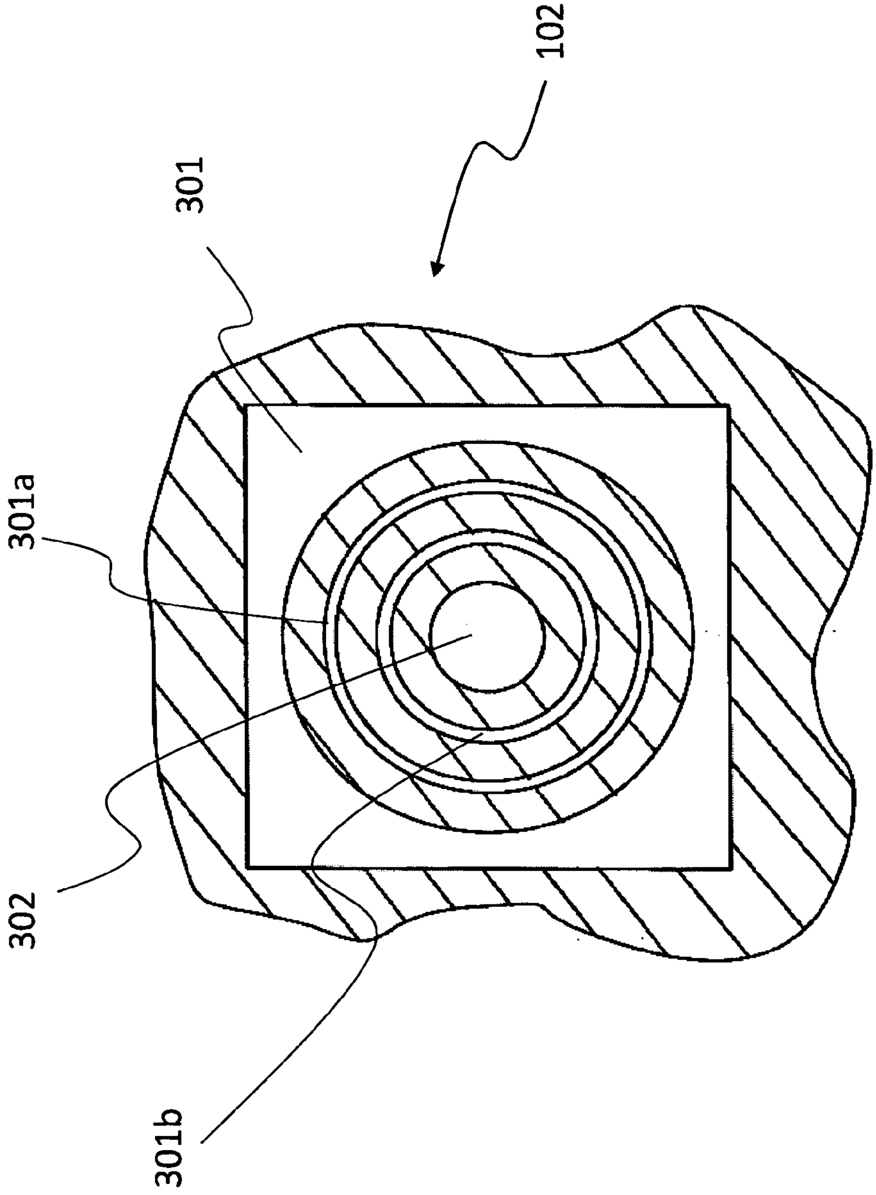
FIG. 31 schematically shows the extrusion holes of a die of an apparatus according to the third embodiment of the present invention, wherein the holes are arranged concentric one to another to provide a simultaneous extrusion.

According to another possible option, as for example shown in FIG. 31, the extrusion holes 300, 301*a*-301*h*, 302 are arranged concentric one with respect to the other. This configuration is typically used if the layers 11*a*-11*h*, and possibly the body 10, have an closed section shape, e.g. a circular (annular) shape.

As also discussed here below, it has to be noted that the rectangular or square section of the body 10 (external body 10) is not limitative. In fact, the body 10 can be extruded, or cut, so as to provide different shapes of the cross section, for example the body 10 can be directly extruded or subsequently cut to provide a polygonal section, the number of lateral sides being selected according to the need, or a circular or oval section, etc.

It has to be also noted that, as already mentioned, in the shown schematic embodiment, the body 10 is extruded from the extrusion hole 300. In different embodiments, the body may be produced separately (and thus before) the sealing module 1. In this case, the body already formed can be delivered to the extrusion die 102*a* where the layers 11*a*-11*h* are extruded from the holes 301*a*-301*h* simultaneously on the body 10.

Extrusion parameters can be e.g. chosen between the extrusion speed, the extrusion temperature and the distance between the holes and in particular the distance of the outlet of the holes in the plane in which they are arranged.

In fact, according to an aspect, the distance between the holes (e.g. the distance between the holes arranged substantially coplanar), and/or the extrusion speed and/or the extrusion temperature are set in order to allow a good adhesion between the layers, which should at the same time not be too strong, in order to allow a user to remove, preferably to peel off by hand, one or more layers 11*a*-11*h*.

For example, the extrusion temperature can be set in the range 160° Celsius-240° Celsius. The extrusion speed, that is corresponding to the moving speed of the extruded thermoplastic material from the holes, can be for example in the range 1 meter/minute-2 meter/minute, preferably in the range 1 meter/minute-1.5 meter/minute.

The extruded thermoplastic material can be cooled.

This can be done via natural cooling (exposure of the material to ambient air), or by delivering a coolant to the extruded thermoplastic material.

For example water may be delivered (e.g. sprayed) onto the extruded thermoplastic material exiting the holes. As a result, one or more driers may be provided at the exit of the holes. According to an aspect of the invention, in order to prevent a too strong adhesion, a detaching agent may be provided before the thermoplastic material is extruded (e.g. in the feeder supplying solid thermoplastic material to the extrusion die) and/or after the thermoplastic material has been extruded, i.e. after the thermoplastic material exits the extrusion holes. In the latter case, the detaching agent can be delivered to the extruded thermoplastic material at the exit of the extrusion holes.

The coolant itself may be the detaching agent, or the coolant may contain the detaching agent (e.g. the detaching agent can be mixed or added or emulsified with a coolant). According to an aspect, silicone as detaching agent is used added to water used a coolant.

Figure 24:
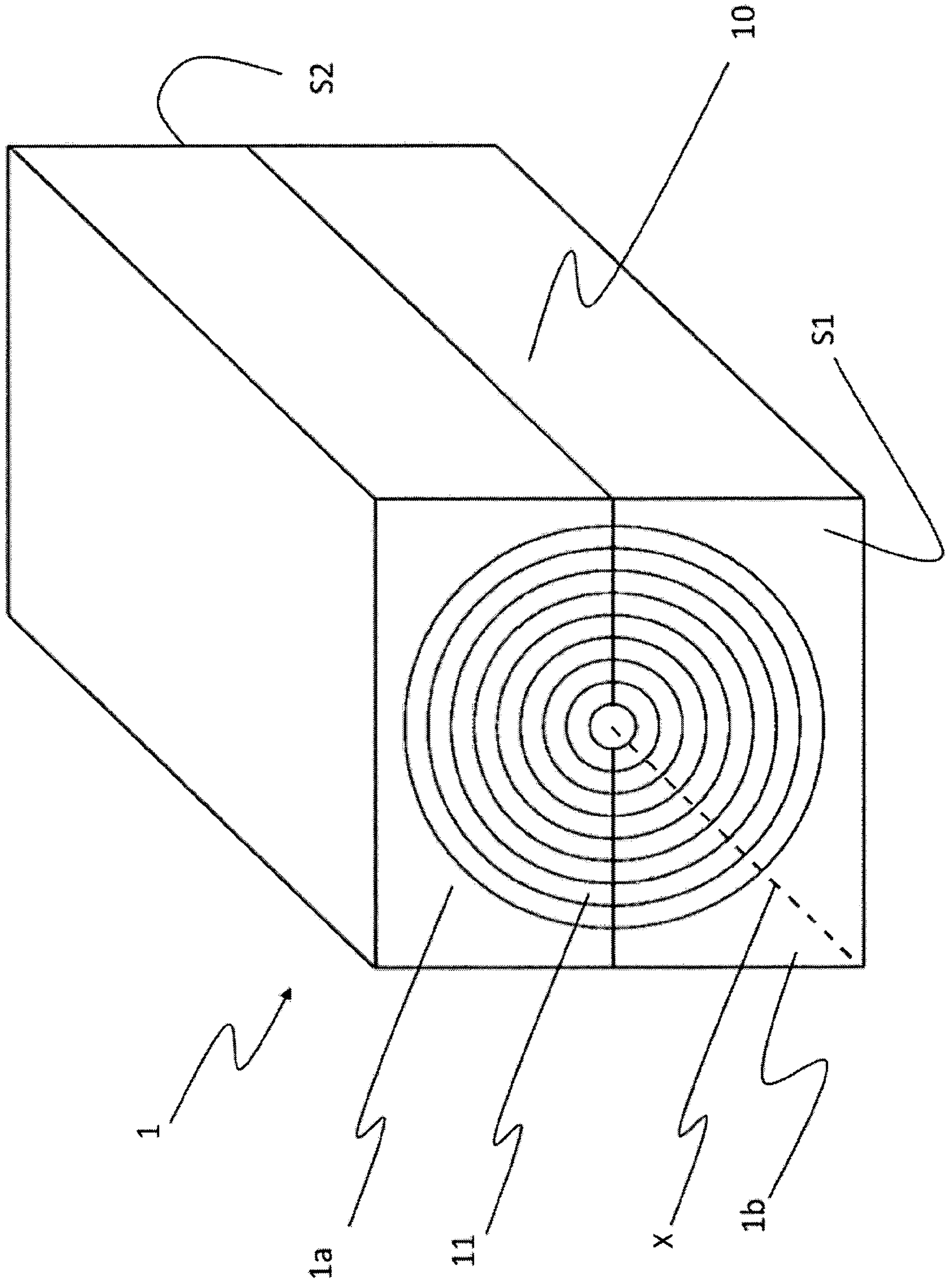
FIG. 24 is a perspective view of the sealing module of FIG. 23.
Figure 24A:
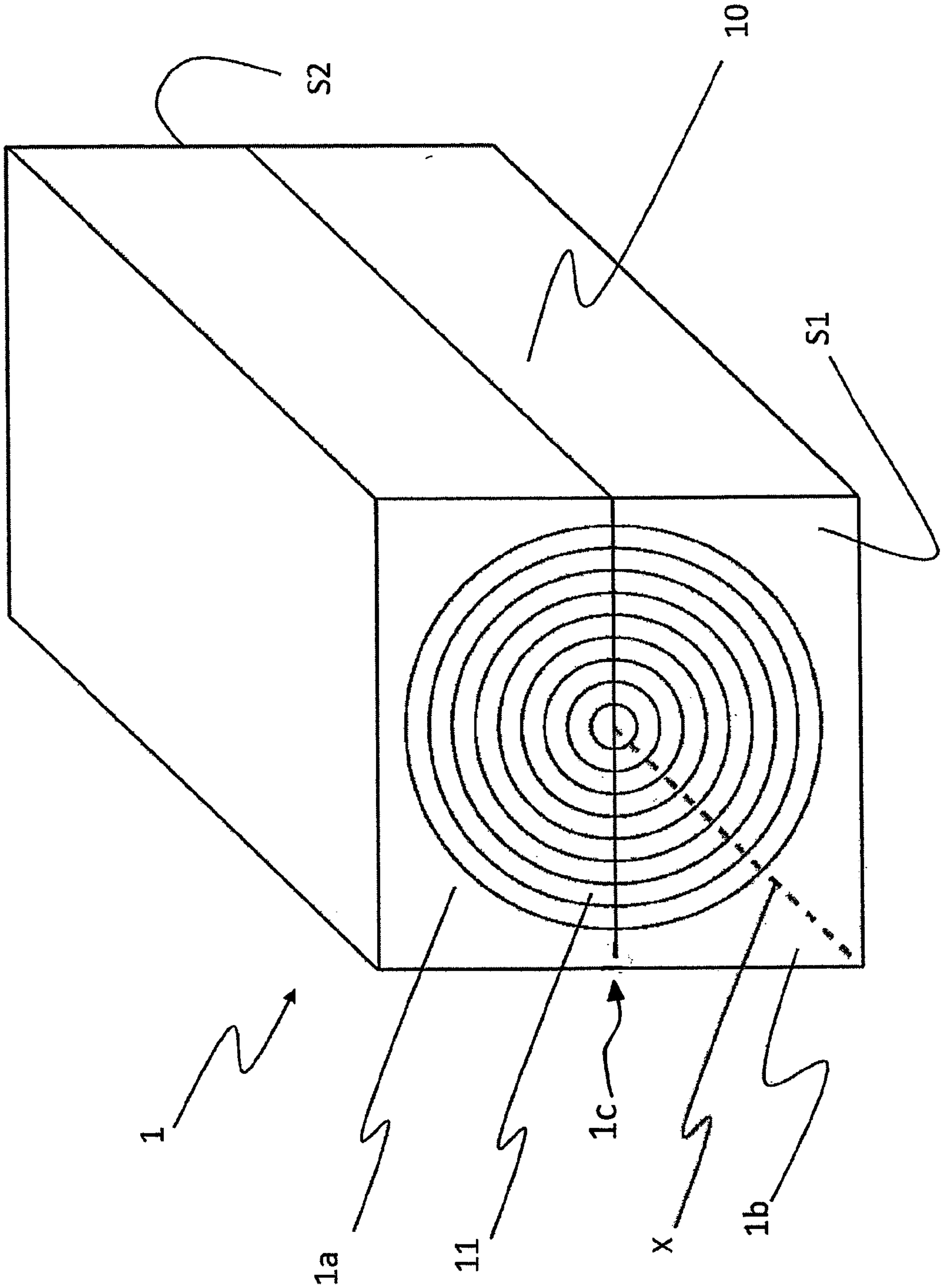
FIG. 24A is a perspective view of the sealing module of FIG. 23 wherein the two portions of the sealing module are not completely cut and are partially connected one to another.
Figure 25:
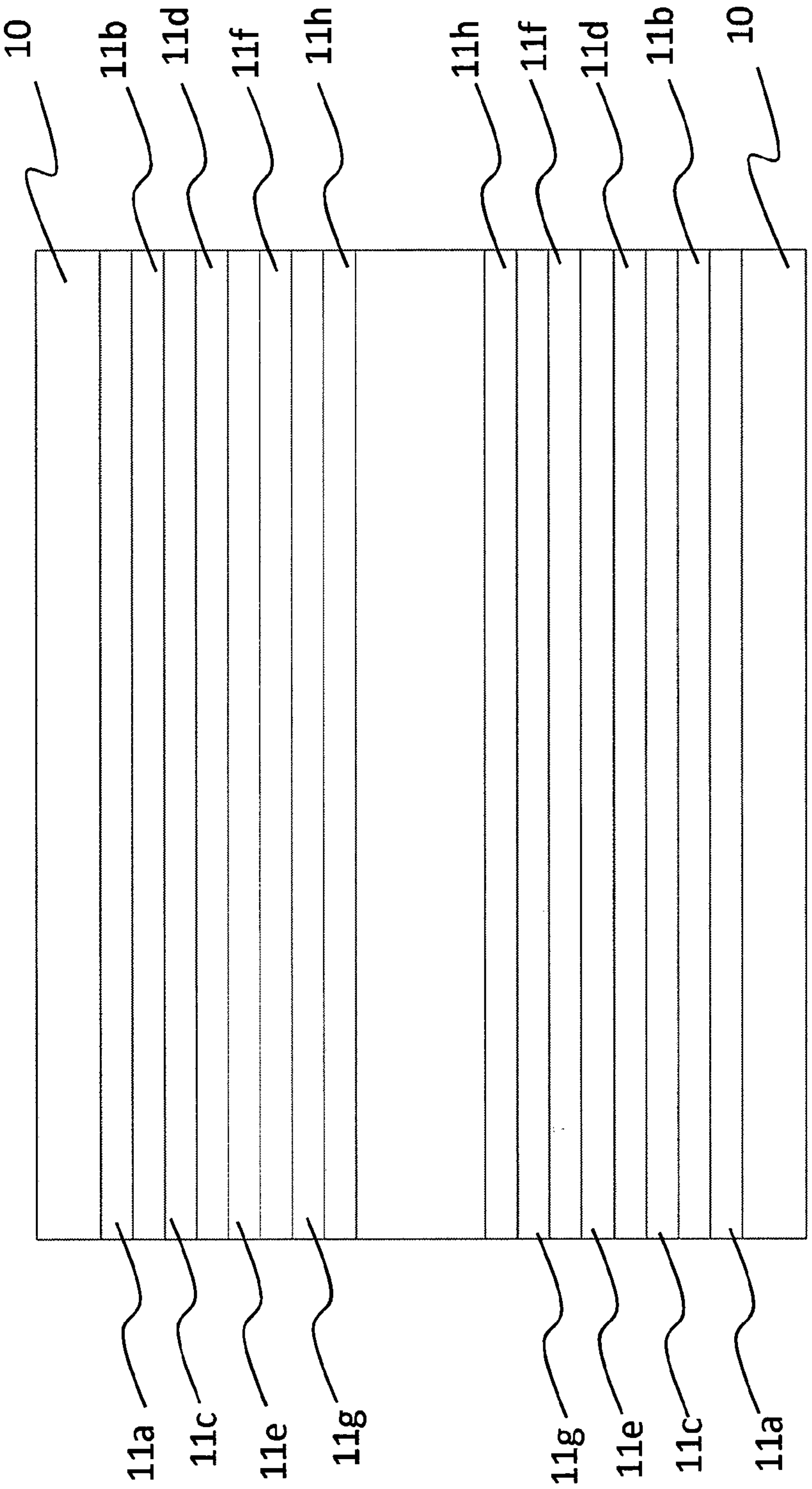
FIG. 25 is a schematic, sectional plant view of the sealing module of FIG. 23 (the view is rotated by 90 degrees)

Also, the sealing module 1, in particular the sealing body 10—if provided with a close hollow shape—and the adaptor 11 (possibly also the core member 12, if present), can be completely or partially cut into two portions 1*a*, 1*b*. FIG. 24A shows a sealing module that is partially cut. As already mentioned above, with the expression partially cut it is meant that the sealing module, and in particular its external body is not completely cut so as to keep an integral connection part 1*c* between two portions 1*a*, 1*b* of the sealing module. In particular two portions 1*a*, 1*b* of the external body 10 are formed, which are constrained one to another and can be moved (e.g. rotated) one with respect to another, for the cable insertion, while the two portions are constrained in at least one point or area of connection 1*c*. This area of connection is preferably arranged close to (in correspondence of) the external surface of the external body 10 so that this part can act as a hinge allowing the relative rotation of the two portions of the sealing module. The extension of the area of point of connection 1*c* can be varied with respect to the one shown in FIG. 24A and for example can be limited to the longitudinal edge of the two portions 1*a*, 1*b*.

According to an aspect, as already mentioned above, the two portions 1*a*, 1*b* can be constrained one to another by providing a constraining or connection area between the two portions, for example by providing an additional joining part or by providing an adhesive or by welding, thus joining the two portions. In general the two portions are joined or connected together in a point or area of connection 1*c*. As already mentioned above, this area of connection is preferably arranged close to (or in correspondence of) an external surface of the external body so that this part 1*c* can act as a hinge allowing the relative rotation of the two portions of the sealing module. The sealing module 1 is cut along the axis X of the housing 14, i.e. along the axis passing through the two opposite surfaces of the sealing module through which the cable is passed. It has to be noted that the axis X corresponds to the axis of the cable or pipes that is passed through the sealing module. Typically the sealing module 1 is cut along the axis X, so as to be divided (partially or completely) into two portions 1*a*, 1*b* substantially symmetrical. This operation simplifies the removal of one or more layers 11*a*-11*h*, and the insertion of a pipe or cable within the housing 14. A sealing module having a closed section hollow body 10 is for example shown in FIG. 28.

This step can be avoided if for example the body 10 has an open section.

Figure 23B:
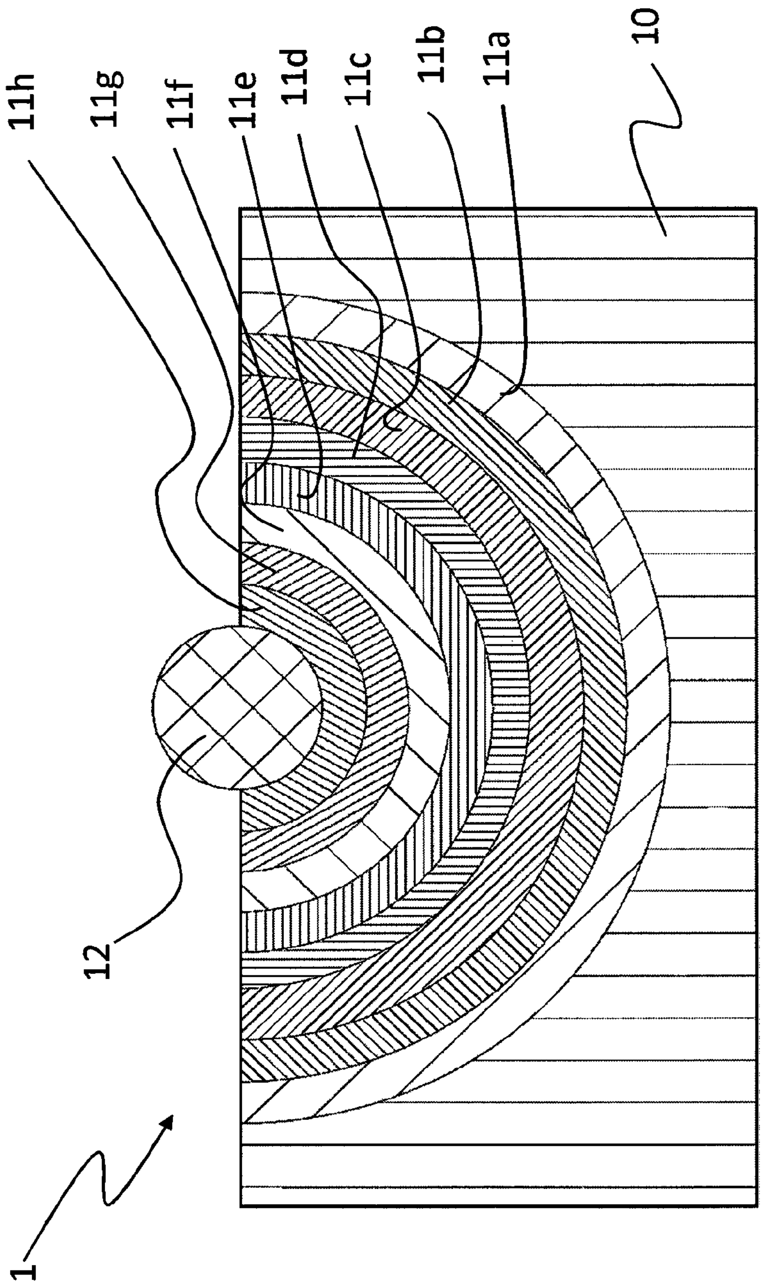
FIG. 23B is a sectional front view of a sealing module having an open section hollow body.

A sealing module 1 having an open section hollow body may be formed such that its finished product is e.g. similar to the portion 1*a* or 1*b* of the sealing module 1, as for example shown in the FIGS. 23-27. A sealing module 1 from an open section hollow body 10 is e.g. shown in FIG. 23B. In more detail, a possible embodiment of an apparatus 100 for the production of a sealing module 1 is disclosed with reference to FIGS. 29-31.

The apparatus 100 is provided with an extruding station 102 comprising a die 102*a* having extruding holes 301*a*-301*h* to simultaneously extrude the layers. An additional extrusion die 103*a* can be provided with extrusion hole 300 to extrude the body. It has to be noted that the body 10 can be provided not by an extrusion process. it has to be also noted that an extrusion hole 302 can be provided on the extrusion die 102*a* or at another extrusion die to extrude a core member 12, if present.

For example, with reference to the FIGS. 30-31:

hole 300 extrudes the body 10;
hole 301*a* extrudes layer 11*a* on the body 10;
hole 301*b* extrudes layer 11*b* on layer 11*a;*
hole 301*c* extrudes layer 11*c* on layer 11*b;*
hole 301*d* extrudes layer 11*d* on layer 11*c;*
hole 301*e* extrudes layer 11*e* on layer 11*d;*
hole 301*f* extrudes layer 11*f* on layer 11*e;*
hole 301*g* extrudes layer 11*g* on layer 11*f;*
hole 301*h* extrudes layer 11*h* on layer 11*g;*
hole 302 can be used to extrude the core member 12 on layer 11*h*.

As mentioned, at least the extrusions of the layers 11*a*-11*h* is carried out simultaneously. Thermoplastic material is forced through the holes of the extrusion die 102*a*, 103*a* so that the external shape of the thermoplastic material is shaped as the hole of the extrusion die.

The extruding stations 102, 103 are also provided with known means (not shown in detail) to feed thermoplastic material to the extrusion die 102*a*, 103*a* and means for melting the thermoplastic material (e.g. a melting cylinder) and a moving means such as a moving screw.

It has to be noted that according to an aspect, the extruding station according to the invention comprises a pump, e.g. a volumetric pump, or other suitable supply means, to effectively control the quantity of melted thermoplastic material supplied to the extrusion die.

The pump, or similar means, is preferably provided upstream of the extrusion die. Preferably the pump, or similar means, is arranged between the extrusion die and the melting cylinder.

By doing so it is possible to reach high accuracy in controlling the thickness of each layer of thermoplastic material.

The extruding holes 301*a*-301*h* are arranged, preferably in a same plane (i.e. on the same surface of the die 102*a*) one above another, so that the extruded material can be placed on the extruded material below. The body 10 is preferably either extruded or provided in the lower position so that the simultaneously extruded layers are arranged on it.

Similarly in the other possible embodiment, schematically shown for example in FIG. 31 for only some layers, a plurality of concentric holes are provided to simultaneously extrude the layers. Also in this case the holes and in particular the outlet sections are arranged on the same plane (i.e. on the same surface of the die 102). A plurality of concentric annular holes 301*a*-301*h* (only part of them are shown in the schematic view of FIG. 31) are provided to simultaneously extrude the layers 11*a*-11*h*. It has to be noted that also in this case, extrusion holes 300, 302 can be provided to simultaneously extrude the body 10 and the core member 12.

Guiding means not shown are preferably provided to guide the extruded thermoplastic material. For example rollers, not shown, can be provided to support the extruded thermoplastic material. The rollers may be motorized, so as to pull the extruded thermoplastic material.

In general, guiding means allow to guide and support the extruded thermoplastic material, and in particular the layers extruded simultaneously, and possibly also the body 10 on which the layers are extruded.

The apparatus 100 may be provided with a coolant feeder, not shown, to provide coolant to the material extruded from the extruding stations. The coolant, typically water, is preferably delivered to the extruded thermoplastic material in misted form, e.g. by means of one or more sprayers or sprinkler.

A drier may be provided to dry the coolant. The drier may be arranged e.g. to direct air (e.g. hot air) towards the extruded thermoplastic material. A drier may be also provided without the coolant feeder, e.g. to generally dry the extruded thermoplastic material exiting the extrusion holes.

Below the extrusion holes, a recovery tray 160 may be provided, usually to recover the coolant falling from the extruded thermoplastic material.

Furthermore, a detaching agent feeder may be used to deliver a detaching agent to the extruded thermoplastic material. The detaching agent may be for example an oil or other suitable lubricant, or can be in the form of a powder (e.g. talc powder).

It has to be noted that a detaching agent, can be provided in the feeder of thermoplastic material of the extruding station. In other words the detaching agent, for example in the form of grains or pellets, can be added to the feeder of solid thermoplastic material at the extruding station. The pellets or grains of detaching agent are dispersed in the melted thermoplastic material and, in particular, the detaching agent emerges at the external surface of the extruded thermoplastic material. This allows to provide a detaching action when a thermoplastic material is simultaneously extruded thereon so that the adhesion between the layer is such as to allow removal, preferably by peeling, of one or more layer.

According to an aspect, detaching grains or pellets, e.g. of the type known in the field of extrusion of thermoplastic material can be added to the thermoplastic material in the feeder of hopper of the extruding station.

Otherwise, as before mentioned, a detaching agent may be mixed with the coolant.

As an example, the coolant feeder may comprise a coolant tank, housing the coolant in liquid form. The detaching agent, e.g. silicone, may be e.g. dispersed within the coolant in the coolant tank.

A cutting station may be provided to cut the extruded thermoplastic material, to obtain directly a sealing module 1, or a semi-finished product. Further cutting operation may be provided (typically on a different apparatus from the apparatus 100) to e.g. cut the body into a rectangular section.

It has to be noted that the body 10 (external body 10) can be provided or extruded or cut so as to provide different shapes of the cross section, for example the body 10 can be directly extruded or subsequently cut to provide a polygonal section, the number of lateral sides being selected according to the need, or a circular or oval section, etc.

Operation of the apparatus 100 according to the invention, preferably for carrying out the method according to the invention is evident from the above and can be summarized as follow.

A plurality of layers 11*a*-11*h* are simultaneously extruded from extrusion holes 301*a*-301*h*. The layers are extruded simultaneously either with an open shape (as for example shown in FIGS. 29 and 30), or with a closed shape (as for example in FIG. 31).

A body 10 is extruded by an extruding hole 300 or it can be provided already formed via a different forming process. For example, as an alternative, not shown, the body 10 can be produced by means of another apparatus.

An extrusion hole 302 can be provided, on the same extrusion die 102*a*, or at a different extrusion die, to extrude the core member 12. Also the core member can be provided with a different forming process, thus it is not necessarily extruded in the apparatus 100.

Coolant and/or detaching agent(s) may be delivered to the extruded thermoplastic material via a coolant feeder and/or the detaching agent feeder.

It has to be also noted that the a detaching agent can be provided before the thermoplastic material is extruded, i.e. provided to the thermoplastic material in the solid state for example in the thermoplastic material feeder or hopper of an extruding station. The provision of a detaching agent before the extrusion of the thermoplastic material can be carried out in alternative, or in combination, with the provision of a detaching agent to the thermoplastic material after its extrusion, i.e. to the thermoplastic material exiting the extrusion die.

It has to be noted that, in both the above mentioned cases, a detaching agent is present on the external surface of the extruded thermoplastic material on which simultaneously a thermoplastic material is extruded. In other words, according to an aspect of the invention a detaching agent is provided on the external surface of a layer on which another layer is extruded simultaneously and/or on the external surface of the core member (if provided).

The presence of the detaching agent at the interface between a core member and a layer and/or between a layer and another layer (i.e. between two layers) allows to provide the desired adhesion of these elements while allowing a separation, i.e. allowing a removal or peeling (preferably a peeling by hand) of the thermoplastic material.

It has to be noted that, the desired adhesion between the thermoplastic materials extruded simultaneously allows a separation (removal or peeling) can be obtained by a proper of the extrusion parameters, as for example mentioned above, in combination or in alternative to a provision of detaching agent. As mentioned above, according to an aspect of the invention the detaching agent can be carried out before and/or after the extrusion of the thermoplastic material. Therefore, a detaching agent is present between two layers of thermoplastic material extruded simultaneously, i.e. between two layers of thermoplastic materials of the sealing module according to the invention.

Possibly, the extruded thermoplastic material (in particular when wet with a coolant) may be dried by means of drier.

It has to be noted that according to an aspect, the layer 11*a* of the adaptor extruded on the body 10 from the hole 301*a*, is preferably cooled in a quick cooling step and without the addition detaching agent, i.e. without detaching agent added in the material used for the extrusion of the first layer.

Also the thermoplastic material used for the extrusion of the sealing body 10 is not provided with a detaching agent so that the body 10 is constrained to the layer 11*a*. Therefore, according to an aspect of the invention, the layer 11*a* is not removable (it cannot be peeled off) and it is permanently constrained to the body 10. In other words the layer 11*a* and the body 10 can be constrained one to another to be not separable.

On the contrary, as mentioned before, the extrusion parameter(s) and/or the provision of detaching agent and/or the provision of a controlled cooling step, are selected so as the core member 12 can be removed (peeled off) from the layer 11*h* of the adapter, as well as the layer of the adapter can be removable (peeled off) from another layer, as already discussed above.

As mentioned, at the end of the extrusion step, when the module 1 is obtained, it may be longitudinally (i.e. along the axis of the opening 14) cut (partially or completely) into two portions, if the body is provided with a closed hollow section. Thus, the opening 14 is divided in two halves, having an open cross section, so as to allow an easy insertion of the cable/pipe within the opening 14 itself. This step is not necessary if the body 10 is provided with an open section. Furthermore, the core member may be removed from the sealing module 1, so that the final piece is already provided with an opening 14.

The invention claimed is:

1. A method for the production of a sealing module for a pipe or a cable, the sealing module having a hollow body and a plurality of inner layers superimposed one to the other, provided within said body, the layers being removable one from the other to define the size of the cross-section of a housing extending between two opposite surfaces of the sealing module to house cables or pipes of different sizes, wherein said plurality of layers are made of a thermoplastic material or both said body and said plurality of layers are made of a thermoplastic material, the method comprising the step of providing said external body and a core member, and the step of extruding in sequence, or simultaneously, said plurality of layers of thermoplastic material, one above the other, one or more layers being removable from another layer.

2. The method according to claim 1, comprising the steps of:

a) providing a core member;

b) extruding in sequence said plurality of layers, one above the other, on said core member, one or more layers being removable from another layer;

c) extruding said body made of thermoplastic material on the external layer of said plurality of layers extruded in said step b), or providing said body and constraining it to said external layer of said plurality of layers.

3. The method according to claim 1, comprising the steps of:

(a) providing said body having a cavity to house said plurality of layers;

(b) extruding in sequence said plurality of layers, one above the other, in said cavity of said body, one or more layers being removable from another layer.

4. The method according to claim 1, wherein one or more layer is removable by peeling.

5. The method according to claim 1, wherein said step of extruding in sequence said plurality of layers comprises the step of cooling at least part of at least the external surface of a first layer, before a second layer is extruded and deposited onto said first layer, preferably in the step of cooling a coolant is provided on at least part of the external surface of a first layer, before a second layer is extruded and deposited onto said first layer.

6. The method according to claim 1, wherein said step of extruding in sequence said plurality of layers comprises the step of providing a detaching agent before the thermoplastic material is extruded and/or after the thermoplastic material has been extruded.

7. The method according to claim 1, comprising the steps of extruding in sequence said plurality of layers with a closed section, and extruding said body made of thermoplastic material, or providing said body with a closed section, and further comprising the step of partially cutting, or completely cutting, substantially along the axis of the housing, the sealing module, preferably into two portions.

8. The method according to claim 1, comprising the step of setting one or more extrusion parameters to provide the desired adhesion between the layers allowing removal of one or more layers, preferably said parameters being selected from: the extrusion speed, the extrusion temperature, the distance between extrusion dies, or a combination thereof.

9. The method according to claim 1, further comprising a step of drying the external surface of a first layer, before a second layer is extruded and deposited onto said first layer.

10. The method according to claim 2, wherein said step (a) of providing a core member comprises the step of extruding a core member made of thermoplastic material.

11. The method according to claim 2, comprising the step of removing the core member, after said step (c).

12. The method according to claim 3, wherein said step (a) of providing said body comprises the step of extruding the body made of thermoplastic material.

13. The method according to claim 3, wherein the first layer is permanently constrained to the surface of the cavity of the body.

14. The method according to claim 1, comprising the steps of:

(a) simultaneously extruding said plurality of layers of thermoplastic material, one above the other, one or more layers being removable from another layer;

(b) providing said external body on said plurality of layers.

15. The method according to claim 14, wherein said external body and said layers have an open hollow section.

16. The method according to claim 14, wherein said step (b) is simultaneous to said step (a), so that the external body is extruded simultaneously to said plurality of layers extruded in said step (a).

17. The method according to claim 14, comprising the step of providing a detaching agent to the plurality of layers.

18. The method according to claim 14, comprising the step of cooling at least part of said layers, during or after said step of extruding said plurality of layers.

19. An apparatus for the production of a sealing module for a pipe or a cable according to the method of claim 1, the sealing module having a hollow body and a plurality of inner layers superimposed one to the other provided within said body, the layers being removable one from the other to define the size of the cross-section of a housing extending between two opposite surfaces of the sealing module to house cables or pipes of different sizes, wherein said plurality of layers are made of a thermoplastic material or both said body and said plurality of layers are made of a thermoplastic material, the apparatus comprising:

a plurality of extruding stations, each extruding station comprising an extrusion die, wherein at least part of the sizes of said extrusion dies are different one from the other; guiding means to direct and move the thermoplastic material extruded from the extrusion die of an extruding station to the extrusion die of a subsequent extruding station; a coolant feeder arranged between two subsequent extruding stations, to feed a coolant to the extruded thermoplastic material or comprising at least an extruding station comprising a plurality of extrusion holes, said extrusion holes being configured to allow a simultaneous extrusion of said layers.

20. A sealing module for a pipe or a cable, the sealing module having a hollow body and a plurality of inner layers superimposed one to the other provided within said body, the layers being removable one from the other to define the size of the cross-section of a housing extending between two opposite surfaces of the sealing module to house cables or pipes of different sizes, wherein said plurality of layers are made of an extruded thermoplastic material or both said body and said plurality of layers are made of an extruded thermoplastic material.

* * * * *